United States Patent [19]

Schündehütte et al.

[11] 3,853,840

[45] Dec. 10, 1974

[54] REACTIVE DYESTUFFS CONTAINING A FIBER-REACTIVE ALKYLSULPHONYLPYRIMIDYL GROUP

[75] Inventors: Karl-Heinz Schündehütte; Kersten Trautner, both of Leverkusen, Germany

[73] Assignee: Bayer Aktiengesellschaft, Leverkusen, Germany

[22] Filed: Mar. 24, 1970

[21] Appl. No.: 22,365

Related U.S. Application Data

[63] Continuation of Ser. No. 512,542, Dec. 8, 1965, abandoned.

[52] U.S. Cl. ............... 260/146 D, 8/72 R, 8/50, 260/145 B, 260/146 T, 260/147, 260/153, 260/154, 260/157, 260/249, 260/250 R, 260/250 A, 260/251, 260/252, 260/261
[51] Int. Cl... C09b 62/22, C09b 62/24, C09b 62/26
[58] Field of Search ............ 260/146, 146 D, 146 T, 260/147, 152, 153, 154, 156, 157, 158, 162, 163, 242, 261, 262, 257, 256.4 N, 250 R, 250 A

[56] References Cited
UNITED STATES PATENTS

| | | | |
|---|---|---|---|
| 3,215,686 | 11/1965 | Zerweck et al. | 260/162 |
| 3,259,618 | 7/1966 | Andrew | 260/146 |
| 3,459,729 | 8/1969 | Crotti et al. | 260/153 |

Primary Examiner—Floyd D. Higel
Attorney, Agent, or Firm—Plumley & Tyner

[57] ABSTRACT

Reactive dyestuffs particularly useful in the dyeing of textile materials containing hydroxyl groups or nitrogen, such as natural and regenerated cellulose, wool, silk, synthetic polyamides, and synthetic polyurethanes, are prepared and have the formula:

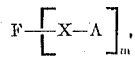

wherein F is the radical of an organic dyestuff; X is —CH=CH—,

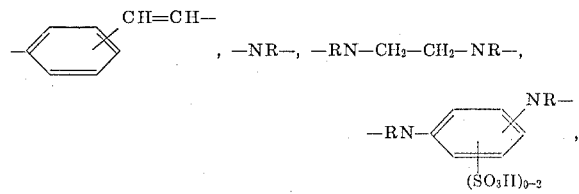

or

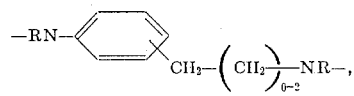

wherein R is hydrogen or a lower alkyl radical of 1 to 5 carbon atoms; A is a pyridine, pyrimidine, pyridazine, pyrazine, thiazine, triazine, quinoline, phthalazine, cinnoline, phenazine, or phenanthridine radical which contains at least one lower alkyl sulfonyl, phenyl sulfonyl, benzyl sulfonyl, naphthyl sulfonyl, benzthiazolyl sulfonyl, thiazolyl sulfonyl, thiadiazolyl sulfonyl, oxazolyl sulfonyl, benzimidazolyl sulfonyl, or pyrimidyl sulfonyl, said sulfonyl radical containing no substituents or substituents selected from the class consisting of the bromine, chlorine, hydroxyl, nitro, cyano, sulfo, carboxyl, carboxy lower alkyl, lower carboalkyl, lower carboalkoxy, lower alkoxy, lower alkyl, lower alkyl sulfonyl amino and acetyl amino radical, said reactive sulfonyl substituent being linked to a carbon atom of the heterocyclic moiety A; and $m$ represents a number from 0.5 to 8. The dyeings which can be obtained with the new dyestuffs are characterized by good to very good fastness properties, especially by excellent fastness to wet processing.

14 Claims, No Drawings

REACTIVE DYESTUFFS CONTAINING A FIBER-REACTIVE ALKYLSULPHONYLPYRIMIDYL GROUP

This application is a continuation of our prior copending application, Ser. No. 512,542, filed Dec. 8, 1965, now abandoned.

The present invention relates to valuable new reactive dyestuffs of the general formula

(I)

in which F is the radical of an organic dyestuff; X is an alkylene radical, an arylene radical, $-SO_2-$, $-N=N-$,

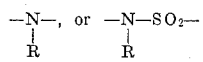

in which R is hydrogen or a monovalent organic substituent, said radical X is directly bonded to the radical A and is either directly or by means of a divalent bridging group connected to the dyestuff radical F; A is the radical of a 6-membered heterocyclic ring which contains at least one reactive sulfonyl substituent linked to a carbon atom of the heterocyclic ring and which can contain fused carbocyclic rings, and $m$ is a number of 0.5 to 8.

In the dyestuffs of the general formula (I), the radical A is, by definition, linked to the dyestuff radical F via the divalent radical X which, in turn, is bonded directly or through a bridging group to the dyestuff radical F. As divalent X radicals, those containing nitrogen are preferred, especially $-NH-$ and $-N(CH_3)-$ groups as well as sulfonamide and carbonamide groups. The amino or amide groups can carry further substituents, such as lower alkyl (preferably $C_1$ to $C_5$), aralkyl, cycloalkyl, or aryl groups, but preferably they are present in the form $-NH-$ which is not further substituted. The amino groups are, in turn, either linked directly, on the one hand, to the radical A and, on the other hand, linked either directly or via a further bridge member such as $-SO_2-$ or $-CO-$ (as in the case of the amide grouping already mentioned), or an alkylene group, an arylene, arylene—$SO_2-$, arylene—$CO-$, arylene-amino group, a urea group or a triazine or diazine ring, an arylene-amido-sylfonyl group or by other bridging groups to the aromatic radical F of the dyestuff. If such further bridge members contain heterocyclic ring systems, as in the case of triazinyl or pyrimidinyl radicals, these also may contain reactive atoms or groupings, such as halogen atoms or sulfonyl substituents.

Similarly, other possible bridging radicals X, such as $-SO_2-$, alkylene, (saturated or unsaturated) and arylene, are bonded on one side directly to the heterocyclic radical A and are linked, on the other side, either directly or via additional bridging groups with the radical F; such additional bridging members between X and F result, for example, in the following radicals being attached to the dyestuff radical F: $-OC$-arylene-A; $-OC$-alkylene-A; $-OC$—aralkylene-A; $-OC$-alkarylene-A; $-O_2S$-arylene-A; $-O_2S$—alkylene-A; $-O_2S$-aralkylene-A; $-O_2S$-alkarylene-A; $-(R)N$-alkylene-A; $-(R)N$—aralkylene-A; $-(R)N$-alkarylene-A; $-(R)N$-arylene-A; $-(R)NO_2S$-alkylene-A; $-(R)NO_2S$-aralkylene-A; $-(R)NO_2S$-alkarylene-A; $-(R)NO_2S$-arylene-A; $-(R)N-OC$-alkylene-A; $-(R)N-OC$-aralkylene-A; $-(R)N-OC$-alkarylene-A; $-(R)N-OC$-arylene-A; $-N=N$-aralkylene-A; $-N=N$-arylene-A; and $-(R)NO_2S-A$.

Suitable reactive sulfonyl substituents in the radical A are lower alkyl-sulfonyl radicals, preferably with 1–5 carbon atoms, such as methyl-sulfonyl, ethyl-sylfonyl, or propyl-sulfonyl radicals; aryl-sulfonyl radicals, such as phenyl-sulfonyl, p-toluene-sulfonyl, p-chlorophenyl-sulfonyl radicals; aralkyl-sulfonyl radicals, such as benzyl-sulfonyl and p-toluylmethyl-sulfonyl radicals; and also hetero-sulfonyl radicals, such as 2-benzothiazole-sulfonyl.

The 6-membered heterocyclic ring A which contains at least one reactive sulfonyl substituent, i.e. one that is split off under the known conditions for applying reactive dyestuffs is, for example, a monoazine, diazine, or triazine ring, such as pyridine, pyrimidine, pyridazine, pyrazine, thiazine, or an asymmetric or symmetric triazine ring, or a ring system of this type with one or more fused aromatic rings, such as a quinoline, phthalazine, cinnoline, quinazoline, quinoxaline, acridine, phenazine, or phenanthridine ring. The heterocyclic ring A is preferably one which contains one or more nitrogen atoms in the ring, as in the compounds mentioned above. Rings fused to the heterocyclic ring are, by definition, aromatic in nature and can be carbocyclic or heterocyclic in nature. The fused rings can be 5- or 6-membered. The heterocyclic 6-membered ring A is preferably a pyrimidine or symmetrical triazine ring.

The linkage of the heterocyclic ring A to X is either from the heterocyclic ring which carries one or more of the reactive sulfonyl substituents, or is from the carbocyclic or heterocyclic ring system fused to the 6-membered ring. In the case where the bridge member X is bonded to the heterocyclic ring which contains the reactive sulfonyl substituent or substituents, X is linked either to a carbon atom or to a hetero atom, among the latter preferably a nitrogen atom of the heterocyclic 6-membered ring. However, it is preferred to have X bonded to a carbon atom of the heterocyclic ring A.

As suitable heterocyclic rings A which contain at least one reactive sulfonyl substituent and may contain further rings fused to the heterocyclic ring, there may be mentioned, by way of example: 2-carboxy-methyl sulfonyl-4-pyrimidinyl, 2-methyl-sulfonyl-4-methyl-6-pyrimidinyl, 2-phenyl-sulfonyl-4-methyl-6-pyrimidinyl, 2-phenyl-sulfonyl-4-methyl- -chloro-6-pyrimidinyl, 2,4-bis-methyl-sulfonyl-6-pyrimidinyl, 2,4-bis-methyl-sulfonyl-5-sulfamidyl-pyrimidine, 3-phenyl-sulfonyl-6-pyridazinyl, 3-methyl-sulfonyl-4-methyl-6-pyridazinyl, 2,5-bis-methyl-sulfonyl-6-pyrazinly, 1-methyl-sulfonyl-3-triazinyl, 1-methyl-sulfonyl-3-(3'-sulfo-phenylamino)-5-triazinyl, 1-methyl-sulfonyl-3-(2'-hydroxyethylamino)-5-triazinyl, 1-methyl-sulfonyl-3-amino-5-triazinyl, 1-methyl-sulfonyl-3-methoxy-5-triazinyl, 1-methyl-sulfonyl-3-(2'-benzthiazolyl)-thio-5-triazinyl, 1-(4'-methyl-phenyl-sulfonyl)-3-phenyl-5-triazinyl, as well as 2-methyl-sulfonyl-4-quinazolyl, 2-methyl-sulfonyl-4-pyrimidinyl, 2-phenyl-sulfonyl-4-pyrimidinyl, 2-methyl-sulfonyl-4-methyl-6-pyrimidinyl, 2-methyl-sulfonyl-4-methyl-5-chloro-6-pyrimidinyl, 2-carboxymethyl-sulfonyl-4-methyl-5-chloro-6-pyrimidinyl, 3-(4'-nitrophenyl)-sulfonyl-6-pyridazinyl, 5-chloro- 6-methyl-sulfonyl-4-pyridazinyl, 1-phenyl-sulfonyl-3-methoxy-5-triazinyl, 1,3-bis-phenyl-sulfonyl-5-triazinyl, 1-methyl-sulfonyl-3-phenoxy-5-triazinyl, 1-methyl-sulfonyl-3-phenyl-5-triazinyl.

The reactive sulfonyl substituent or substituents can contain in the aryl, alkyl, or hetero residues additional ionic or non-ionic groups, such as carboxy (e.g. in the form of carboxy-methyl), sulfo, hydroxyl, nitro, or halogen (Cl, Br) groups; the following substituted sulfonyl groups may be mentioned as examples: carboxy-methyl-sulfonyl, chloromethyl sulfonyl, β-chloroethyl sulfonyl, β-hydroxyethyl sulfonyl, β-sulfoethyl sulfonyl, β-methoxyethyl sulfonyl, β-ethoxyethyl sulfonyl, β-propoxyethyl sulfonyl, sulfobutyl sulfonyl, β-carboxyethyl sulfonyl, β-cyanoethyl sulfonyl, cyanomethyl sulfonyl, β-carbo lower alkoxyethyl sulfonyl (having 1 to 3 carbon atoms in the lower alkoxy residue, β-carbo lower alkoxy methyl sulfonyl, methyl sulfonyl methyl sulfonyl, β-methyl sulfonyl ethyl sulfonyl, ethyl sulfonyl methyl sulfonyl, β-ethyl sulfonyl ethyl sulfonyl, β-carboxy vinyl sulfonyl, β-chloro vinyl sulfonyl, α, β- or β,β-dichlorovinyl sulfonyl, sulfophenyl sulfonyl, o-, m- or p-methyl- or -ethyl-phenyl sulfonyl, o-, m- or p-chloro- or -bromophenyl sulfonyl, 2,4- or 2,5-dichloro- or -dibromophenyl sulfonyl, p-carboxyphenyl sulfonyl, o,p-dicarboxyphenyl sulfonyl, o-, m- or p-methoxyphenyl sulfonyl, o-methoxy-p-chlorophenyl sulfonyl, o-methyl-p-chlorophenyl sulfonyl, o-, m- or p-nitrophenyl sulfonyl, 2,4-dinitrophenyl sulfonyl, p-aminophenyl sulfonyl, p-acetylaminophenyl sulfonyl and other o-, m- or p-acylaminophenyl sulfonyl, sulfonaphthyl-1- or -2-sulfonyl, substituted naphthyl sulfonyl radicals carrying substituents as indicated hereinbefore for the substituted phenyl sulfonyl radicals. Other unsubstituted reactive sulfonyl radicals are those of the heterocyclic series, such as for instance benzthiazolyl sulfonyl, thiazolyl sulfonyl, thiadiazolyl sulfonyl, oxazolyl sulfonyl, benzimidazolyl sulfonyl, pyrimidyl sulfonyl as well as substitution products of these heterocyclic reactive sulfonyl radicals.

Of the large number of possible and suitable bridge members X—A, including bridging members to the radical F, the following may be mentioned by way of example: —NH—A, —N(CH₃)—A, —N(C₂H₅)—A, —N(C₃H₇)—A, —CONH—A, —SO₂—NH-A, —N-HO₂S—A, —CON(CH₃)—A, —SO₂N(CH₃)—A, —(CH₃)NO₂S—A, and the corresponding N-ethyl- and N-propyl-amides, —HN—CO—NH—A, —HN—CH₂—CO—NH—A, —N(CH₃)—CH₂—CONH—A, —HN—CH₂—CH₂—NH—A, —HN—CH₂—CH₂—NH—CO—A,

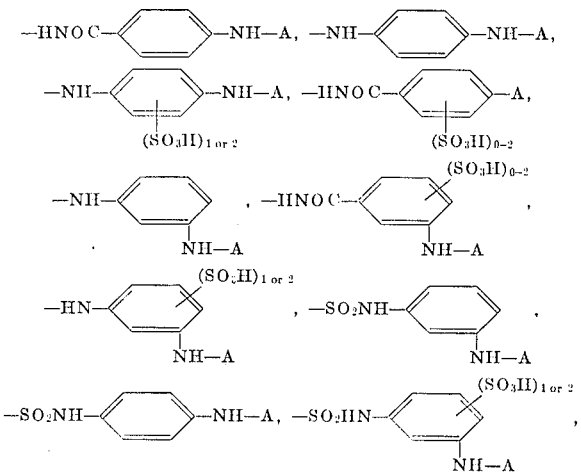

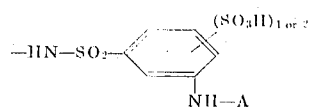

and the corresponding N-alkyl (1—5 C)-amides or -amines

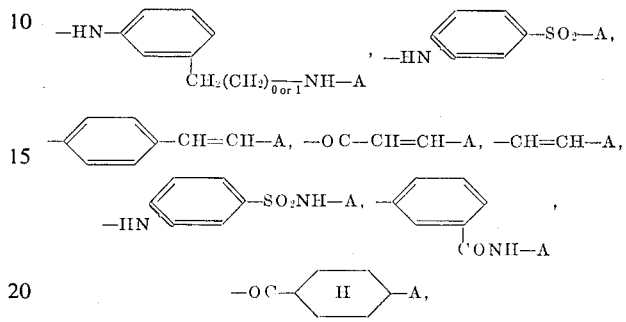

as well as the corresponding N-alkyl (1–5 C)-amides or -amines of the said compounds.

A further suitable bridge member is the azo grouping —N=N—. In a special case the new dyestuffs correspond to the formula $$F_1—(N=N—A)_k \qquad (II),$$

in which $F_1$ is the residual constituent of an azo dyestuff, A has the meaning specified above, and $k$ stands for the number 1 or 2; $F_1$ is in this formula, for example, the radical of a coupling component, but $F_1$ can also be any other aromatic carbocyclic or heterocyclic radical which serves for the synthesis of the azo dyestuff (II), e.g. by condensation.

The new dyestuffs may belong to a great variety of classes, e.g. to the series of metal-free or metal-containing mono- or polyazo dyestuffs; metal-free or metal-containing azaporphin dyestuffs, such as copper- or nickel-phthalocyanine dyestuffs; of the anthraquinone, oxazine, dioxazine, triphenylmethane, nitro, azomethine, benzanthrone and dibenzanthrone dyestuffs; and polycyclic condensation compounds of anthraquinone, benzanthrone and dibenzanthrone compounds. Within the range of these dyestuff classes, dyestuffs of the following general formulae are particularly valuable, inter alia:

1. Azo dyestuffs having the formula

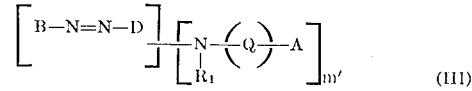

in which B and D are aromatic, carbocyclic, or heterocyclic radicals, and in particular where B is the radical of a carbocyclic diazo component of the benzene or naphthalene series, and D is the radical of an enolic or phenolic coupling component, e.g. of a 5-pyrazolone, an acetoacetic acid arylamide, an oxynaphthalene or an aminonaphthalene, etc.; B and D can moreover contain any substituent customary in azo dyestuffs, including further azo groups; $R_1$ is a substituent or, preferably, a hydrogen atom, Q is a direct bond or an —SO₂-group, $m'$ denotes an integer, preferably the number 1 or 2, and A is the radical of a 6-membered heterocyclic ring which contains at least one reactive sulfonyl substituent linked to a carbon atom of the heterocyclic ring and may contain fused carbocyclic rings. It is to be understood that in the foregoing Formula (III) the radical

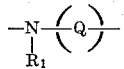

corresponds to the radical X in Formula (I).

Especially valuable dyestuffs of this series are those which are water-soluble and, in particular, those containing sulfonic acid and/or carboxylic acid groups. The azo dyestuffs can be metal-free as well as metal-containing, the cooper, 1:2 or 1:1 chromium and cobalt complexes being the most interesting metal complexes.

Important azo dyestuffs are, for example, those of the benzene-azo-naphthalene, benzene-azo-1-phenyl-5-pyrazole, benzene-azo-aminonaphthalene, naphthalene-azo-naphthalene, naphthalene-azo-1-phenylpyrazolone-5, and stilbene-azo-benzene series, the dyestuffs containing sulfonic acid groups being, again, preferred. In the case of metal complex azo dyestuffs, the groups linked to the metal complex are preferably in the o-positions to the azo group, e.g. in the form of o,o'-dihydroxy, o-hydroxy-o'-carboxy, o-carboxy-o'-amino, o-hydroxy-o'-aminoazo and o-hydroxy-o'-alkoxy (1-2 C) groupings.

2. Anthraquinone dyestuffs having the formula

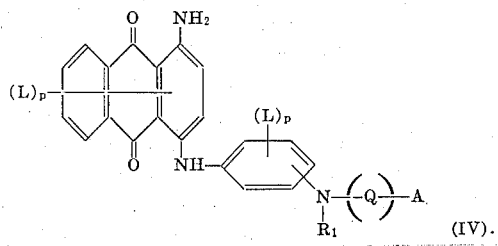

In this formula L is hydrogen or a substituent, the sulfonic acid group being the preferred substituent, $p$ is the number 1, 2, or 3, $R_1$ is a substituent or, preferably, hydrogen, Q is a direct bond or an —$SO_2$—group, and A is a 6-membered heterocyclic ring which contains at least one reactive sulfonyl substituent linked to a carbon atom of the heterocyclic ring and may contain fused carboxcyclic rings. It is to be understood that in the foregoing Formula (IV), the radical

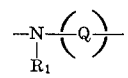

corresponds to the radical X in Formula (I).

Also in the range of these dyestuffs, the water-soluble products are preferred because of their excellent suitability for the dyeing and printing of cellulose-containing fibers; the dyestuffs substituted by sulfonic acid groups have proved particularly suitable for this purpose.

3. Azaporphin dyestuffs having the formula

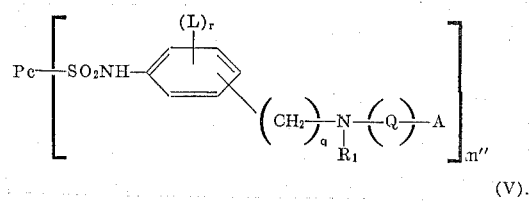

In this formula Pc stands for the radical of a phthalocyanine, e.g. of a copper- or nickel-phthalocyanine or a tetraphenyl-copper or -nickel-phthalocyanine, L stands for hydrogen or a substituent, the sulfonic acid group being preferred as substituent, $r$ stands for the number 1 or 2, $q$ for the number 0, 1, or 2, $R_1$ for a substituent or, preferably, hydrogen, Q for a direct bond or a —$SO_2$-group, A for a 6-membered heterocyclic ring which contains at least one reactive sulfonyl substituent linked to a carbon atom of the heterocyclic ring and may contain further fused carbocyclic rings, and $m''$ stands for a number of 0.5 to 4. The phthalocyanine radical Pc can obviously contain further substituents, especially sulfonic acid and/or N-substituted (e.g. by lower alkyl) and/or N-unsubstituted sulfonamide groups. It is to be understood that in the foregoing Formula (V), the radical

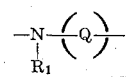

corresponds to the radical X in Formula (I).

Water-soluble phthalocyanine dyestuffs of the formula (V) which are preferred for application to cellulose-containing materials are particularly those which carry sulfonic acid groups in the radical Pc and optionally, in addition, as the substituent L.

The foregoing discussion of suitable azo, anthraquinone, and azaporphin dyestuffs and heterocyclic ring systems A is not intended to represent a limitation of the general formula, either in respect of the possibilities of preparing such dyestuffs within the scope of the general formula (I), or with regard to the valuable technical properties of applying these products. The new dyestuffs can, moreover, contain any substituent customary in dyestuffs, such as sulfonic acid, carboxylic acid, alkylamino, aralkylamino, arylamino, acylamino, nitro, cyano, halogen, hydroxyl, alkoxy, thioether, azo groups, and the like. The dyestuffs may also contain further groups capable of fixation, such as mono- or dihalo-triazinyl-amino, mono-, di-, or trihalo-pyrimidinyl-amino, 2,3-dihaloquinoxaline-6-carbonyl- or -6-sulfonylamino, 1,4-dihalo-phthalazine-6-carbonyl- or -6-sulfonyl-amino, 2-halobenzothiazole-5-carbonyl or -5-sulfonyl-amino, esterified sulfonic acid oxalkylamide or oxalkyl-sulfone groups, sulfofluoride, halo-alkylamino, acryloylamino, haloacylamino groups, and the like.

The new dyestuffs of the formula (I) are obtained by introducing, according to known methods, into dyestuffs or dyestuff intermediates, a group —X—A wherein X is a

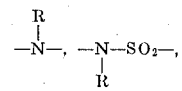

—$SO_2$—, arylene, alkylene, or —N=N—group said group X linked directly with the radical A on one side and either directly or over a further bridging member, on the other side, with the radical F. The term R represents hydrogen or a substituent, arylene an arylene residue, and alkylene a lower alkylene residue. The radical A is a 6-membered heterocyclic ring and contains at least one reactive sulfonyl substituent linked to a carbon atom of the heterocyclic ring and which can contain further fused carbocyclic rings. In the case where dyestuff intermediates are used, these are subsequently converted into the desired end dyestuffs. The introduction of the —X—A group into the dyestuffs or dyestuff intermediates can be carried out by various methods of preparation. Thus, amino or amide group-containing dyestuffs or dyestuff intermediates which exhibit one reactive hydrogen atom at the amine or amide nitrogen, can be reacted with compounds of the general formula

A—Y (VI), in which A represents a 6-membered heterocyclic ring which contains at least one reactive sulfonyl substituent linked to a carbon atom of the heterocyclic ring and which can have fused thereto carbocyclic rings, and Y is a radical which can be split off as anion, and, if dyestuff intermediates are used, then converted in a suitable manner into the desired end dyestuffs. Of the reactive substituents Y which can be split off as anionic radicals, chlorine, bromine, and sulfonyl substituents are preferred. Further suitable radicals which can be split off as anions are, for example, fluorine, $SO_3M$ (M being H or a metal cation), quaternary ammonium groups, alkylmercapto, nitrile, alkoxy, or aryloxy groups.

Heterocyclic compounds of the formula (VI) which are suitable for the reaction are, for example, 2-carboxymethylsulfonyl-4-chloropyrimidine, 2-methylsulfonyl-6-methyl-4-chloropyrimidine, 2,4-bis-methylsulfonyl-6-methylpyrimidine, 2,6-bis-phenylsulfonyl-4-methyl-5-chloropyrimidine, 2,4,6-tris-methylsulfonyl-pyrimidine, 2,4-bis-methylsulfonyl-pyrimidine-5-sulfonic acid chloride, 2,5,6-tris-methylsulfonyl-pyrazine, 1,3-bis-methylsulfonyl-2,4,6-triazine, 1,3-bis-methylsulfonyl-5-(3′-sulfophenylamino)-2,4,6,triazine, 1,3-bis-methylsulfonyl-5-phenoxytriazine, 1,3-bis-methylsulfonyl-5-trichloroethoxytriazine and numerous other 1,3-bis-methylsulfonyl-2,4,6-triazines substituted in the 5-position, 2,4-bis-methylsulfonyl-quinazoline, 2,4-bis-phenylsulfonyl-quinoline, 2-methylsulfonyl-4-chloropyrimidine, 2-chloromethylsulfonyl-4-chloropyrimidine, 2-phenylsulfonyl-4-chloropyrimidine, 2,6-bis-methylsulfonyl-4-methyl-5-chloropyrimidine, 2-methylsulfonyl-4-methyl-5,6-dichloropyrimidine, 2,6-bis-methylsulfonyl-4-methyl-5-bromopyrimidine, 2-methylsulfonyl-4-methyl-6-chloro-pyrimidine-5-sulfonic acid chloride, 4,6-bis-methyl-methylsulfonyl-5-chloropyridazine, 3,6-bis-phenylsulfonylpyridazine, 3-methylsulfonyl-6-chloro-pyridiazine, 3,6-bis-methylsulfonyl-4-methyl-pyridazine, and the bromo-derivatives of the named chloro compounds.

The reaction of the amino or amide group-containing dyestuffs or dyestuff intermediates with heterocyclic compounds of the formula (VI) is carried out, depending on the type of starting compounds employed, in an organic, aqueous-organic or aqueous medium at temperatures of −10°C to +80°C, preferably in the presence of alkaline condensing agents, such as pyridine, aqueous alkali metal carbonate, or alkali metal hydroxide solutions.

When dyestuff intermediates are used, the condensation products obtained are converted in known manner into the desired end dyestuffs. This process is mainly of interest for the preparation of azo dyestuffs in that, for example, a diazo and/or coupling component exhibiting a reactive amino or amide group is first condensed with the reactive component (VI), and the resultant intermediate product is subsequently converted into an azo dyestuff by diazotization, and/or coupling, and/or condensation. This azo dyestuff can be subjected to further conversion reactions customary in azo dyestuffs, e.g. acylation, condensation, reduction, and metallization. Also in the preparation of other dyestuffs, especially those of the phthalocyanine and anthraquinone series, the condensation of a reactive component (VI) can first be carried out with an intermediate product, e.g. with m-phenylene-diamine or a m-phenylene-diamine-sulfonic acid and the resultant reaction product subsequently further condensed, e.g. with bromoamino acid (1-amino-4-bromo-anthraquinone-2-sulfonic acid) to form a reactive anthraquinone dyestuff, or with a copper- or nickel-phthalocyanine-sulfonic acid halide to form a reactive phthalocyanine dyestuff.

Another method of preparing the new dyestuffs of the formula (I) consists in that amino or amide group-containing dyestuffs or, in particular, dyestuff intermediates which exhibit an exchangeable hydrogen atom at the amino or amide group, are reacted with compounds of the general formula A′—(Z)$_t$ (VII), in which A′ represents a 6-membered heterocyclic ring which can contain further fused carbocyclic rings, Z is a radical which can be split off as anion, with the exception of a sulfonyl radical, and $t$ denotes the number 2 or a number greater than 2, while replacing one of the radicals Z which can be split off an anion, that the remaining radical or radicals Z are subsequently converted in known manner into reactive sulfonyl substituents and, if dyestuff intermediates are used, these transformed into the desired end dyestuffs.

The exchange of one or more subsituents Z capable of being split off an anion, e.g. of halogen atoms, for reactive sulfonyl substituents can be effected, e.g. by reacting the compounds with alkyl- or aryl-sulphinates or, if Z represents, for example, an alkylmercapto or arylmercapto group which can be split off as anion, by transforming the latter by means of suitable oxidizing agents, such as hydrogen peroxide, hypohalides or permanganates, into the corresponding sulfonyl radicals.

The dyestuffs obtainable by the various processes described above can be subjected, as has already been mentioned for some cases, to further reactions customary for dyestuffs, in that, for example, metallizable dyestuffs are treated with metal-yielding agents, especially chromium, cobalt, copper or nickel salts; dyestuffs containing reducible groups, especially nitro groups, are reduced; dyestuffs containing acylatable groups, especially acylatable amino groups, are acylated; or dyestuffs are subsequently treated with sulfonating agents, such as chlorosulfonic acid, thionyl chloride, oleum or $SO_3$ in chlorinated hydrocarbons, in order to introduce further sulfonic acid groups into the products. The last-mentioned process is sometimes of particular importance in the series of anthraquinone and phthalocyanine dyestuffs.

Depending on the number of reactive groupings in the dyestuff radical or dyestuff intermediates, preferably —HNR— groupings, which are suitable for the conversion, one or more groupings of the formula —X—A can be incorporated in the dyestuffs. In the majority of cases the number $m$ will not exceed 4, but dyestuffs with more than 4, e.g. up to 8 groupings of the formula —X—A, especially those of higher molecular structure, can also be synthesized.

If the dyestuffs prepared according to the invention contain groups forming metal complexes, then they can be converted into their metal complex compounds by the action of metal-yielding agents, e.g. copper, nickel, chromium, or cobalt salts. They can also be subjected to other customary conversion reactions, such as diazotization, coupling, acylation, and condensation.

For the reaction of amino group-containing dyestuffs with reagents A—Y of the formula (VI) one employs, preferably for example, aminoazo dyestuffs of the formula

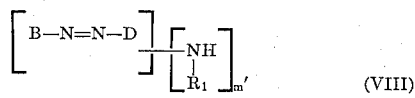

(VIII)

wherein B, D, $R_1$, and $m'$ have the above-indicated meaning, or aminoanthraquinone dyestuffs having the formula

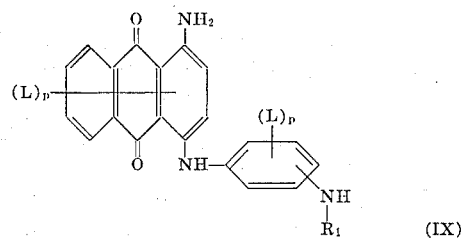

(IX)

wherein L, $R_1$, and $p$ have the above-indicated meaning, or amino group-containing phthalocyanine dyestuffs of the formula

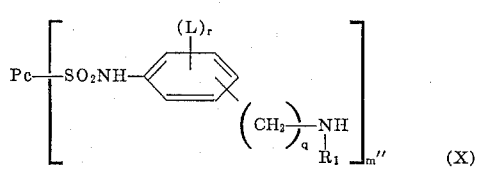

(X)

wherein Pc, L, $R_1$, $q$, $r$, and $m''$ have the above-indicated meaning. The resulting condensation products correspond to the general formula (I) for the novel dyestuffs. These products can be subjected to further reactions of which, in particular, subsequent sulfation of the anthraquinone and phthalocyanine dyestuff series is frequently of interest. Instead of the amino group-containing dyestuffs of (VIII), (IX), and (X), one can also employ amino group-containing precursors for the preparation of such dyestuffs which are first condensed with the reactive component A—Y and subsequently transformed into the final dyestuffs in the usual manner. The method of employing dyestuff intermediates is of paticular interest in the preparation of azo dyestuffs and of anthraquinone and phthalocyanine dyestuffs. In the azo dyestuffs, one proceeds in such a manner that a diazo component or a coupling component which contains a reactive amino group is condensed with the reactive component of formula (VI) and subsequently built into the desired azo dyestuff through coupling. The resulting product can further be metallized or diazotized and thereby transformed into a disazo or polyazo dyestuff. In the anthraquinone dyestuffs, one can, for example, condense a diaminoaryl compound in which one amino group is protected, e.g. an acylamino bond, through the second amino group with a reactant component of formula (VI) and subsequently transform a protected amino group into a free amino group such as, for example, by saponification, and condense the resulting product with, for example, 1-amino-4-bromoanthraquinone-2-sulfonic acid to a valuable anthraquinone dyestuff type. For the preparation of the phthalocyanine dyestuffs, one can prepare a mono-condensation product of a diaminoaryl compound with dyestuffs and, condense this product with, for example, copper- or nickelphthalocyanine-sulfonic acid-halides, whereby simultaneously or subsequently other amino compounds such as ammonia, aliphatic amino compounds, and/or aromatic amino compounds can also be employed therewith. One obtains, using this procedure, phthalocyaninesulfonamide dyestuffs which contain a certain amount of sulfonaryl-amido groups which carry the reactive groups and also contain a certain amount of non-reactive sulfonamido groups and/or free sulfonic acid groups.

A particularly preferred group of reactive dyestuffs falling within the scope of formula (I) are those having the general formula

(XI)

wherein F is the residue of an organic dyestuff, $X_1$ an amino group, $A_1$ the residue of a pyrimidine ring which contains at least one reactive sulfonyl substituent bonded to a carbon atom of the heterocyclic ring, and $m$ is a number from 0.5 to 8.

In the dyestuffs of the general formula (XI), the radical $A_1$ is by definition bonded to the dyestuff radical F by means of an amino group $X_1$. The amino group can contain further substituents such as lower alkyl groups (preferably $C_1$ to $C_5$) aralkyl-, cycloalkyl-, or aryl groups, but exists preferably in the unsubstituted form —NH—. The amino groups are, on the other hand, directly bonded to aromatic ring carbon atoms of the dyestuff.

The reactive sulfonyl substituents are preferably lower alkylsulfonyl groups which contain, preferably, from 1 to 5 carbon atoms, such as methylsulfonyl-, ethylsulfonyl- or propylsulfonyl-. Other suitable reactive sulfonyl substituents are arylsulfonyl groups such as phenylsulfonyl, p-toluylsulfonyl, p-chlorophenylsulfonyl groups; aralkylsulfonyl groups such as benzylsulfonyl and p-toluylsulfonyl groups, and also heterosulfonyl groups such as 2-benzothiazolylsulfonyl as well as those mentioned hereinbefore.

Suitable pyrimidine groups $A_1$ which contain at least one reactive sulfonyl substituent are, for example, 2-carboxy-methylsulfonyl-4-pyrimidinyl, 2-methylsulfonyl-4-methyl-6-pyrimidinyl, 2-phenylsulfonyl-4-methyl-6-pyrimidinyl, 2-phenylsulfonyl-4-methyl-5-chloro-6-pyrimidinyl, 2,4-bis-methylsulfonyl-6-pyrimidinyl, 2-methylsulfonyl-4-methyl-5-nitro-6-pyrimidinyl, 2-methylsulfonyl-5-cyano-4-pyrimidinyl, 2-methylsulfonyl-4-carboxy-6-pyrimidinyl, and 2-ethylsulfonyl-5-sulfo-4-pyrimidinyl, as well as those mentioned hereinabove.

The reactive sulfonyl substituent or substituents attached to the ring $A_1$ can contain further ionic or nonionic groups such as, for example, carboxy (e.g. in the form of carboxy methyl), hydroxy, nitro, halogen (Cl, Br), sulfonic acid or sulfo groups, as well as groups mentioned hereinabove.

The dyestuffs (XI) may belong to a great variety of classes, e.g. to the series of metal-free or metal-containing mono- or polyazo dyestuffs; metal-free or metal-containing azaporphin dyestuffs, such as 1-nickel-phthalocyanine dyestuffs; of the anthraquinone, oxazine, dioxazine, triphenylmethane, nitro, azomethine, benzanthrone, and dibenzanthrone dyestuffs; and polycyclic condensation compounds of anthraquinone, benzanthrone, and dibenzanthrone compounds. Within the range of these dyestuff classes, dyestuffs of the following general formulae are particularly valuable.

1. Azo dyestuffs having the formula

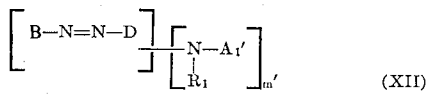

wherein B, D, $R_1$, and $m$ have the meanings indicated for the dyestuffs for formula (III) and $A_1$ is a pyrimidine ring radical which contains at least one reactive sulfonyl substituent linked to a carbon atom of the heterocyclic ring. Particularly valuable dyestuffs of this series are those which are water-soluble and, more particularly, those which contain sulfonic acid and/or carboxylic acid groups. The azo dyestuffs can be metal-free as well as metal-containing. Metal complexes which are of particular interest are those of copper, chromium, and cobalt.

Important azo dyestuffs are, for example, those of the benzene-azo-naphthalene, benzene-azo-1-phenyl-5-pyrazole, benzene-azo-aminonaphthalene, naphthalene-azo-naphthalene, naphthalene-azo-1-phenylpyrazolone-5, and stilbene-azo-benzene series, the dyestuffs containing sulfonic acid groups being, again, preferred. In the case of metal complex azo dyestuffs, the groups linked to the metal complex are, preferably, in the o-position to the azo group, e.g. in the form of o,o'-dihydroxy, o-hydroxy-o'-carboxy, o-carboxy-o'-amino, and o-hydroxy-o'-aminoazo groupings.

2. Anthraquinone dyestuffs having the formula

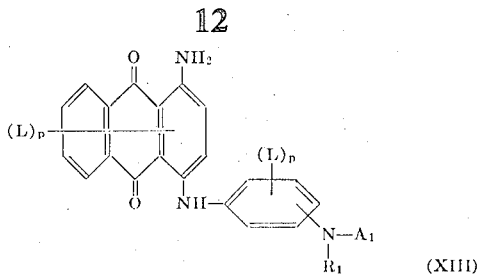

wherein L, p, and $R_1$ are as indicated in formula (IV) and $A_1$ is a pyrimidine group which contains at least one reactive sulfonyl substituent linked to a carbon atom of the heterocyclic ring. Also in the range of these dyestuffs, the water-soluble products are preferred because of their excellent suitability for the dyeing and printing of cellulose-containing fibers; the dyestuffs substituted by sulfonic acid groups have proved particularly suitable for this purpose.

3. Azaporphin dyestuffs having the formula

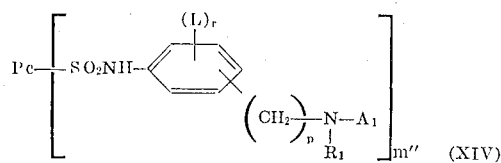

in which Pc, L, $q$, $r$, $m''$, and $R_1$ have the meanings indicated in formula (V) and wherein $A_1$ is a pyrimidine radical which contains at least one sulfonyl substituent linked to a carbon atom of the heterocyclic ring. The phthalocyanine radical Pc can obviously contain further substituents, especially sulfonic acid and sulfonamide groups. Water-soluble phthalocyanine dyestuffs of the formula (XIV), which are preferred for application to cellulose-containing materials, are particularly those which carry sulfonic acid groups in the radical Pc and, optionally, in addition, as the substituent L. The foregoing discussion of suitable azo, anthraquinone, and azaporphin dyestuffs, and heterocyclic ring system $A_1$ is not intended to represent a limitation of the general formula, either in respect to the possibilities of preparing such dyestuffs within the scope of the general formula (I) or with regard to the valuable technical properties of applying these products.

Particularly valuable dyestuffs, from a technical standpoint, are those having the general formulas (XII), (XIII), and (XIV), in which the residue

corresponds to the following particular formula

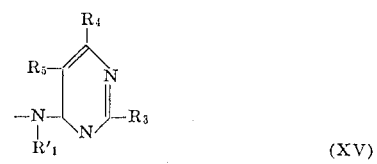

wherein $R'_1$ is hydrogen or an alkyl residue containing from 1 to 3 carbon atoms, one of the groups $R_3$ or $R_4$ is an —$SO_2M$—group, wherein M is an alkyl, aralkyl, or aryl group, and wherein the other group $R_3$ or $R_4$ can also be an —$SO_2M$-group or hydrogen, alkyl, aralkyl, aryl, —$SO_3H$, —COOH, —COO—alkyl, —Cl, —Br, or —CN; and wherein $R_5$ is hydrogen or a substituent such as alkyl, aralkyl, aryl, —$SO_3H$, —COOH, —COO-alkyl, -Cl, -Br, -CN, nitro, carbonamide, or sulfonamide, the alkyls having 1-4 carbon atoms.

Of particularly great importance are those dyestuffs having the formulas (XII), (XIII), and (XIV), in which the residue $A_1$ is 2-methylsulfonyl-5-chloro-6-methylpyrimidinyl-4. This reactive component is introduced by reaction of the amino group-containing dyestuff with, for example, 2-methylsulfonyl-j4,5-dichloro-6-methylpyrimidine. The new dyestuffs of formula (XI) can, moreover, contain any substituent customary in dyestuffs, such as sulfonic acid, carboxylic acid, alkylamino, aralkylamino, arylamino, acylamino, nitro, cyano, halogen, hydroxyl, alkoxy, thioether, azo-groups and the like. The dyestuffs may also contain further groups capable of fixation such as mono- or dihalo-triazinyl-amino, mono-, di-, or trihalo-pyrimidinyl-amino, 2,3-dihaloquinoxaline-6-carbonyl or -6-sulfonylamino, 1,4-dihalo-phthalazine-6-carbonyl- or -6-sulfonyl-amino, 2-halobenzothiazole-5-carbonyl or -5-sulfonyl-amino, esterified sulfonic acid-oxalkylamide or oxalkyl-sulfone groups, sulfofluoride, halo-alkylamino, acryloylamino, haloacylamino groups and the like.

The novel dyestuffs of formula (XI) are obtained by introducing, according to known methods, into dyestuffs or dyestuff intermediates at least one pyrimidinyl amino group which contains at least one sulfonyl substituent linked to a carbon atom of the pyrimidine ring and which is bonded to a ring carbon atom of the aryl nucleus of the dyestuff or dyestuff precursor and which, in the event that a dyestuff intermediate is employed, is then transformed into the desired final dyestuff. The pyrimidinyl amino group which contains at least one reactive sulfonyl substituent can be introduced into the dyestuff or dyestuff intermediate by reacting amino group-containing dyestuffs or dyestuff intermeidates which contain a reactive hydrogen atom in the amino nitrogen by reaction by a compound having the general formula $$A_1-Y$$

(XVI), wherein $A_1$ is a pyrimidine group which contains at least one reactive sulfonyl substituent linked to a carbon atom of the heterocyclic ring and in which Y is a radical which can be split off as an anion.

Of the reactive substituents Y which can be split off as anionic radicals, chlorine, bromine, and sulfonyl substituents are preferred. Further suitable radicals which can be split off as anions are, for example, F, $SO_3M$ (M being H or a metal cation), quaternary ammonium groups, alkylmercapto, nitrile, alkoxy or aryloxy groups. A particularly preferred reactive component of the formula $A_1-Y$ is 2-methylsulfonyl-4,5-dichloro-6-methylpyrimidine, in the condensation of which with amino group-containing dyestuffs or dyestuff intermediates, surprisingly the chlorine in the 4-position reacts with the

groups.

Heterocyclic compounds corresponding to formula (XVI), which are useful for the reaction, include, for example, 2-carboxymethylsulfonyl-4-chloropyrimidine, 2-methylsulfonyl-6-methyl-4-chloropyrimidine, 2,4-bis-methylsulfonyl-6-methylpyrimidine, 2,6-bis-phenylsulfonyl-4-methyl-5-chloropyrimidine, 2,4,6-tris-methulsulfonyl-pyrimidine, 2,4,5,6-tetramethylsulfonyl-pyrimidine, 2-methylsulfonyl-4-methyl-5-nitro-6-chloropyrimidine, 2-methylsulfonyl-4,5-dimethyl-6-chloropyrimidine, 2-ethylsulfonyl-4-methyl-5,6-dichloropyrimidine, 2-methylsulfonyl-4,6-dichloropyrimidine, 2,4,6-tris-methylsulfonyl-5-chloropyrimidine, 2-methylsulfonyl-4-carboxy-6-chloropyrimidine, 2-methylsulfonyl-4-chloropyrimidine-5-sulfonic acid, and 4,6-bis-methylsulfonyl-pyrimidine, as well as those listed on page 11 hereinabove. The reaction of the amino group-containing dyestuffs or dyestuff intermediates with the heterocyclic compounds of formula (XVI) is carried out, depending on the type of starting compounds employed, in an organic, aqueous-organic, or aqueous medium at temperatures of −10° to +80°C, preferably in the presence of alkaline condensing agents, such as pyridine, aqueous alkali metal carbonate, or alkali metal hydroxide solutions.

When dyestuff intermediates are used, the condensation products obtained are converted in known manner into the desired end dyestuffs. This process is mainly of interest for the preparation of azo dyestuffs in that, for example, a diazo and/or coupling component exhibiting a reactive amino group is first condensed with the reactive component (XVI) and the resultant intermediate product is subsequently converted into an azo dyestuff by diazotization, and/or coupling, and/or condensation. This azo dyestuff can be subjected to further conversion reactions customary in azo dyestuffs, e.g. acylation, condensation, reduction, and metallization. Also in the preparation of other dyestuffs, especially those of the phthalocyanine and anthraquinone series, the condensation of a reactive component (XVI) can first be carried out with an intermediate product, e.g. with m-phenylenediamine or a m-phenylenediamine-sulfonic acid and the resultant reaction product subsequently further condensed, e.g. with bromoamino acid (1-amino-4-bromo-anthraquinone-2-sulfonic acid) to form a reactive anthraquinone dyestuff or with a copper- or nickel-phthalocyanine-sulfonic acid halide to form a reactive phthalocyanine dyestuff.

Another method of preparing the new dyestuff of the formula (XI) consists in that amino group-containing dyestuffs or, in particular, dyestuff intermediates which exhibit an exchangeable hydrogen atom at the amino group, are reacted with compounds of the general formula $$A_1'-(Z)_t$$

(XVII), wherein $A_1'$ is a pyrimdine ring, Z is a radical which can be split off as anion, with the exception of a sulfonyl radical, and $t$ denotes the number 2 or a number greater than 2, while replacing one of the radicals Z which can be split off as an anion, the remaining radical or radicals Z are subsequently converted in known manner into sulfonyl substituents and, if dyestuff intermediates are used, these transformed into the desired end dyestuffs.

The exchange of one or more substituents Z capable of being split off as anion, e.g. of halogen atoms, for sulfonyl substituents can be effected, e.g. by reacting the compounds with alkyl- or alkyl-sulfonates, or if Z represents, for example, an alkylmercapto or arylmercapto group which can be split off as anion, by transforming the latter by means of suitable oxidizing agents such as hydrogen peroxide, hypohalide, or permanganates, into the corresponding sulfonyl radicals.

The dyestuffs (XI), obtainable by the various processes described above, can be subjected, as has already been mentioned for some cases, to further reactions customary for dyestuffs, in that, for example, metallizable dyestuffs are treated with metal-yielding agents, especially chromium, cobalt, copper or nickel salts; dyestuffs containing acylatable groups, especially acylatable amino groups, are acylated; or dyestuffs are subsequently treated with sulfonating agents, such as chlorosulfonic acid, thionylchloride, oleum or $SO_3$ in chlorinated hydrocarbons, in order to introduce further sulfonic acid groups into the products. The last mentioned process is sometimes of particular importance in the series of anthraquinone and phthalocyanine dyestuffs.

Depending on the number of reactive groupings in the dyestuff radical or dyestuff intermediates, preferably —$HNR_1$—groupings ($R_1$ being hydrogen or a substituent such as a lower alkyl group), which are suitable for the conversion, one or more groupings of the formula —X—$A_1$ can be incorporated in the dyestuffs. In the majority of cases, the number $m$ will not exceed 4, but dyestuffs with more than 4, e.g. up to 8 groupings of the formula

especially those of higher molecular structure, can also be synthesized.

If the dyestuffs prepared according to the invention contain groups forming metal complexes, then they can be converted into their metal complex compounds by the action of metal-yielding agents, e.g. copper, nickel, chromium or cobalt salts. They can also be subjected to other customary conversion reactions such as diazotization, coupling, acylation, and condensation.

In the reaction of amino group-containg dyestuffs with reactive component $A_1$—Y of the formula (XVI) one can employ, for example, and in many instances, preferably, aminoazo dyestuffs having the formula

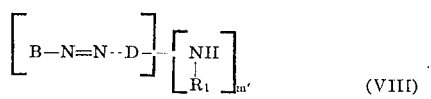

wherein B, D, $R_1$, and $m'$ have the meanings indicated above, aminoanthraquinone dyestuffs having the formula

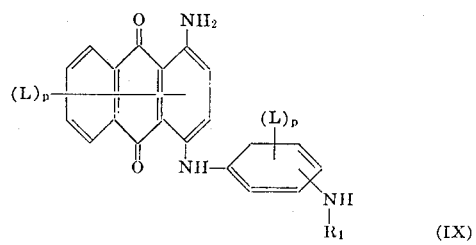

wherein L, $R_1$, and $p$ have the above-indicated meanings, or amino group-containing phthalocyanine dyestuffs having the formula

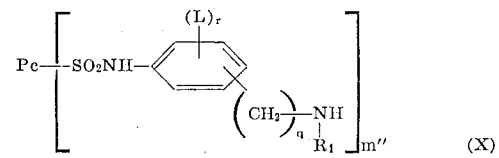

wherein Pc, L, $R_1$, $q$, $r$, and $m''$ have the above-indicated meanings. The resulting condensation products correspond to the general formulas (I) and (XII) for the novel dyestuffs of the present invention. These dyestuffs can be subjected to further reactions of which, in particular, the subsequent sulfation of the anthraquinone and phthalocyanine dyestuffs is frequently of interest. Instead of employing the preformed amino group-containing dyestuffs of formula (VIII), (IX), and (X), amino group-containing precursors for the preparation of these dyestuffs can also be employed. These are first condensed with the reactive component $A_1$—Y and subsequently transformed in known ways to the final dyestuffs. This process of proceeding via the dyestuff intermediate is of particular interest in the preparation of azo dyestuffs, anthraquinone dyestuffs, and phthalocyanine dyestuffs. In the preparation of azo dyestuffs, a diazo and/or coupling component exhibiting a reactive amine group is first condensed with the reactive component (XVI) and subsequently converted into the desired azo dyestuff by coupling. The resulting product can further be post-metallized or diazotized and transformed into a disazo or polyazo dyestuff. In the anthraquinone dyestuff series one can, for example, condense a diaminoaryl compound in which one of the amino grops is protected such as in the form of an acylamino group with a reactive component (XVI) at the second amino group, then transform the protected amino group into a free amino group, for example, through saponification and condense the resulting product with, for example, 1-amino-4-bromo-anthraquinone-2-sulfonic acid to a valueable anthraquinone dyestuff. In the preparation of phthalocyanine dyestuffs one can, similarly as in the anthraquinone dyestuffs, form the mono-condensation product of a reactive component $A_1$—Y with a diaminoaryl compound and subsequently condense such with copper- or nickel-phthalocyanine-sulfonic acid halides while simultaneously or subsequently adding other amino compounds such as ammonia, aliphatic amino compounds and/or aromatic amino compounds. Employing the described method, one obtains phthalocyanine-sulfonamide dyestuffs which contain a certain percentage of sulfonarylamide groups which are bonded to the reactive group and, in addition, a certain percentage of nonreactive sulfonamide groups and/or free sulfonic acid groups.

A particularly valuable class reactive dyestuffs within the scope of the novel dyestuffs of formula (I) has the formula

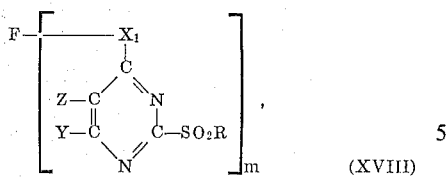

(XVIII)

in which F is an organic dyestuff residue, $X_1$ and amino group, Z a halogen atom, Y hydrogen, an alkyl or a substituted alkyl group, R an aliphatic, carbocyclic or heterocyclic substituent, and in which $m$ is a number from 0.5 to 8. In the dyestuff of the general formula (XVIII) the pyrimidine group is by definition connected by means of an amino group to the dyestuff residue. The amino group can contain further substituents such as lower alkyl (preferably $C_1$ to $C_5$), aralkyl, cycloalkyl or aryl groups, but preferably exists in the unsubstituted form of —NH—.

The amino group is, in turn, directly bonded to an aromatic ring carbon atom of the dyestuff or to an alkylene group.

Reactive sulfonyl substituents —$SO_2R$, located in the 2-position of the pyrimidine ring, include lower alkylsulfonyl groups having, preferably from 1 to 5 carbon atoms, such as methylsulfonyl, ethylsulfonyl, or propylsulfonyl groups, arylsulfonyl groups such as phenylsulfonyl, p-toluylsulfonyl, p-chlorophenylsulfonyl groups; aralkylsufonyl groups such as benzylsulfonyl and p-toluylmethylsulfonyl groups; and also heterosulfonyl groups such as 2-benzothiazolysulfonyl. The reactive sulfonyl substituent or substituents can contain in the aryl, alkyl or hetero residues, additional ionic or nonionic groups such as carboxy, nitro, halogen (Cl, Br), sulfonic acid or sulfonic groups. Preferred halogen atoms Z are chlorine and bromine, and preferred substituents Y, aside from hydrogen include lower alkyl groups such as methyl- and ethyl- and lower substituted alkyl groups such as halogenmethyl groups, for example, monochloromethyl, bromomethyl, dichloromethyl, and trichloromethyl, carboxy methyl groups, carboalkoxy methyl groups such as carbomethoxy methyl and carboethoxy methyl groups, as well as cyano methyl groups.

Suitable pyrimidine components which contain in the 2-position a reactive sulfonyl substituent include, for example, 2-methylsulfonyl-5-chloro-4-primidinyl, 2-methylsulfonyl-5-bromo-4-pyrimidinyl, 2-methylsulfonyl-5-chloro-6-methyl-4-pyrimidinyl, 2-methylsulfonyl-5-bromo-6-methyl-4-pyrimidinyl, 2-methylsulfonyl-5-chloro-6-chloromethyl-4-pyrimidinyl, 2-phenylsulfonyl-5-chloro-4-pyrimidinyl, 2-phenylsulfonyl-5-chloro-6-methyl-4-pyrimidinyl, 2-phenylsulfonyl-5-bromo-6-methyl-4-pyrimidinyl, 2-methylsulfonyl-5-chloro-6-carboxymethyl-4-pyrimidinyl, or 2-carboxymethylsulfonyl-5-chloro-6-methyl-4-pyrimidinyl, as well as those already mentioned on page 4 hereinabove. The dyestuffs of formula (XVIII) can belong to a great variety of classes, e.g. to the series of metal-free or metal-containing mono- or polyazo dyestuffs; metal-free or metal-containing azaporphin dyestuffs such as copper- or nickelphthalocyanine dyestuffs; of the anthraquinone, oxazine, dioxazine, triphenylmethane, nitro, azomethine, benzanthrone, and dibenzanthrone dyestuffs; and polycyclic condensation compounds of anthraquinone, benzanthrone, and dibenzanthrone compounds. Within the range of these dyestuff classes, dyestuffs of the following general formulae are particularly valuable. 1. Azo dyestuffs having the formula

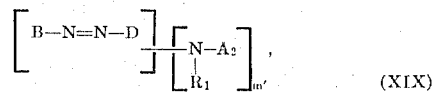

(XIX)

wherein B, D, $R_1$ and $m'$ have the meanings indicated in formula (III) and wherein $A_2$ is a heterocyclic radical having the formula

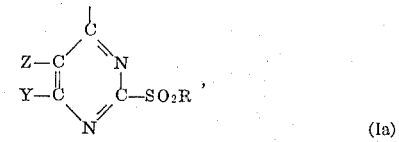

(Ia)

wherein R, Z, and Y have the meanings indicated in formula (XVIII). Preferred radicals (Ia) are, for example, 2-methylsulfonyl-5-chloro-6-methylpyrimidine-(1,3)-yl4 and 2-methylsulfonyl-5-monochloropyrimidine-(1,3)-yl-4, and the corresponding bromo compounds. Especially valuable dyestuffs of this series are those which are water-soluble and, in particular, those containing sulfonic acid and/or carboxylic acid groups. The azo dyestuffs can be metal-free as well as metal-containing, the copper, chromium, and cobalt complexes being the most interesting metal complexes.

Important azo dyestuffs are, for example, those of the benzene-azo-naphthalene, benzene-azo-1-phenyl-5-pyrazole, benzene-azo-aminonaphthalene, naphthalene-azo-naphthalene, naphthalene-azo-1-phenylpyrazolone-5, and stilbene-azo-benzene series, the dyestuffs containing sulfonic acid groups being, again, preferred. In the case of metal complex azo dyestuffs, the groups linked to the metal complex are, preferably, in the o-position to the azo groups, e.g. in the form of o,o′-dihydroxy, o-hydroxy-o′-carboxy, o-carboxy-o′-amino, and o-hydroxy-o′-aminoazo groupings. 2. Anthraquinone dyestuffs having the formula

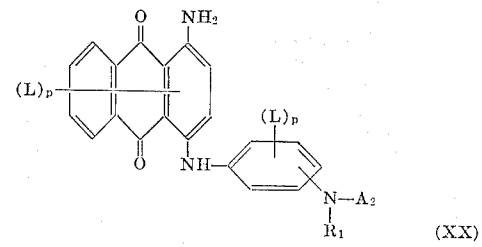

(XX)

wherein L, $p$, and $R_1$ have the meanings indicated in formula (IV) and $A_2$ is a heterocyclic residue having the formula

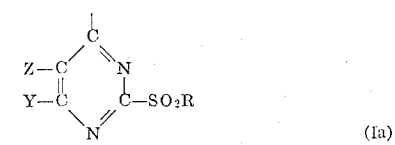

(Ia)

wherein R, Z, and Y have the meanings indicated in formula (XVIII). Preferred radicals (Ia) are, for example, 2-methylsulfonyl-5-chloro6-methylpyrimidine-(1,3)-yl-4 and 2-methylsulfonyl-5-monochloropyrimidine-(1,3)-yl-4, as well as the corresponding bromo compounds.

Also in the range of these dyestuffs, the water-soluble products are preferred because of their excellent suitability for the dyeing and printing of cellulose-containing fibers; the dyestuff substituted by sulfonic acid groups having proved particularly suitable for this purpose.

3. Azaporphin dyestuffs having the formula

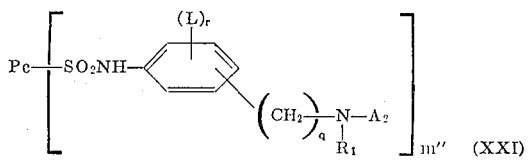

wherein Pc, L, r, q, and $R_1$ have the meanings indicated in formula (V), and $A_2$ in a heterocyclic radical having the formula

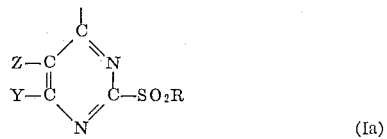

wherein R, Z, and Y have the meanings indicated in formula (XVIII). The phthalocyanine radical Pc can obviously contain further substituents, especially sulfonic acid and sulfonamide groups. Preferred heterocyclic radical (Ia) are, for example 2-methylsulfonyl-5-chloro-6-methylpyrimidine-(1,3)-y-4 and 2-methylsulfonyl-5-monochloropyrimidine-(1,3)-yl-4, as well as the corresponding bromo compounds.

Water-soluble phthalocyanine dyestuffs of the formula (XXI) which are preferred for application to cellulose-containing materials are, particularly, those which carry sulfonic groups in the radical Pc and, optionally, in addition, as the substituent L.

The foregoing discussion of suitable azo, anthraquinone, and azaporphin dyestuffs, as well as the pyrimidine group, is not intended to represent a limitation of the general formula, either in respect to the possibilities of preparing such dyestuffs within the scope of the general formula (XVIII) or with respect to the valuable technical properties of applying these products. The dyestuffs having the formula (XVIII) can, moreover, contain any substituent customary in dyestuffs, such as sulfonic acid, carboxylic acid, and substituted sulfonamide or carbonamide groups, disulfimide groups, N-sulfonyl-N-carbonylimide groups, alkylsulfonic, arylsulfonic, alkylamino, arylamino, aralkylamino, nitro, cyano, halogen, hydroxy, esterified hydroxy groups, alkoxy, thioether, alkyl, aryl, aralkyl, trifluoralkyl, acylamino, azo groups and the like.

The dyestuffs can also contain further groups capable of fixation, such as mono- or dihalotriazinyl-amino, mono-, di-, or tri-halopyrimidinylamino, 2,3-dihaloquinoxaline-6-carbonyl or -6-sulfonylamino, 1,4-dihalophthalizine-6-carbonyl or -6-sulfonylamino, 2-halobenzothiazole-4-carbonyl or -6-sulfonylamino, esterified sulfonic acid-oxalkylamide or oxalkyl-sulfone groups, sulfofluoride, haloalkylamino, acryloylamino, haloacylamino groups, and the like.

The new dyestuffs of the formula (XVIII) are obtained by forming such according to known methods through condensation and/or metallization and/or diazotization and coupling. This is accomplished by introducing into an amino group-containing dyestuff or dyestuff intermediate a pyrimidinylamino group having the formula

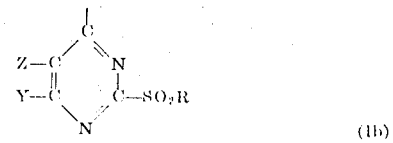

wherein Y, Z, and R have the above-indicated meanings via the nitrogen atom of the amino group which is bonded to a ring carbon atom of the aryl nucleus of the dyestuff or the dyestuff intermediate and transforming such where a dyestuff intermediate is employed into the desired end dyestuff. In order to introduce group (Ib) into amino group-containing dyestuff or dyestuff intermediates which contain a reactive hydrogen on the amino nitrogen, such dyestuff or dyestuff intermediates are condensed with compounds having the general formula

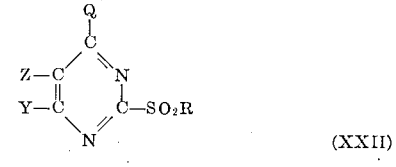

wherein Q is a radical which can be split off as an anion and wherein R, Y, and Z have the above-indicated meanings. Of the reactive substituents Q which can be split off as anionic radicals, chlorine, bromine, and sulfonyl substituents are preferred. Further suitable radicals which can be split off as anions are, for example, F, —$SO_3M$ (M being H or a metal cation), quarternary ammonium groups, alkylmercapto, alkoxy, or aryloxy groups.

Pyrimidine derivatives of the formula (XXII) which are suitable for the reaction are, for example, 2-methysulfonyl-4,5-dichloropyrimidine, 2-methylsulfonyl-4-chloro-5-bromo-pyrimidine, 2-methylsulfonyl-4-chloro-5-bromo-6-methylpyrimidine, 2,4-bis-methylsulfonyl-5-chloropyrimidine, 2,4-bis-methylsulfonyl-5-chloro-6-methylpyrimidine, 2,4-bis-phenylsulfonyl-5-chloro-6-methylpyrimdine, 2-methylsulfonyl-4,5-dichloro-6-chloromethylpyrimidine, 2-methylsulfonyl-4,5-dichloro-6-carboxymethylpyrimidine, or 2-carboxymethylsulfonyl-4,5-dichloro-6-methyl-pyrimidine, as well as those cited on page 11 hereinabove. The reaction of the amino group-containing dyestuffs or dyestuff intermediates with the heterocyclic compounds of the formula (XXII) is carried out, depending on the type of starting compounds employed, in an organic, aqueous-organic, or aqueous medium at temperatures of −10° to +80°C, preferably in the presence of alkaline-condensing agents such as pyridine, aqueous alkali metal carbonate, or alkali metal hydroxide solution.

When dyestuff intermediates are used, the condensation products obtained are converted in known manner into the desired end dyestuffs. This process is mainly of interest for the preparation of azo dyestuffs in that, for example, a diazo and/or coupling component exhibiting a reactive amino group is first condensed with the reactive component (XXII) and the resultant intermediate product is subsequently converted into an azo dyestuff by diazotization, and/or coupling and/or condensation. This azo dyestuff can be subjected to further conversion reactions customary in azo dyestuffs, e.g.

acylation, condensation, reduction, and metallization. Also in the preparation of other dyestuffs, especially those of the phthalocyanine and anthraquinone series, the condensation of a reactive component (XXII) can first be carried out with an intermediate product, e.g. with M-phenylenediamine or a M-phenylene-diamine-sulfonic acid and the resultant reaction product subsequently further consensed, e.g. with bromoamino acid (1-amino-4-bromoanthraquinone-2-sulfonic acid) to form a reactive anthraquinone dyestuff, or with a copper- or nickel-phthalocyanine-sulfonic acid halide to form a reactive phthalocyanine dyestuff.

Another method of preparing the novel dyestuffs of formula (XVII) consists in that amino group-containing dyestuffs or, in particular, dyestuff intermediates which exhibit an exchangeable hydrogen atom at the amino group, are reacted with compounds of the general formula

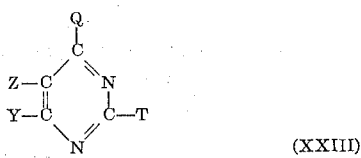

(XXIII)

wherein Y, Z, and Q have the meanings indicated hereinabove and T is a radical which can be split off as an anion with the exception of a sulfonyl radical, while replacing one of the radicals Q which can be split off as an anion, thereafter transforming the radical T in known manner into sulfonyl substituents —$SO_2R$ and, if dyestuff intermediates are employed, transforming such into the desired end dyestuffs.

The exchange of one or more substituents T capable of being split off as an anion, e.g. of halogen atoms, for sulfonyl substituents can be effected, e.g. by reacting the compounds with alkyl or arylsulfonates or, if T represents, for example, an alkylmercapto or arylmercapto group which can be split off as anion, by transforming the latter by means of suitable oxidizing agents such as hydrogen peroxide, hypohalides, or permanganates, into the corresponding sulfonyl radicals.

The dyestuffs obtainable by the various processes described above can be subjected, as has already been mentioned for some cases, to further reactions customary for dyestuffs, in that, for example, methallizable dyestuffs are treated with metal-yielding agents, especially chromium, cobalt, copper or nickel salts; dyestuffs containing reducible groups, especially nitro groups, are reduced; dyestuffs containing acylatable groups, especially acylatable amino groups are acylated; or dyestuffs are subsequently treated with sulfonating agents such as chlorosulfonic acid, thionylchloride, oleum or —$SO_3$ in chlorinated hydrocarbons, in order to introduce further sulfonic acid groups into the products. The latter mentioned process is sometimes of particular importance in the series of anthraquinone and phthalocyanine dyestuffs.

Depending on the number of reactive —$HNR_2$— groups ($R_2$ = hydrogen or a substituent such as a lower alkyl group) in the dyestuff radical or dyestuff intermediates which are suitable for the conversion, one or more groups of the formula (Ib) can be incorporated into the dyestuffs. In the majority of cases, the number m will not exceed 4, but dyestuffs with more than 4, e.g. up to 8 groupings of the formula (Ib), especially those of higher molecular structure, can also be synthesized.

If the dyestuffs prepared according to the invention contain groups forming metal complexes, then they can be converted into their metal complex compounds by the action of metal-yielding agents, e.g. copper, nickel, chromium, or cobalt salts. They can also be subjected to other customary conversion reactions such as diazotization, coupling, acylation, and condensation.

The new dyestuffs are highly valuable products which are suitable for a great variety of applications. As water-soluble compounds they are of special interest for the dyeing of textile materials containing hydroxyl groups or nitrogen, particularly of textile materials of natural and regenerated cellulose, as well as of wool, silk, synthetic polyamide and polyurethane fibers. Due to the reactive sulfonyl substituent or substituents in the heterocyclic ring A, the products are especially suitable as reactive dyestuffs for the dyeing of cellulose materials according to the techniques recently disclosed for this purpose. The fastness properties obtained, particularly the fastness to wet processing, are excellent.

For the dyeing of cellulose, the dyestuffs are preferably used in an aqueous solution which can be mixed with compounds of alkaline reaction, such as alkali metal hydroxide or alkali metal carbonate, or with compounds convertible into substances of alkaline reaction, such as alkali metal bicarbonate. Further adjuvants can be added to the solution, but these must not react with the dyestuffs in an undesirable manner. Additives of this type are, for example, surface-active compounds such as alkyl-sulphates, or compounds preventing migration of the dyestuff, or dyeing auxiliaries, such as urea (for improving the solubility and fixation of the dyestuffs), or inert thickeners, such as oil-in-water emulsions, tragacanth, starch alginate, or methyl cellulose.

The solutions or pastes thus prepared are applied to the material to be dyed, for example, by padding on the foulard (short bath) or by printing, and subsequently heated for some time at an elevated temperature, preferably at 40° to 150°C. Heating can be carried out in the hot flue, in a steaming apparatus, on heated rolls, or by introduction into heated concentrated salt baths, using these methods in any desired sequence or any of them alone.

When a padding or dyeing liquor without alkali is used, the dry goods are subsequently passed through a solution of alkaline reaction to which sodium chloride or Glauber's salt is added. The addition of salt reduces the migration of the dyestuff from the fiber.

The material to be dyed can also be previously treated with one of the above-mentioned acid-binding agents, subsequently treatedwith a solution or paste of the dyestuff and finally fixed, as stated, at an elevated temperature.

For the dyeing from a long bath, the material is introduced into an aqueous solution of the dyestuff (liquor ratio 1:5 to 1:40) at room temperature and dyeing is carried out, possibly while raising the temperature to 85°C, for 40 to 90 minutes with the portionwise addition of salt, e.g. sodium sulphate, and subsequently of alkali, for example, sodium phosphates, sodium carbonate, or alkalis. The chemical reaction between the dyestuff and the fiber thereby occurs. After completion of the chemical fixation, the dyed material is rinsed hot and finally soaped, whereby non-fixed residues of the dyestuff are removed. Dyeings of excellent fastness, especially to wet processing and light, are thus obtained.

In the so-called cold batch -pad process, subsequent heatig can be dispensed with if the padded fabric is stored at room temperature for some time, e.g. for 20 to 40 hours. A stronger alkali is used in this process than in the dyeing process from a long bath described above.

For printing materials containing hydroxyl groups, a printing paste is used which consists of the dyestuff solution, a thickener such as sodium alginate, and a compound of alkaline reaction or splitting off alkali upon heating, such as sodium carbonate, sodium phosphate, potassium carbonate, potassium acetate, or sodium and potassium bicarbonate, and the printed material is rinsed and soaped.

If the dyestuffs contain groups which form metal complexes, the fastness properties of the dyeings and prints can frequently be improved by an after-treatment with metal-yielding agents, such as copper salts, e.g. copper sulphate, chromium, cobalt and nickel salts, such as chromium acetate, cobalt sulphate or nickel sulphate.

Materials containing amide groups, such as wool, silk, synthetic polyamide and polyurethane fibers are generally dyed by the dyeing methods customary for this purpose in the acidic to neutral range, and it is sometimes of advantage finally to raise the pH value of the dyebath, e.g. to pH 6.5 to pH 8.5.

The dyestuffs are applied, for example, to synthetic polyamide fibers in the form of solutions or, preferably, in a dispersed form and subsequently after-treated, possibly together with acid-binding agents, such as sodium carbonate (preferably in smaller amounts). Especially advantageous results are achieved with those dyestuffs which are insoluble or only hardly soluble in water. These are worked up by known methods and with the addition of the known adjuvants into a dyestuff dispersion and applied as such from a dyebath and/or padding liquor, or in a printing paste. Suitable adjuvants for this application are, inter alia, compounds which prevent the migration of the dyestuff on the fibers, such as cellulose ethers, alkali metal chlorides and sulphates, wetting agents, such as condensation products from ethylene oxide and fatty alcohols or phenols, sulphonated fatty alcohols, solvents, such as thiodiglycol, as well as thickening agents, such as starch, tragacanth, alginate thickening, gum arabic, etc.

The after-treatment of the dyeings, impregnations and prints obtained on fabrics of polyamide fibers is preferably carried out at a temperature of 50° to 110° C for a period of 5 to 60 minutes. Also in this case the fastness properties of the dyeings can sometimes be improved, provided the dyestuffs employed contain metal complex-forming groupings, by means of metal-yielding agents, such as copper salts, e.g. copper sulphate, or chromium, cobalt and nickel salts, such as chromium acetate, cobalt sulphate or nickel sulphate.

In general, the dyeings which can be obtained with the new dyestuffs are characterized by good to very good fastness properties, especially by excellent fastness to wet processing.

If compared with known reactive dyestuffs which contain 2,3-dichloroquinoxaline-6-carbonylamino or chloro-triazinylamino or chloro-pyrimidinylamino as the fiber-reactive groups, the novel dyestuffs of the present invention having, for instance, a 2-methylsulfonyl-5-chloro-6-methylpyrimidinyl-4-amino fiber-reactive grouping are far superior in the fastness to washing (in the presence or absence of alkaline substances) and in the fastness to acids (organic and inorganic) of their dyeings on cellulose-containing textiles, such as cotton and regenerated cellulose. In comparison with chloro-triazinylamino and chloro-pyrimidinylamino fiber-reactive dyestuffs the dyestuffs of the present invention exhibit the further advantage that they can be (chemically) fixed when padded on cellulose containing textiles, such as cotton and regenerated cellulose, in much shorter times. Whereas known reactive dyes need about 5 to 8 minutes of heat treatment, the novel dyestuffss can be fixed within about 30 seconds to 1 minute (the fixation is reached by steaming at about 104° to 105° C or thermofixation at about 140° C).

The novel dyestuffs of the present invention are more specifically distinguished from reactive dyestuffs of the prior art by the combination of the heterocyclic group and the reactive sulfonyl group. It is the combination of these chemical moieties which results in the superior properties described in the application. The term "reactive sulfonyl substituent", as used herein, means that the sulfonyl substituent must be attached to a carbon atom of the heterocyclic ring which will not inactivate the sulfonyl group. Thus, sulfonyl substituents attached to the 5-position of the pyrimidinyl ring, such as described in the dyestuffs disclosed in British Pat. No. 822,948, do not react with the hydroxyl groups and similar reactive groups in the fiber compositions, and in the case of the pyrimdinyl group, it is essential that the sulfonyl substituent be located at the 2-, 4-, or 6-position in order for the dyestuffs to react with the fiber composition. Similarly, the properties of the dyestuffs of the present invention are not obtained if the reactive sulfonyl substituent is not attached to the described heterocyclic ring but is attached to, for example, an alkylene radical such as described, for example, in British Pat. No. 921,258. As compared to the dyestuffs of the present invention, the dyestuffs containing the combination of an aliphatic radical and a sulfonyl substituent are deficient in the fastness to hydrolysis in acid or alkaline medium of the fibre-dyestuff bond as well as in their reactivity in the coloring of cellulose-containing or amide group-containing textile materials.

The following examples are given for the purpose of illustrating the invention, the parts being parts by weight, unless otherwise stated.

EXAMPLE 1

To a solution of 34.7 parts of 2-aminonaphthalene-4,8-disulfonic acid sodium salt and 7 parts of sodium nitrite in 300 parts of water are added 28 parts by volume of concentrated hydrochloric acid while cooling with ice, and the mixture is stirred at 0° to 10° C for 30 minutes. After removing the excess nitrous acid, 10.7 parts of 3-aminotoluene dissolved in 10 parts by volume of concentrated hydrochloric acid and 150 parts of water are added, and coupling is completed by neutralizing the mixture to pH 3–5. The resultant aminoazo dyestuff is salted out, filtered off with suction, washed and then redissolved at ph 7 in 700 parts of water with the addition of a sodium hydroxide solution. The aqueous solution is then mixed with 21 parts of 2-methylsulfonyl-4-chloro-6-methyl-pyrimidine and vigorously stirred. The temperature of the reaction mixture is maintained at about 65° c by heating; the liberated hydrochloric acid is neutralized with a sodium carbonate solution, until the reaction is completed. The resultant dyestuff, believed to have the formula

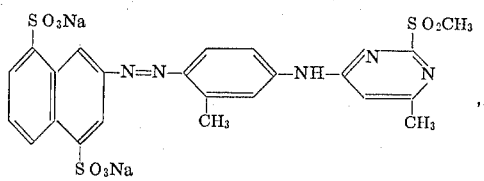

is salted out with 80 parts of sodium chloride, pressed off, washed and dried at about 50° C in a vacuum. It is a yellow powder which dissolves in water, with a yellow color.

When a cellulose fabric is printed with a printing paste which contains, per kilogram, 15 g of the dyestuff, 100 g of urea, 300 ml of water, 500 g of alginate thickener (60 g of sodium alginate per kg thickener), 2 g of sodium hydroxide and 10 g of sodium carbonate, and which has been made up with water to 1 kilogram, the fabric is then dried, steamed at 105° C for 8 minutes, rinsed with hot water, and soaped at the boil, an intense, reddish-yellow print of good fastness to washing and light is obtained.

EXAMPLE 2

The copper complex compound

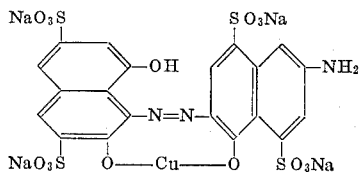

is prepared according to the instructions of German Patent Specification No. 1,117,235 by coupling of diazotized 1-amino-8-(benzene-sulfonyloxy)-napthalene-disulfonic acid-(3,6) in a soda-alkaline medium with the equivalent amount of 2-acetylamino-5-hydroxynapthalene-disulfonic acid-(4,8), conversion of the monoazo compound into the copper complex by oxidative coppering, and hydrolysis of the acetyl and benzene-sulfonyl group. This complex, 0.1 mol, is dissolved at pH 6–6.5 in 2500 parts by volume of water at 60° to 65° C and mixed at this temperature with 0.12 mol of 2,4-bis-methylsulfonyl-6-methyl-pyrimidine.

A pH of 7–7.5 is maintained during the condensation by the addition of a sodium carbonate solution. When the reaction is completed, the dyestuff is salted out and isolated. When dried, the dyestuff is a dark powder which dissolves in water, with a blue color.

A cotton fabric, 100 parts, is treated on the foulard at room temperature with an aqueous solution containing 2% of the dyestuff, 15 g/liter of sodium bicarbonate and 150 g/liter of urea, subjected to intermediate drying, heated at 140° C for 10 minutes, then rinsed and soaped at the boil. The fabric is dyed in very clear blue shades fast to wet processing.

EXAMPLE 3

The monoazo dyestuff obtained following the procedure of Example 1 by coupling diazotized 2-aminonapthalene-4,8-disulfonic acid with 3-methylamino-toleune, 46 parts, is dissolved at pH 7–8 in 400 parts of water at 60° to 65° C, the solution is mixed portionwise with a total of 25 parts of 2,4-bis-methylsulfonyl 6-methyl-pyrimidine in the presence of excess sodium acetate or calcium carbonate and stirred at the same temperature, until acidification of a sample no longer leads to a change of color. The resultant dyestuff, believed to have the formula

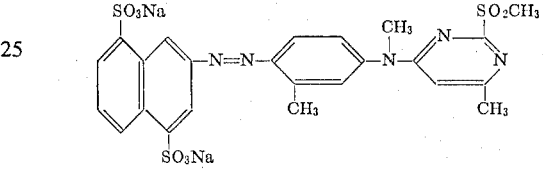

is salted out, filtered off with suction, washed and dried.

A cotton fabric is impregnated with a solution at 20° to 25° C, which contains, per liter of liquor, 20 g of the above dyestuff and 0.5 g. of a non-ionic wetting agent (e.g. a polyoxethylated oleyl alcohol) as well as 150 g of urea and 15 g of sodium bicarbonate. The fabric is subsequently squeezed between two rubber rollers to a moisture content of about 100%. After an intermediate drying at 50° to 60° c, the fabric is heated at 140° C for 10 minutes and the dyeing thus obtained is thoroughly rinsed with hot water and treated for 20 minutes at the boil with a solution containing, per liter, 5 g of Marseilles soap and 2 g of sodium carbonate. After rinsing and drying, an intense, reddish-yellow shade of good fastness to wet processing, rubbing, and light is obtained.

The following Table gives the diazo components, coupling, and the reactive components which can be linked to the amino group, from which dyestuffs can be synthesized in analogy with Examples 1–3; the shades obtained by one of the methods of application described above are also specified in the Table.

|  | Abbreviations for the reactive components: | A: | 2-methylsulfonyl-4-chloro-6-methyl-pyrimidine |
|---|---|---|---|
|  |  | B: | 2,4-bis-methylsulfonyl-6-methyl-pyrimidine |

| Example No. | Diazo component | Coupling component | Reactive component | Shade |
|---|---|---|---|---|
| 4 | 2-aminonaphthalene-4,8-disulfonic acid | 1-amino-2-methoxy-5-methylbenzene | A | yellow |
| 5 | do. | do. | B | do. |
| 6 | 1-aminonaphthalene-3,6-disulfonic acid | 1-amino-3-methylbenzene | A | do. |
| 7 | do. | do. | B | do. |
| 8 | 2-aminonaphthalene-5,7-disulfonic acid | 1-amino-3-methylbenzene | A | do. |
| 9 | do. | do. | B | do. |
| 10 | 2-aminonaphthalene-6,8-disulfonic acid | 1-amino-3-methylbenzene | A | do. |
| 11 | do. | do. | B | do. |

—Continued

| | Abbreviations for the reactive components: | A: | 2-methylsulfonyl-4-chloro-6-methyl-pyrimidine |
| --- | --- | --- | --- |
| | | B: | 2,4-bis-methylsulfonyl-6-methyl-pyrimidine |

| Example No. | Diazo component | Coupling component | Reactive component | Shade |
| --- | --- | --- | --- | --- |
| 12 | 4-aminoazobenzene-3,4'-disulfonic acid | 1-amino-3-methylbenzene | A | brown-yellow |
| 13 | 1-aminobenzene-4-sulfonic acid 1-aminonaphthalene-6-sulfonic acid | 1-amino-3-methylbenzene | B | brown-yellow |
| 14 | 2-(3'-sulfo-4'-aminophenyl)-6-methyl-benzothiazole-7-sulfonic acid | do. | A | yellow |
| 15 | 2-aminonaphthalene-4,8-disulfonic acid | 1-methylamino-3-methoxybenzene | B | do. |
| 16 | do. | 1-amino-3-acetylamino-benzene | A | do. |
| 17 | do. | aniline | A | do. |

The examples presented in the foregoing tubular form are repeated using instead of the 2-methyl-sulfonyl-4-chloro-6-methyl-pyrimidine, equivalent amounts of 2-methyl-sulfonyl-4,5-dichloro-6-methyl-pyrimidine and instead of the 2,4-bis-methyl-sulfonyl-6-methyl-pyrimidine, equivalent amounts of 2,4-bis-methyl-sulfonyl-5-chloro-6-methyl-pyrimidine. The corresponding reactive dyestuffs containing the 5-chloro-pyrimidine groups are obtained and are employed with the same results in the described procedures.

EXAMPLE 18

Into a solution of 36.5 parts of the sodium salt of 1-amino-8-hydroxy-naphthalene-3,6-disulfonic acid in 100 parts of water are introduced with good stirring at 50° to 60° C,, 25 parts of 2,4-bis-methysulfonyl-6-methyl-pyrimidine and the reaction mixture is stirred, while continuously neutralizing the liberated hydrochloric acid to pH 6–7, until free amino groups can no longer be detected. The dyestuff intermediate thus obtained is coupled, after dilution with 600 parts of water and addition of 12 parts of sodium carbonate, at 5° to 10° C, with 17.5 parts of diazotized 2-aminobenzene-sulfonic acid dissolved in 200 parts of water. The dyestuff of the formula

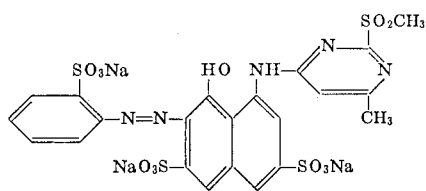

formed at a final pH of about 7, is salted out with 100 parts of sodium chloride, filtered off with suction, washed and dried at 30° to 40° C in a vacuum. The dyestuff forms small red needles of metallic luster which readily dissolve in water, with a red color.

When a fabric of cotton or regenerated cellulose is dyed or printed with this dyestuff according to the process described in Example 1, clear bluish-red shades and prints of good fastness to wet processing, rubbing, and light are obtained.

Equally good results are obtained according to the following process.

Cotton skein, 50 g, is dyed in 1 liter of a dyebath which contains 1.5 g of the above dyestuff, by raising the temperature within 30 minutes from 20 C to about 80° C while adding a total of 50 g of sodium chloride in several portions, subsequently adding 20 g of sodium carbonate and treating the material at this temperature for 60 minutes. After rinsing, soaping at the boil, and drying, a bluish-red shade of good fastness to wet processing, rubbing, and light is obtained.

The foregoing example is repeated employing instead of the 2,4-bis-methyl-sulfonyl-6-methyl-pyrimidine, equivalent amounts of 2,4-bis-methyl-sulfonyl-5-chloro-6-methyl-pyrimidine. The corresponding reactive dyestuff containing the 5-chloro-pyrimidine group is obtained and is employed with the same results in the described procedures.

The following Table gives the shades of further dyestuffs which are synthesized from the diazo components, coupling components, and reactive components which can be linked to the amino group in the coupling component employing the procedure of Example 18, or also by reacting the corresponding aminoazo dyestuffs with the reactive components, and which can be applied to cellulose materials by dyeing or printing according to one of the processes described above.

The abbreviations for the reactive components A and B have been defined in Examples 4–17.

| Example No. | Diazo Component | Coupling component | Reactive component | Shade |
| --- | --- | --- | --- | --- |
| 19 | 1-aminobenzene-2-sulfonic acid | 1-amino-8-hydroxy-napthalene-3,6-disulfonic acid | B | red |
| 20 | aminobenzene | 1-(3'-aminobenzyl-amino)-8-hydroxy-napthalene-3,6-disulfonic acid | A | do. |
| 21 | do. | do. | B | do. |

— Continued

| Example No. | Diazo Component | Coupling component | Reactive component | Shade |
|---|---|---|---|---|
| 22 | 1-amino-2-carboxybenzene-4-sulfonic acid | 1-amino-8-hydroxy-napthalene-3,6-disulfonic acid | A | do. |
| 23 | 1-amino-4-methylbenzene-2-sulfonic acid | do. | A | do. |
| 24 | 1-amino-31-amino-3-acetylamino benzene-6-sulfonic acid | do. | B | do. |
| 25 | 1-amino-3-(2'-[4''-sulfophenylamino]-4'-chloro-triazine-1',3',5'-yl-6')-aminobenzene-6-sulfonic acid | do. | A | do. |
| 26 | 1-aminobenzene-2-sulfonic acid sulfonic acid | 2-amino-5-hydroxy-napthalene-7- | A | orange |
| 26a | 1-amino-3-(2'-[4''-sulfo-phenylamino]-4'methylamino-triazine-1',3',5'-yl-6')-aminobenzene-6-sulfonic acid | 2-amino-5-hydroxy-naphthalene-7-sulfonic acid | A | do. |
| 27 | 1-aminobenzene-2-sulfonic acid | 2-methylamino-5-hydroxy-napthalene-7-sulfonic acid | A | orange |
| 28 | 1-amino-4-acetyl-amino-6-sulfonic acid | do. | A | scarlet |
| 29 | do. | 2-amino-5-hydroxy-naphthalene-7-sulfonic acid | A | do. |

The examples presented in the foregoing tabular form are repeated using instead of the 2-methyl-sulfonyl-4-chloro-6-methyl-pyrimidine, equivalent amounts of 2-methyl-sulfonyl-4,5-dichloro-6-methyl-pyrimidine, and instead of the 2,4-bis-methyl-sulfonyl-6-methyl-pryimidine, equivalent amounts of 2,4-bis-methyl-sulfonyl-5-chloro-6-methyl-pyrimidine. The corresponding reactive dyestuffs containing the 5-chloro-pyrimidine group are obtained and are employed with the same results in the described procedures.

EXAMPLE 30

Into a solution of 21 parts of the sodium salt of 1,3-diaminobenzene-6-sulfonic acid in 100 parts of water are introduced, with good stirring, 25.0 parts of 2-methylsulfonyl-4-chloro-6-methyl-pyrimidine and the mixture is stirred at 60° to 65° C, while continuously neutralizing the liberated hydrochloric acid to pH 7-8, until diazotization of a sample and coupling with 1-hydroxynapthalene-4-sulfonic acid yields a clear yellowish-red coloration. After the addition of ice, the resultant dyestuff intermediate is directly diazotized with 7 parts of sodium nitrite and 28 parts of concentrated hydrochloric acid and the product is subsequently added to a solution of 47 parts of the sodium salt of 1-benzoylamino-8-hydroxy-naphthalene-3,6-disulfonic acid and 12 parts of sodium carbonate in 200 parts of water, whereupon coupling takes place, giving the dyestuff of the formula

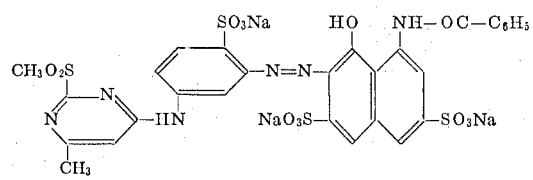

which is salted out, filtered off with suction, washed and dried at 30° to 40° C in a vacuum. The dyestuff readily dissolves in water, with a red color, and yields clear bluish-red shades, and prints on cellulose materials by one of the processes described above.

The foregoing example is repeated employing instead of the 2-methyl sulfonyl-4-chloro-6-methyl-pyrimidine, equivalent amounts of 2-methyl sulfonyl-4,5-chloro-6-methyl-pyrimidine. The corresponding reactive dyestuff containing the 5-chloro-pyrimidine group is obtained and is employed with the same results in the described procedures.

The following Table gives the shades and the pH value of the coupling medium of dyestuffs which are prepared by following the procedure of Example 30 from a diazo component containing a further, preferably acylatable, amino group, a coupling component and a reactive component which can be linked to the diazo component. The processes described above can be used for dyeing and printing of cellulose materials with the dyestuffs of the Table below.

Abbreviations for the reactive components A and B have been defined in Examples 4–17.

| Example No. | Diazo component | Coupling Component | Reactive component | pH of coupling medium | Shade |
|---|---|---|---|---|---|
| 31 | 1,3-diaminobenzene-4-sulfonic acid | 2-aminonaphthalene-5,7-disulfonic acid | A | 4–5 | orange |
| 32 | do. | 2-aminonaphthalene-3,6-disulfonic acid | A | 4–5 | do. |
| 33 | do. | 2-aminonaphthalene-6-sulfonic acid | B | 4–5 | do. |
| 34 | do. | 2-N-methylamino-8-hydroxynaphthalene-6-sulfonic acid | A | 4–5 | do. |
| 35 | do. | 1-(3',5'-dichloro-1',2'-thiazole-4'-carbon-amido)-8-hydroxynaphtha-lene-3,6-disulfonic acid | A | 7–8 | red |

| Example No. | Diazo component | Coupling Component | Reactive component | pH of coupling medium | Shade |
|---|---|---|---|---|---|
| 36 | 1,3-diaminobenzene-4-sulfonic acid | 1-(2',4'-dihydroxy-triazine-1',3',5',-yl-6'-amino)-8-hydroxy-naphthalene-3,6-disulfonic acid | B | 7–8 | red |
| 37 | do. | 1-(3',5'-dichloro-1',2'-thiazole-4'-carbon-amido)-8-hydroxynaphthalene-3,6-disulfonic acid | A | 7–8 | do. |
| 38 | do. | 2-hydroxynaphthalene-3,6-disulfonic acid | A | 8 | scarlet |
| 39 | do. | 1-acetylamino-8-hydroxy-naphthalene-3,6-disulfonic acid | B | 7–8 | red |
| 40 | do. | 1-(3'-sulfophenyl)-3-methyl-pyrazolone-5 | A | 6 | yellow |
| 41 | do. | 1-(2',5'-dichloro-4'-sulfophenyl)-3-methyl-pyrazolone-5 | A | 6 | yellow |
| 42 | do. | 1-(5',7'-disulfonaphthyl-2'-)-3-methyl-pyrazolone-5 | A | 6 | yellow |
| 43 | do. | 1-(3'-sulfophenyl)-3-methyl-5-aminopyrazole | B | 6 | do. |
| 44 | 1,4-diaminobenzene-3-sulfonic acid | 2-amino-8-hydroxynaphthalene-6-sulfonic acid | A | 4–4.5 | red |
| 45 | do. | 2-acetylamino-5-hydroxy-naphthalene-7-sulfonic acid | A | 6–7 | scarlet |
| 46 | do. | 1-acetylamino-5-hydroxy-naphthalene-7-sulfonic acid | B | 6–7 | red |

The examples presented in the foregoing tabular form are repeated using instead of the 2-methyl-sulfonyl-4-chloro-6-methyl-pyrimidine, equivalent amounts of 2-methyl-sulfonyl-4,5-dichloro-6-methyl-pyrimidine and, instead of the 2,4-bis-methyl-sulfonyl-6-methyl-pyrimidine, equivalent amounts of 2,4-bis-methyl-sulfonyl-5-chloro-6-methyl-pyrimidine. The corresponding reactive dyestuffs containing the 5-chloropyrimidine group are obtained and are employed with the same results in the described procedures.

EXAMPLE 47

The dyestuff of the formula

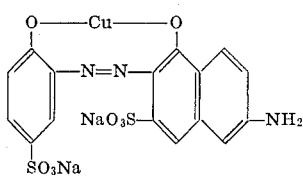

is obtained by diazotizing 1-hydroxy-2-aminobenzene-4-sulfonic acid and coupling with 2-amino-5-hydroxynaphthalene-7-sulfonic acid in water/pyridine in the presence of sodium carbonate, followed by treatment with a copper-yielding agent. In 1500 parts of water at pH 7 is dissolved 51.6 parts of this dyestuff and 25.0 parts of 2-methyl-sulfonyl-4-chloro-6-methyl-pyrimidine at 60° to 65°C with good stirring. The liberated hydrochloric acid is continuously neutralized to pH of 7–8 with a sodium carbonate solution. When free amino groups can no longer be detected, the resultant reactive dyestuff of the formula

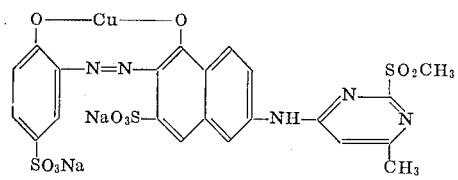

is salted out, pressed off, washed and dried in a vacuum at 30° to 40°C. Fabrics of cellulose materials can be dyed or printed with this dyestuff by one of the processes described above, in ruby shades fast to wet processing, rubbing, and light.

The foregoing example is repeated employing instead of the 2-methyl-sulfonyl-4-chloro-6-methyl-pyrimidine, equivalent amounts of 2-methyl-sulfonyl-4,5-dichloro-6-methylpyrimidine. The corresponding reactive dyestuff containing the 5-chloro-pyrimidine group is obtained and is employed with the same results in the described procedures.

The following Table gives the heavy metal complexes of further aminoazo dyestuffs and the reactive components linked to the amino group, as well as the shades of these dyestuffs on cellulose materials. The preparation of the amino dyestuffs and of their metal complexes, and the reaction of the latter with the reactive components can be carried out according to the procedures of Example 47.

Reactive components A and B are defined as in Examples 4–17.

| Example No. | Aminoazo (shown in terms of dyestuff components coupled) | Complex linked heavy metal | Reactive component | Shade |
|---|---|---|---|---|
| 48 | 1-hydroxy-2-aminobenzene-4,6-disulfonic acid → 2-amino-5-hydroxy-naphthalene-7-sulfonic acid | Cu | A | ruby |
| 49 | 1-hydroxy-2-aminobenzene-4-sulfonic acid → 2-ethylamino-5-hydroxy-naphthalene-7-sulfonic acid | Cu | A | ruby |
| 50 | 1-amino-2-hydroxy-6-nitro-naphthalene-4-sulfonic acid → 2-amino-5-hydroxy-naphthalene-7-sulfonic acid | Cu | A | ruby |
| 51 | do. | Cr | A | greenish grey |
| 52 | 1-amino-2-hydroxy-6-nitronaphthlene-4-sulfonic acid → 1-amino-8-hydroxy-naphthalene-4-sulfonic acid | Co | B | reddish black |
| 53 | 1-amino-2-hydroxy-5-methylsulfonyl-benzene → 1-amino-8-hydroxy-naphthalene-3,6-disulfonic acid | Cu | A | violet |
| 54 | do. | Co | A | grey |
| 55 | do. | Cr | A | greenish black |
| 56 | 1-amino-2-methylbenzene-4-sulfonic acid → 1-amino-2-hydroxy-5-methylbenzene → 1-amino-8-hydroxynaphthalene-4,6-disulfonic acid | Cu | B | blue |
| 57 | 1-amino-2-methylbenzene-4-sulfonic acid → 1-amino-2-hydroxy-5-methylbenzene → 1-amino-8-hydroxynaphthalene-4,6-disulfonic acid | Co | B | grey |
| 58 | do. | Cr | A | greenish black |
| 59 | (1-amino-2-chlorobenzene-4-sulfonic acid → 1-hydroxy-2-acetylaminobenzene), hydrolysed, → 1-amino-8-hydroxy-naphthalene-3,6-disulfonic acid | Cu | A | navy blue |
| 60 | do. | Co | A | grey |
| 61 | 1-amino-8-hydroxynaphthalene-4-sulfonic acid ← 1-hydroxy-2,6-diaminobenzene-4-sulfonic acid → 1,3-dihydroxybenzene | Co | A | black |
| 62 | 1-amino-8-hydroxynaphthalene-3,6-disulfonic acid ← 1-hydroxy-2,6-diaminobenzene-4-sulfonic acid → -2-hydroxy-naphthalene | Co | A | do. |
| 63 | 1-amino-8-hydroxynaphthalene-4-sulfonic acid ← 1-hydroxy-2,6-diaminobenzene-4-sulfonic acid → 3-methyl-pyrazolone-(5) | Co | A | do. |

The examples presented in the foregoing tabular form are repeated using instead of the 2-methyl-sulfonyl-4-chloro-6-methyl-pyrimidine, equivalent amounts of 2-methyl-sulfonyl-4,5-dichloro-6-methyl-pyrimidine and, instead of the 2,4-bis-methyl-sulfonyl-6-methyl-pyrimidine, equivalent amounts of 2,4-bis-methyl-sulfonyl-5-chloro-6-methyl-pyrimidine. The corresponding reactive dyestuffs containing the 5-chloropyrimidine group are obtained and are employed with the same results in the described procedures.

EXAMPLE 64

The copper-phthalocyanine tetrasulfochloride freshly prepared in the usual manner by the reaction of chlorosulfonic acid and thionyl chloride with copper-phthalocyanine, or of the isomeric copper-phthalocyanine tetrasulfochloride synthesized from 1-sulfobenzene-3,4-dicarboxylic acid via the corresponding copper-phthalocyanine tetrasulfonic acid, 96 parts (referred to 100% goods), are suspended in the form of the moist, thoroughly washed filter cake in 500 parts of water and 500 parts of ice, a solution of 50 parts of the sodium salt of 1,3-diaminobenzene-4-sulfonic acid in 500 parts of water, is added and the pH is adjusted to 8.5 with sodium carbonate. The suspension is stirred at room temperature for 24 hours, while maintaining a constant pH of 8.5 by the continuous addition of sodium carbonate. The resultant condensation product is precipitated at pH 1–2 by the addition of sodium chloride, filtered off with suction, washed, and then redissolved neutral in 1000 parts of water. 71 Parts of 2,4-bis-methyl-sulfonyl-6-methyl-pyrimidine are introduced into the blue solution with intense stirring, and the reaction mixture is stirred at 60° to 65°C while continuously neutralizing it to pH 7–8 by means of a sodium carbonate solution, until free amino groups can no longer be detected. The reactive dyestuff of the formula

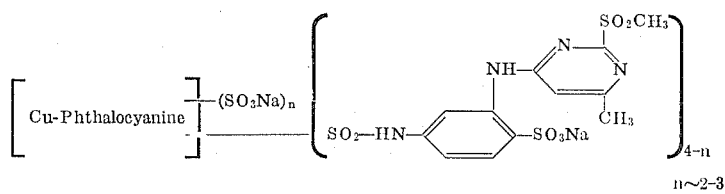

thus obtained is salted out, washed and dried at 30° to 40°C in a vacuum. It is a dark blue powder which dissolves in water, with a blue color, and dyes cotton and regenerated cellulose by one of the dyeing or printing processes described above in clear blue shades of good fastness to wet processing, rubbing, and light.

Instead of 96 parts of copper-phthalocyanine tetrasulfochloride, there can also be used 87 parts (referred to 100% goods) of the copper- or nickel-phthalocyanine trisulfochloride obtainable by the reaction of chlorosulfonic acid with copper- or nickel-phthalocyanine, in the form of the moist filter cake thoroughly washed with ice water, the procedure being otherwise the same as in Example 64; reactive dyestuffs yielding clear blue shades are thus likewise obtained.

When the proceduree described in Example 64 is followed, except employing 87 parts of copper-phthalocyanine tri-sulfochloride and using 90 parts of the sodium salt of 4,4'-diaminodiphenyl-2,2'-disulfonic acid or 90 parts of the sodium salt of 4,4''-diamino-stilbene-2,2'-disulfonic acid, instead of 50 parts of the sodium salt of 1,3-diaminobenzene-4-sulfonic acid, reactive dyestuffs are again obtained which dye cellulose materials by one of the processes described above in clear blue shades fast to wet processing, rubbing, and light.

When 4',4'',4''', 4''''-tetraphenyl-Cu-phthalocyanine is used as starting material, sulfochlorination and reaction with 1,3-phenylene-diamine-4-sulfonic acid, followed by acylation with 2,4-bis-methyl-sulfonyl-6-methyl-pyrimidine yield a reactive dyestuff which dyes cellulose materials in the presence of acid-binding agents in clear green shades fast to wet processing and light.

The foregoing example is repeated employing instead of the 2,4-bis-methyl-sulfonyl-6-methyl-pyrimidine, equivalent amounts of 2,4-bis-methyl-sulfonyl-5-chloro-6-methyl-pyrimidine. The corresponding reactive dyestuff containing the 5-chloro-pyrimidine group is obtained and is employed with the same results in the described procedures.

EXAMPLE 65

The amino-anthraquinone dyestuff obtained by reacting 1-amino-4-bromo-anthraquinone-2-sulfonic acid with an excess of 4,4'-diamino-diphenyl-2,2'-disulfonic acid, 71 parts, is dissolved in 700 parts of water; 25 parts of 2-methyl-sulfonyl-4-chloro-6-methyl pyrimidine are added at 60° to 65°C with good stirring, and a pH of 7–7.5 is maintained by the continuous addition of a sodium carbonate solution. When amino groups can no longer be detected, the resultant dyestuff of the formula

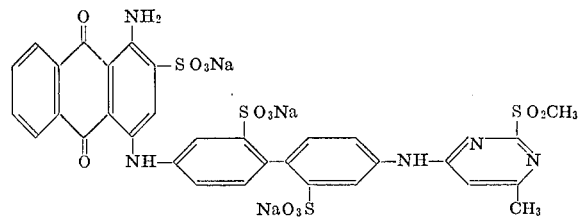

is salted out, filtered off with suction, washed and dried at 30° to 40°C in a vacuum. The dyestuff dyes cotton and regenerated cellulose by one of the processes described above in blue shades fast to wet processing, rubbing, and light.

Following the procedure of Example 65 but using instead of the 71 parts of the starting dyestuff there employed, equivalent amounts of one of the following derivatives of 1-amino-4-(aminoarylamino)-anthraquinone-2-sulfonic acid, similar dyestuffs are obtained, which likewise yield blue shades with fastness properties similar to those of the dyestuff obtained above: 1-amino-4-(4'-amino-2'-sulfophenylamino)-anthraquinone-2-sulfonic acid, 1-amino-4-(4'-aminophenylamino)-anthraquinone-2,6-disulfonic acid, isomer mixture of 1-amino-4-(4'-aminophenylamino)-anthraquinone-2,5- and -2,8-disulfonic acid, isomer mixture of 1-amino-4-(4'-amino-2'-sulfophenylamino)-anthraquinone-2,5- and -2,8-disulfonic acid, isomer mixture of 1-amino-4-(3'-aminophenylamino)-anthraquinone-2,5- and -2,8-disulfonic acid, 1-amino-4-(3'-aminophenylamino)-anthraquinone-2,6-disulfonic acid, 1-amino-4-(3'-amino-4'-sulfophenylamino)-anthraquinone-2-sulfonic acid. With 1-amino-4-(4'-[4''-amino-2''-sulfophenyl]aminophenyl)-anthraquinone-2,6-disulfonic acid there are obtained reactive dyestuffs which dye in bluish-grey shades.

The foregoing example is repeated employing instead of the 2-methyl-sulfonyl-4-chloro-6-methyl-pyrimidine, equivalent amounts of 2-methyl-sulfonyl-4,5-dichloro-6-methyl-pyrimidine. The corresponding reactive dyestuff containing the 5-chloropyrimidine group is obtained and is employed with the same results in the described procedures.

EXAMPLE 66

Employing the procedure of Example 47, but using instead of the copper-containing amino-monoazo dyestuff there employed, the equivalent amount of the chromium complex of the aminoazo dyestuff obtained by coupling diazotized 1-amino-2-hydroxy-3-chlorobenzene-5-sulfonic acid with 1-[3'-(3''-aminophenyl)]-sulfonylimido-sulfophenyl-3-methyl-pyrazolone-(5), a reactive dyestuff is obtained which dyes cellulose materials by one of the processes described above in yellow-brown shades of good fastness to wet processing, rubbing, and light.

The foregoing example is repeated employing instead of the 2-methyl-sulfonyl-4-chloro-6-methyl-pyrimidine, equivalent amounts of 2-methyl-sulfonyl-4,5-dichloro-6-methylpyrimidine. The corresponding reactive dyestuff containing the 5-chloro-pyrimidine group is obtained and is employed with the same results in the described procedures.

EXAMPLE 67

In 3000 parts by volume of water is dissolved at a pH 6, 0.1 mol of the copper complex compound of the formula

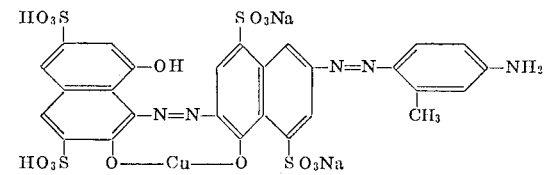

and the solution is combined at a temperature of about 60°C, while stirring, with 21 parts (0.1 mol) of 2-methyl-sulfonyl-4-chloro-6-methyl-pyrimidine. The mixture is stirred, until the condensation is completed, the dyestuff is separated by the addition of a little sodium chloride, and isolated. The residue is washed with acetone and dried at room temperature under reduced pressure. A dark powder is obtained which dissolves in water, with a green color, and dyes cotton by the methods described in Examples 1–3, in green shades.

A cotton fabric is impregnated with a solution at 20° to 25°C which contains, per liter of liquor, 25 g of the above dyestuff and 0.5 g of a non-ionic wetting agent (e.g. a polyoxethylated oleyl alcohol), 150 g of urea and 20 g of sodium carbonate. The fabric is subsequently squeezed between two rubber rollers to a moisture content of about 100%. After an intermediate drying at 50° to 60°C, the fabric is heated at 140°C for 10 minutes, the dyeing thus obtained is thoroughly rinsed with hot water and treated at the boil for 20 minutes with a solution containing, per liter, 5 g of Marseilles soap and 2 g of sodium carbonate. After rinsing and drying, a green shade of good fastness to wet processing, rubbing, and light is obtained.

Clear green shades of good fastness properties are also obtained on cellulose materials by one of the other dyeing or printing processes described in Examples 1–3, 18, and 20.

The foregoing example is repeated employing instead of the 2-methyl-sulfonyl-4-chloro-6-methyl-pyrimidine, equivalent amounts of 2-methyl-sulfonyl-4,5-dichloro-6-methyl-pyrimidine. The corresponding reactive dyestuff containing the 5-chloropyrimidine group is obtained and is employed with the same results in the described procedures.

EXAMPLE 68

The paste of the aminoazo compound of the formula

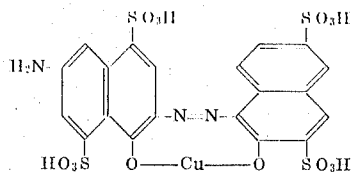

0.1 mol, which is obtained by coupling the diazonium compound from 6-acetamino-2-aminonaphthalene-4,8-disulfonic acid with 2-hydroxynaphthalene-3,6-disulfonic acid, hydrolysis and conversion of the monoazo compound into the copper complex, is dissolved at pH 6.5 in 2000 parts by volume of water and combined with 25 parts of 2,4-bis-methyl-sulfonyl-6-methylpyrimidine. The reaction mixture is stirred at 60° to 65°C, until the condensation is completed, while maintaining the pH of the reaction solution at 7–7.5 by the addition of sodium carbonate. When the reaction is completed, the dyestuff is salted out, isolated and dried in a vacuum.

The dry dyestuff is a dark powder which dissolves in water, with a violet color, and dyes cotton in the presence of alkali in bluish-violet shades.

The foregoing example is repeated employing instead of the 2,4-bis-methyl-sulfonyl-6-methyl-pyrimidine, equivalent amounts of 2,4-bis-methyl-sulfonyl-5-chloro-6-methyl pyrimidine. The corresponding reactive dyestuff containing the 5-chloro-pyrimidine group is obtained and is employed with the same results in the described procedures.

EXAMPLE 69

An aqueous solution of 0.1 mol of the copper complex of the formula

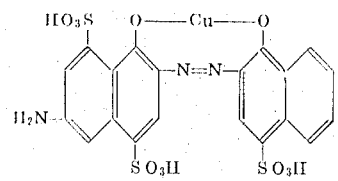

prepared according to the instructions of German Patent Specification No. 1,061,460 or 1,085,988, is reacted in the usual manner with 22 parts of 2-methyl-sulfonyl-4-chloro-6-methylpyrimidine. A pH of 7–7.5 is maintained by the addition of sodium carbonate, and when the reaction is completed, the dyestuff is isolated by salting out. In the dry state, the dyestuff is a dark powder which dissolves in water, with a violet color. Cotton fabrics are dyed in violet shades fast to light and to wet processing.

The foregoing example is repeated employing instead of the 2-methyl-sulfonyl-4-chloro-6-methyl-pyrimidine, equivalent amounts of 2-methyl-sulfonyl-4,5-dichloro-6-methyl-pyrimidine. The corresponding reactive dyestuff containing the 5-chloropyrimidine group is obtained and is employed with the same results in the described procedures.

EXAMPLE 70

In 150 parts of water are dissolved 27.5 parts of 2-methylamino-5-hydroxynaphthalene-7-sulfonic acid sodium salt, the solution is mixed with 25 parts of 2,4-bis-methylsulfonyl-6-methyl-pyrimidine and stirred at 50° to 55°C, while continuously neutralizing the methane-sulfinic acid formed with a total of 34 parts by volume of a 16% sodium carbonate solution. The acylation is completed after a short time; the pH is 6 and changes no more.

Sodium bicarbonate, 30 parts, is then added and the diazo suspension prepared from 34 parts of the disodium salt of 2-aminonaphthalene-1,7-disulfonic acid in 200 parts of water is added dropwise at 20°C within 15 minutes. The orange-colored reactive dyestuff of the formula

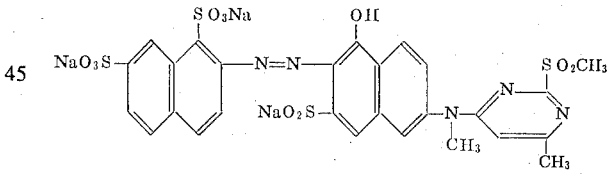

which is immediately formed, is completely separated, after further stirring for one hour, by the addition of 80 parts of sodium chloride, filtered off, washed with a dilute sodium chloride solution, and dried at 35°C in a vacuum. The dyestuff dyes cellulose materials by the processes described above in reddish-orange shades of very good fastness to wet processing and good fastness to chlorine.

When equivalent amounts of 2-methyl-sulfonyl-4,5-dichloro-6-methyl-pyrimidine are used in this example instead of 25 parts of 2,4-bis-methyl-sulfonyl-6-methyl-pyrimidine, a reactive dyestuff is obtained which dyes in orange shades and whose dyeing properties correspond to those of the reaction product of the bis-methyl-sulfonyl derivative.

Orange to red reactive dyestuffs are obtained in an analogous manner by acylating the aminonaphtholsulfonic acids listed in Column 3 of the following Table with 2,4-bis-methyl-sulfonyl-5-chloro-6-methylpyrimidine, or 2-methylsulfonyl-4,5-dichloro-6-methylpyrimidine, and coupling the acylamino-naphtholsulfonic acids formed with the diazo components stated in Column 2.

an acetic acid medium and subsequent alkaline or acidic hydrolysis of the acetylamino group, 56.8 parts, is dissolved at pH 7 in 450 parts of water. After the ad-

| Example No. | Diazo component | Aminonaphthol-sulfonic acid | Shade on cotton |
|---|---|---|---|
| 71 | 2-aminonaphthalene-1,7-disulfonic acid | 2-ethylamino-5-hydroxy-naphthalene-7-sulfonic acid | orange |
| 72 | do. | 2-(β-hydroxyethylamino)-5-hydroxynaphthalene-7-sulfonic acid | do. |
| 73 | do. | 2-amino-5-hydroxynaphtha-lene-7-sulfonic acid | do. |
| 74 | do. | 2-amino-5-hydroxynaphtha-lene-1,7-disulfonic acid | do. |
| 75 | do. | 2-amino-8-hydroxynaphtha-lene-6-sulfonic acid | scarlet |
| 76 | do. | 2-amino-8-hydroxynaphtha-lene-3,6-disulfonic acid | do. |
| 77 | 2-aminonaphthalene-1,5-disulfonic acid | 2-methylamino-5-hydroxy-naphthalene-7-sulfonic acid | orange |
| 78 | do. | 2-ethylamino-5-hydroxy-naphthalene-7-sulfonic acid | do. |
| 79 | do. | 2-(β-hydroxyethylamino)-5-hydroxynaphthalene-7-sulfonic acid | do. |
| 80 | do. | 2-amino-5-hydroxynaphtha-lene-7-sulfonic acid | do. |
| 81 | do. | 2-amino-5-hydroxynaphtha-lene-1,7-disulfonic acid | do. |
| 82 | 2-aminonaphthalene-1,5-disulfonic acid | 2-amino-8-hydroxynaphtha-lene-6-sulfonic acid | scarlet |
| 83 | do. | 2-amino-8-hydroxynaphtha-lene-,3,6-disulfonic acid | do. |
| 84 | 2-aminonaphthalene-1,5,7-trisulfonic acid | 2-amino-5-hydroxynaphtha-lene-7-sulfonic acid | orange |
| 85 | do. | 2-methylamino-5-hydroxy-naphthalene-7-sulfonic acid | do. |
| 86 | do. | 2-amino-8-hydroxynaphtha-lene-6-sulfonic acid | scarlet |
| 87 | 2-aminobenzene-sulfonic acid | 2-methylamino-5-hydroxy-naphthalene-7-sulfonic acid | orange |
| 88 | do. | 2-(β-hydroxyethylamino)-5-hydroxynaphthalene-7 sulfonic acid | do. |
| 89 | do. | 2-amino-8-hydroxynaphtha-lene-6-sulfonic acid | scarlet |
| 90 | do. | 2-amino-8-hydroxynaphtha-lene-3,6-disulfonic acid | do. |
| 91 | do. | 2-amino-5-hydroxynaphtha-lene-1,7-disulfonic acid | orange |
| 92 | 2-aminonaphthalene-1-sulfonic acid | 1-amino-8-hydroxynaphtha-lene-3,6-disulfonic acid | bluish red |
| 93 | do. | 1-amino-8-hydroxynaphtha-lene-4,6-disulfonic acid | do. |
| 94 | 2-aminonaphthalene-1,5-disulfonic acid | 1-amino-8-hydroxynaphtha-lene-3,6-disulfonic acid | do. |
| 95 | do. | 1-amino-8-hydroxynaphtha-lene-4,6-disulfonic acid | do. |
| 96 | do. | 1-amino-8-hydroxynaphtha-lene-6-sulfonic acid | do. |
| 97 | 2-aminonaphthalene-1,7-disulfonic acid | 1-amino-8-hydroxynaphtha-lene-3,6-disulfonic acid | bluish red |
| 98 | do. | 1-amino-8-hydroxynaphtha-lene-4,6-disulfonic acid | do. |
| 99 | do. | 1-amino-8-hydroxynaphtha-lene-6-sulfonic acid | do. |
| 100 | 2-aminonaphthalene-1,5,7-trisulfonic acid | 1-amino-8-hydroxynaphtha-lene-6-sulfonic acid | do. |
| 101 | 1-amino-4-chlorobenzene-2-sulfonic acid | 1-amino-8-hydroxynaphtha-lene-3,6-disulfonic acid | do. |
| 102 | 1-amino-2-methoxy-benzene-5-sulfonic acid | 1-amino-8-hydroxynaphtha-lene-3,6-disulfonic acid | do. |
| 103 | 1-amino-benzene-2-carboxylic acid-4-sulfonic acid | 1-amino-8-hydroxynaphtha-lene-3,6-disulfonic acid | do. |
| 104 | 1-amino-4-acetyl-aminobenzene-2-sulfonic acid | do. | violet |
| 105 | do. | 1-amino-8-hydroxynaphtha-lene-4,6-disulfonic acid | bluish red |

EXAMPLE 106

The diaminoazo dyestuff obtained by coupling of diazotized 1-amino-3-acetylaminobenzene-6-sulfonic acid with 2-amino-naphthalene-5,7-disulfonic acid in dition of 25.0 parts of 2,4-bis-methylsulfonyl-6-methyl-pyrimidine, the reaction mixture is stirred at 60°C for about 1 hour, while continuously neutralizing the liberated sulfinic acid to a pH of 7–7.5 with a sodium carbonate solution. When the acylation is completed, the resultant reactive dyestuff of the formula

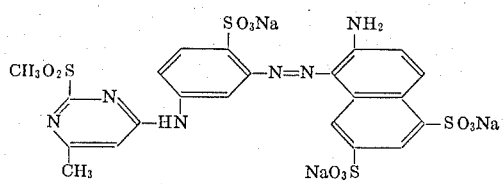

is salted out, filtered off, redissolved in 4000 parts of water at 30°C, filtered and separated from the filtrate in a completely pure form by the addition of 400 parts of sodium chloride. The dyestuff is dried as usual at 35°C in a vacuum. It dyes cellulose materials by one of the processes described above in fast yellowish-orange shades.

The foregoing example is repeated employing instead of the 2,4-bis-methyl-sulfonyl-6-methyl-pyrimidine, equivalent amounts of 2-methyl sulfonyl-4,5-dichloro-6-methyl-pyrimidine. The corresponding reactive dyestuff containing the 5-chloro-pyrimidine group is obtained and is employed with the same results in the described procedures.

EXAMPLE 107

2-Methylsulfonyl-4-chloro-6-methyl-pyrimidine, 22 parts, is added to a neutral solution of 60 parts of the trisodium salt of the amino azo dyestuff obtained by coupling diazotized 2-aminonaphthalene-3,6,8-trisulfonic acid with 3-acetylamino-aniline in an acetic acid medium in 500 parts of water, and the reaction mixture is stirred at 65°C for 1 hour, while maintaining a pH value of 7-7.5 by the continuous addition of a sodium hydroxide solution. The partially precipitated acylation product is completely separated at a pH of 7 by the addition of 100 parts of sodium chloride and filtered off. For purification, the reactive dyestuff thus obtained can be redissolved in 2500 parts of water at 30°C, clarified and separated again by salting out the filtrate with 350 parts of sodium chloride. The dyestuff has the formula

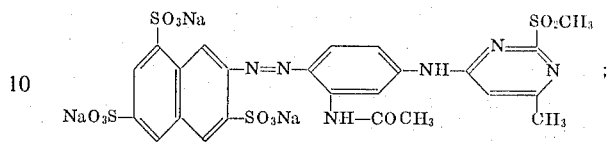

after filtering, drying at 35°C and grinding, it is a yellow powder which readily dissolves in water, with a yellow color, and dyes cellulose fibers by one of the dyeing processes described above in the presence of acid-binding agents in very fast reddish-yellow shades. Fast yellow shades are also obtained on wool and polyamide fibers.

The foregoing example is repeated employing instead of the 2-methyl-sulfonyl-4-chloro-6-methyl-pyrimidine, equivalent amounts of 2-methyl-sulfonyl-4,5-dichloro-6-methyl-pyrimidine. The corresponding reactive dyestuff containing the 5-chloro-pyrimidine group is obtained and is employed with the same results in the described procedures.

Similar dyestuffs are obtained by proceeding as described above, but using instead of 60 parts of 4'-amino-2'-acetylamino-phenyl-(1')-azo-naphthalene-(2)-3,6,8-trisulfonic acid sodium salt, equivalent amounts of the aminoazo dyestuffs obtained from the amino compounds stated in Column 2 and the coupling components stated in Column 3 in the usual manner by diazotization and coupling in an acetic acid medium, and acylating with 2-methylsulfonyl-4-chloro-6-methyl-pyrimidine.

| Example No. | Diazo component | Coupling component | Shade on cotton |
|---|---|---|---|
| 108 | 2-aminonaphthalene-1,5-disulfonic acid | 1-amino-3-methyl-6-methoxy-benzene | strongly reddish yellow |
| 109 | do. | 1-amino-3-methylbenzene | yellow |
| 110 | do. | 1-aminonaphthalene-6-sulfonic acid | reddish yellow |
| 111 | do. | 1-amino-3-acetylamino-benzene | do. |
| 112 | do. | 3-aminophenyl urea | do. |
| 113 | do. | 1-amino-3-hydroxyacetyl-aminobenzene | do. |
| 114 | 2-aminonaphthalene-5,7-disulfonic acid | 1-amino-3-methyl-6-methoxy-benzene | strongly reddish yellow |
| 115 | do. | 1-aminonaphthalene-7-sulfonic acid | reddish yellow |
| 116 | do. | 1-amino-3-acetylaminobenzene | do. |
| 117 | do. | 3-aminophenyl urea | do. |
| 118 | do. | 1-amino-3-hydroxyacetyl-aminobenzene | do. |
| 119 | 1-aminonaphthalene-3,7-disulfonic acid | 1-amino-3-methyl-6-methoxybenzene | strongly reddish yellow |
| 120 | do. | 1-amino-3-methylbenzene | reddish yellow |
| 121 | 1-aminonaphthalene-3,7-disulfonic acid | 1-aminonaphthalene-6-sulfonic acid | reddish yellow |
| 122 | 2-aminonaphthalene-3,6-disulfonic acid | 1-amino-3-methylbenzene | do. |
| 123 | do. | 1-amino-3-methyl-6-methoxy-benzene | strongly reddish yellow |
| 124 | 2-aminonaphthalene-3,6-disulfonic acid | 1-amino-3-acetylamino-benzene | reddish yellow |
| 125 | do. | 3-aminophenyl urea | do. |
| 126 | do. | 1-amino-3-hydroxyacetyl-aminobenzene | do. |
| 127 | do. | 1-aminonaphthalene-6-sulfonic acid | do. |

—Continued

| Example No. | Diazo component | Coupling component | Shade on cotton |
|---|---|---|---|
| 128 | 2-aminonaphthalene-6,8-disulfonic acid | 1-amino-3-acetylaminobenzene | do. |
| 129 | do. | 1-amino-2-methoxynaphthalene-6-sulfonic acid | strongly reddish yellow |
| 130 | do. | 1-aminonaphthalene-6-sulfonic acid | reddish yellow |
| 131 | 2-aminonaphthalene-4,8-disulfonic acid | 1-aminonaphthalene-6-sulfonic acid | yellow |
| 132 | do. | 1-aminonaphthalene-7-sulfonic acid | do. |
| 133 | 2-aminonaphthalene-4,8-disulfonic acid | 1-amino-2-methoxynaphthalene-6-sulfonic acid | strongly reddish yellow |
| 134 | do. | 1-methylamino-3-methylbenzene | yellow |
| 135 | 2-aminonaphthalene-4,8-disulfonic acid | 1-ethylamino-3-methylbenzene- | do. |
| 136 | do. | N-methylaniline | do. |
| 137 | do. | N-ethylaniline | do. |
| 138 | do. | N-(β-hydroxyethyl)-aniline | do. |
| 139 | do. | N-butylaniline | do. |
| 140 | 2-aminonaphthalene-3,6,8-trisulfonic acid | aniline | reddish yellow |
| 141 | do. | 1-amino-3-methylbenzene | do. |
| 142 | 2-aminonaphthalene-3,6,8-trisulfonic acid | 3-aminophenyl urea | reddish yellow |
| 143 | do. | 1-amino-3-hydroxyacetyl-aminobenzene | do. |
| 144 | do. | 1-amino-3-acetylamino-6-methoxybenzene | yellowish orange |
| 145 | do. | 1-amino-3-acetylamino-6-methylbenzene | reddish yellow |
| 146 | do. | 1-amino-3-methane-sulphonyl-aminobenzene | do. |
| 147 | do. | 2,5-dimethoxyaniline | yellowish orange |
| 148 | do. | 3-methyl-6-methoxyaniline | do. |
| 149 | do. | N-methylaniline | reddish yellow |
| 150 | 2-aminonaphthalene-3,6,8-trisulfonic acid | N-ethylaniline | do. |
| 151 | do. | N-butylaniline | do. |
| 152 | do. | N-(β-hydroxyethyl)-aniline | do. |
| 153 | do. | 3-(N-ethylamino)-toluene | do. |
| 154 | do. | 2-aminotoluene | do. |
| 155 | do. | 1-amino-2,5-dimethylbenzene | strongly reddish yellow |
| 156 | do. | 1-amino-2-methoxybenzene | do. |
| 157 | do. | 1-amino-3-methoxybenzene | reddish yellow |
| 158 | do. | 1-ethylamino-3-methoxybenzene | do. |
| 159 | do. | 1-aminonaphthalene-6-sulfonic acid | do. |
| 160 | do. | 1-aminonaphthalene-7-sulfonic acid | do. |
| 161 | 2-aminonaphthalene-4,6,8-trisulfonic acid | 1-amino-3-methylbenzene | reddish yellow |
| 162 | do. | 1-amino-3-acetylaminobenzene | do. |
| 163 | 1-aminonaphthalene-2,4,7-trisulfonic acid | 1-amino-3-methylbenzene | yellow |
| 164 | do. | 1-aminonaphthalene-6-sulfonic acid | do. |
| 165 | 4-nitro-4'-aminostilbene-2,2'-disulfonic acid | 1-amino-3-acetylaminobenzene | reddish yellow |
| 166 | do. | 3-aminophenyl urea | do. |
| 167 | do. | 1-amino-3-hydroxyacetylamino-benzene | do. |
| 168 | 4-nitro-4'-aminostilbene-2,2'-disulfonic acid | N-methylaniline | do. |
| 169 | do. | N-ethylaniline | do. |
| 170 | do. | N-butylanilaniline | do. |
| 171 | do. | N-(β-hydroxyethyl)-aniline | do. |
| 172 | do. | 1-(N-ethylamino)-3-methylbenzene | do. |
| 173 | aniline-2,5-disulfonic acid | 1-aminonaphthalene-6-sulfonic acid | do. |
| 174 | do. | 1-aminonaphthalene-7-sulfonic acid | do. |
| 175 | do. | 1-amino-3-methylbenzene | yellow |
| 176 | do. | 1-amino-3-acetylaminobenzene | do. |
| 177 | do. | 1-amino-2-methoxy-5-methylbenzene | reddish yellow |
| 178 | do. | 1-amino-2,5-dimethoxybenzene | do. |
| 179 | aniline-2,4-disulfonic acid | 1-amino-2-methoxy-5-methyl-benzene | do. |

The examples in the foregoing tabular form are repeated using instead of the 2-methyl-sulfonyl-4-chloro-6-methyl-pyrimidine, equivalent amounts of 2-methyl-sulfonyl-4,5-dichloro-6-methyl-pyrimidine. The corresponding reactive dyestuffs containing the 5-chloro-pyrimidine group are obtained and are employed with the same results in the described procedures.

EXAMPLE 180

In 700 parts of water are dissolved 65 parts of the dyestuff having the formula

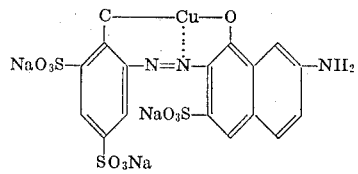

prepared by coupling of diazotized 1-hydroxy-2-aminobenzene-4,6-disulfonic acid with 2-amino-8-hydroxynaphthalene-6-sulfonic acid and coppering of the resultant azo dyestuff. 22 Parts of 2-methyl-sulfonyl-4-chloro-6-methyl-pyrimidine are added and the reaction mixture is stirred at 60° to 65°C, while continuously neutralizing the liberated acid to a pH of 7–7.5 with a sodium carbonate solution, until free amino groups can no longer be detected. The resultant reactive dyestuff of the formula

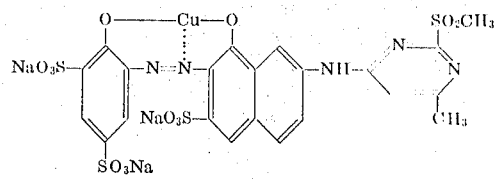

is salted out, filtered off, washed and dried at 30° to 40°C. The dyestuff dyes cellulose materials by one of the processes described above in very fast ruby shades.

The foregoing example is repeated employing instead of the 2-methyl-sulfonyl-4-chloro-6-methyl-pyrimidine, equivalent amounts of 2-methyl-sulfonyl-4,5-dichloro-6-methyl-pyrimidine. The corresponding reactive dyestuff containing the 6-chloro-pyrimidine group is obtained and is employed with the same results in the described procedures.

Dyestuffs with similar properties are obtained by a method analogous to that described above from the copper complexes of the azo dyestuffs prepared from the diazo and azo components stated in the following Table.

| Example No. | Diazo component | Coupling component | Shade on cotton |
|---|---|---|---|
| 181 | 1-hydroxy-2-amino-benzene-4-sulfonic acid | 2-methylamino-5-hydroxy-naphthalene-7-sulfonic acid | ruby |
| 182 | do. | 2-ethylamino-5-hydroxy-naphthalene-7-sulfonic acid | do. |
| 183 | do. | 2-(β-hydroxyethylamino)-5-hydroxynaphthalene-7-sulfonic acid | do. |
| 184 | do. | 2-amino-8-hydroxynaphthalene-3,6-disulfonic acid | do. |
| 185 | 1-hydroxy-2-amino-benzene-4,6-disulfonic acid | 2-amino-5-hydroxynaphthalene-1,7-disulfonic acid | do. |
| 186 | do. | 2-amino-8-hydroxynaphthalene-3,6-disulfonic acid | do. |
| 187 | do. | 2-methylamino-5-hydroxy-naphthalene-7-sulfonic acid | do. |
| 188 | do. | 2-ethylamino-5-hydroxy-naphthalene-7-sulfonic acid | do. |
| 189 | do. | 2-(β-hydroxyethylamino)-5-hydroxynaphthalene-7-sulfonic acid | do. |
| 190 | 1-hydroxy-2-amino-benzene-4,6-disulfonic acid | 1-amino-8-hydroxynaphthalene-3,6-disulfonic acid | violet |
| 191 | do. | 1-amino-8-hydroxynaphthalene-4,6-disulfonic acid | do. |
| 192 | 1-hydroxy-2-amino-benzene-5-sulfonic acid | 1-amino-8-hydroxynaphthalene-3,6-disulfonic acid | do. |
| 193 | do. | 1-amino-8-hydroxynaphthalene-4,6-disulfonic acid | do. |
| 194 | 1-hydroxy-2-amino-4-acetylaminobenzene-6-sulfonic acid | 1-amino-8-hydroxynaphthalene-3,6-disulfonic acid | bluish violet |
| 195 | 1-hydroxy-2-amino-4-acetylaminobenzene-6-sulfonic acid (4-positioned acetylamino group subsequently hydrolyzed) | 1-ethoxy-8-hydroxynaphthalene-3,6-disulfonic acid | do. |
| 196 | do. | 1-amino-8-hydroxynaphthalene-2,4-disulfonic acid | blue |
| 197 | do. | 1-amino-8-hydroxynaphthalene-2,4,6-trisulfonic acid | do. |
| 198 | 1-hydroxy-2-amino-6-acetylaminobenzene-4-sulfonic acid (6-positioned acetylamino group hydrolyzed) | 1-amino-8-hydroxynaphthalene-2,4-disulfonic acid | blue |
| 199 | 1-amino-2-hydroxy-6-nitronaphthalene-4-sulfonic acid (6-positioned nitro group subsequently reduced to —NH$_2$) | do. | do. |
| 200 | 1-amino-2-hydroxy-6-nitronaphthalene-4-sulfonic acid (6-positioned nitro group subsequently reduced to —NH$_2$) | 1-amino-8-hydroxynaphthalene-2,4,6-trisulfonic acid | do. |
| 201 | 1-hydroxy-2-amino-6-acetylaminobenzene-4-sulfonic acid (6-positioned acetylamino group hydrolyzed) | do. | do. |

The examples in the foregoing tabular form are repeated using instead of the 2-methyl-sulfonyl-4-chloro-6-methyl-pyrimidine, equivalent amounts of 2-methyl-sulfonyl-4,5-dichloro-6-methyl-pyrimidine. The corresponding reactive dyestuffs containing the 5-chloro-pyrimidine group are obtained and are employed with the same results in the described procedures.

EXAMPLE 202

The procedure is the same as that described in Example 30, but the diazotized, reactive group-containing intermediate product is coupled in a soda-alkaline medium with 40 parts of the sodium salt of 1-acetylamino-8-hydroxy-naphthalene-3,6-disulfonic acid, instead of with 47 parts of the sodium salt of 1-benzoylamino-8-hydroxynaphthalene-3,6-disulfonic acid, and the resultant dyestuff of the formula

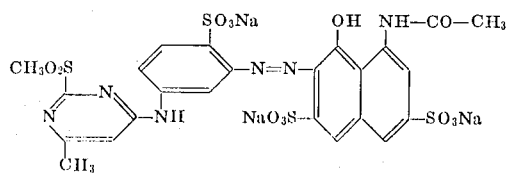

is isolated in the manner described in Example 30. The water-soluble dyestuff dyes cellulose materials by the pad-steam or pad-thermofixing process (at 140°C) in white-dischargeable, bluish-red shades fast to wet processing, rubbing, and light.

The foregoing example is repeated employing instead of the 2-methyl-sulfonyl-4-chloro-6-methyl-pyrimidine, equivalent amounts of 2-methyl-sulfonyl-4,5-dichloro-pyrimidine group is obtained and is employed with the same results in the described procedures.

EXAMPLE 203

A solution of 19.5 parts of the sodium salt of 1-amino-benzene-4-sulfonic acid and 6.9 parts of sodium nitrite in 200 parts of water is allowed to run into a mixture of 100 parts of ice and 28 parts by volme of concentrated hydrochloric acid; the reaction mixture is then stirred at 0° to 10°C for 30 minutes, and the excess nitrous acid is subsequently removed. To the diazo suspension thus obtained there is added at 0° to 10°C the cooled and thus partially recrystallized solution of 26.2 parts of the potassium salt of 1-aminonaphthalene-8-sulfonic acid in 250 parts of hot water, and the strongly acidic coupling mixture is neutralized at 10° to 20°C to a pH of 4 by the careful addition of a sodium hydroxide solution. The coupling is rapidly completed; the resultant aminoazo dyestuff is completely salted out with 100 parts of sodium chloride, filtered off with suction, washed and redissolved in 500 parts of water at 10° C and a pH of 6–7. The aqueous solution is mixed with 25.0 parts of 2,4-bis-methyl-sulfonyl-6-methyl-pyrimidine and stirred at 55° to 60°C for 1 hour, while continuously neutralizing the liberated acid to a pH of 7–7.5 with a sodium carbonate solution. When the aminoazo dyestuff can no longer be detected, the partially preciptated reactive dyestuff of the formula

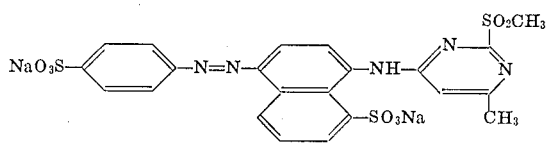

is salted out with 40 parts of sodium chloride, filtered off and redissolved in 800 parts of warm water for purification. After clarification of the solution, the pure dyestuff is separated from the filtrate by the addition of 80–100 parts of sodium chloride. After filtering off, drying at 35°C and grinding, a yellow powder is obtained which readily dissolves in water with a yellow color and dyes cellulose fibers by one of the dyeing processes described above in the presence of acidbinding agents in yellow shades of very good fastness to wet processing, light, and chlorine. Fast yellow shades are also obtained on wool and polyamide fibers.

The foregoing example is repeated employing instead of the 2,4-bis-methyl-sulfonyl-6-methyl-pyrimidine, equivalent amounts of 2,4-bis-methyl-sulfonyl-5-chloro-6-methyl pyrimidine. The corresponding reactive dyestuff containing the 5-chloropyrimidine group is obtained and is employed with the same results in the described procedures.

By proceeding as described above but coupling instead of 19.5 parts of the sodium salt of 1-aminobenzene-4-sulfonic acid, equivalent amounts of the diazo components stated in the following Table with 1-aminonaphthalene-8-sulfonic acid, and acylating with 2,4-bis-methyl-sulfonyl-6-methyl-pyrimidine or with 2-methyl-sulfonyl-4,5-dichloro-6-methyl-pyrimidine, valuable yellow to brown reactive dyestuffs are also obtained.

| Diazo component | Shade on cellulose fibre |
|---|---|
| 1-aminobenzene-2,5-disulfonic acid | Reddish yellow. |
| 2-amino-naphthalene-4,8-disulfonic acid | Strongly reddish yellow. |
| 2-amino-naphthalene-5,7-disulfonic acid | Do. |
| 2-amino-naphthalene-6,8-disulfonic acid | Do. |
| 2-amino-naphthalene-3,6,8-trisulfonic acid | Do. |
| 2-amino-naphthalene-4,6,8-trisulfonic acid | Do. |
| 4-amino-azobenzene-3,4'-disulfonic acid | Yellowish brown. |
| 4-amino-2-acetylamino-azobenzene-2',5'-disulfonic acid | Orange-brown. |

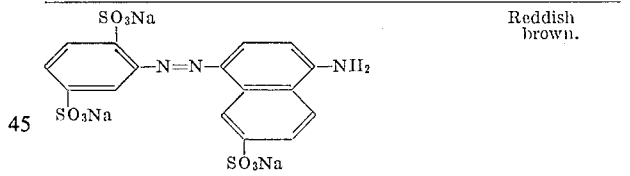

Reddish brown.

(1-aminobenzene-2,5-disulfonic acid coupled in an acidic medium with 1-amino-naphthalene-6-sulfonic acid).

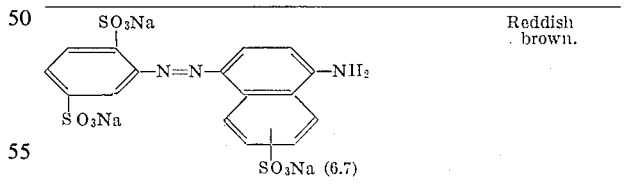

Reddish brown.

(1-aminobenzene-2,5-disulfonic acid coupled in an acidic medium with the technical mixture of 1-amino-naphthalene-6- and 7-sulfonic acid).

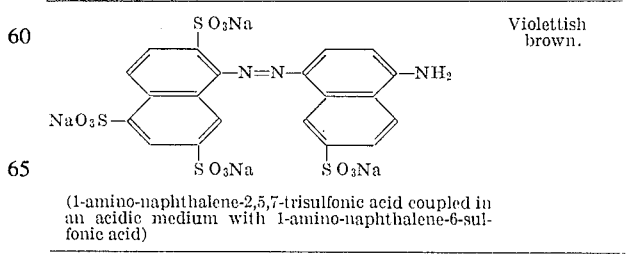

Violettish brown.

(1-amino-naphthalene-2,5,7-trisulfonic acid coupled in an acidic medium with 1-amino-naphthalene-6-sulfonic acid)

| Diazo component | Shade on cellulose fibre |
|---|---|
| 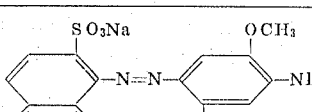 (1-amino-naphthalene-2,5,7-trisulfonic acid coupled in an acidic medium with 1-amino-2-methoxy-5-methylbenzene) | Reddish brown. |

EXAMPLE 204

When a cellulose fabric is printed with a printing paste which contains, per kilogram, 30 g of the dyestuff described in Example 18, 100 g of urea, 300 g of water, 500 g of alginate thickener (60 g of sodium alginate per kg of thickener), 10 g of sodium carbonate and 10 g of the sodium salt of 3-nitrobenzene-sulfonic acid, and which has been made up with water to 1 kilogram, the fabric is subsequently subjected to an intermediate drying, then steamed in a suitable steaming apparatus at 103° to 115°C for 30 seconds, rinsed and soaped at the boil, an intense bluish-red print of good fastness to wet processing, rubbing, and light is obtained.

The same results are obtained when the dyestuff of Example 18 is replaced with the same dyestuff containing the 2,4-bis-methyl-sulfonyl-5-chloro-6-methyl-pyrimidine group.

EXAMPLE 205

A mixture of the solutions of 65.5 parts each of 2:1 chromium complex and the 2:1 cobalt complex of the dyestuff of the formula

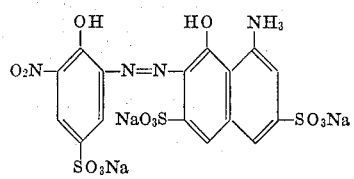

in 400 parts of water each time, is stirred with 50 parts of finely powdered 2-methyl-sulfonyl-4-chloro-6-methyl-pyrimidine at 60° to 70°C for about 2 hours, while maintaining a pH of 7–8. When no more aminoazo dyestuff can be detected chromatographically (Co-complex: blue; Cr-complex: blue-green), the resultant mixture of the two reactive dyestuffs in salted out with potassium choloride, filtered off and dried.

The dyestuff yields on cellulose materials by the pad-dyeing processes or by printing in the presence of acid-binding agents, intense black shades of very good fastness to wet processing and light.

Valuable black dyestuffs are also obtained by proceeding in an analogous manner, but using a mixture of the 2:1 chromium and 2:1 cobalt complexes of the following aminoazo dyestuffs:

| Diazo component | Coupling component | Coupling pH |
|---|---|---|
| 1-hydroxy-2-amino-4-nitrobenzene | 1-hydroxy-8-amino-naphthalene-3,6-disulfonic acid | 9 |
| 1-hydroxy-2-amino-4-nitronaphthalene-7-sulfonic acid | do. | 9 |

The foregoing example is repeated employing instead of the 2-methyl-sulfonyl-4-chloro-6-methyl-pyrimidine, equivalent amounts of 2-methyl-sulfonyl-4,5-dichloro-6-methyl-pyrimidine. The corresponding reactive dyestuff containing the 5-chloropyrimidine group is obtained and is employed with the same results in the described procedures.

EXAMPLE 206

2,4-Bis-methyl-sulfonyl-6-methyl-pyrimidine, 25.0 parts, is added to a neutral solution of 53.15 parts of the disodium salt of the aminoazo dyestuff obtained by coupling of diazotized 1-amino-4-nitrobenzene-2-sulfonic acid with 1-(2'-chloro-5'-sulfophenyl)-3-methyl-pyrazolone-(5) and subsequent reduction of the nitro group with sodium sulfide, in 300 parts of water, and the mixture is stirred at 55° to 60°C for 1 hour, while continuously neutralizing the liberated acid to a pH value of 6.5–7 with a sodium carbonate solution. The separated dyestuff of the formula

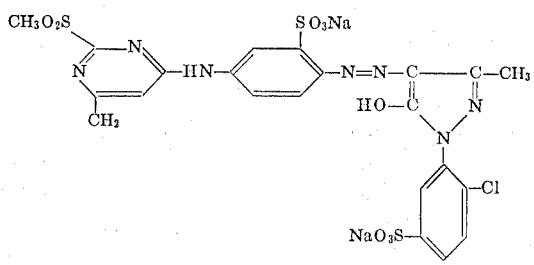

is filtered off, dissolved warm in 3000 parts of water at a pH of 6–7, and repreciptated from the filtered solution by the addition of sodium chloride. After filtering off, drying and pulverizing, a yellow powder is obtained, which is readily soluble in water and dyes cellulose materials from a long bath at 60°C or by the cold batch-pad process with the use of sodium carbonate as an acid-binding agent, in clear yellow shades fast to washing, rubbing, and light.

The foregoing example is repeated employing instead of the 2,4-bis-methyl-sulfonyl-6-methyl-pyrimidine, equivalent amounts of 2-methyl-sulfonyl-4,5-dichloro-6-methyl-pyrimidine. The corresponding reactive dyestuff containing the 5-chloropyrimidine group is obtained and is employed with the same results in the described procedures.

Valuable new reactive dyestuffs are also obtained by proceeding as described above but using instead of the stated aminoazo dyestuff, equivalent amounts of the aminoazo dyestuffs synthesized from the components given in the following Table.

In the Table below, the term "hydrolyzed" means that an acylamino group contained in the aminoazo dyestuff is subsequently hydrolyzed, whereas the term "reduced" indicates that a nitro group contained in the diazo component is reduced, after coupling, to form the amino group, whereby the desired aminoazo dyestuff is formed.

| Example No. | Diazo component | Azo component | pH of coupling medium | Shade on cellulose |
|---|---|---|---|---|
| 207 | 1-amino-4-nitro-benzene-2-sulfonic acid (4-positioned nitro group subsequently reduced) | 1-(4'-sulfophenyl)-3-methyl-pyrazolone-(5) | 5 – 6 | yellow |
| 208 | do. | 1-(4'-sulfophenyl)-3-carboxy-pyrazolone-(5) | 5 – 6 | reddish |
| 209 | do. | 1-(3'-sulfophenyl)-3-methyl-5-amino-pryazole | 6 – 7 | yellow |
| 210 | 1-amino-3-acetyl-amino-benzene-6-sulfonic acid (3-positioned acetylamino group subsequently hydrolyzed) | do. | 6 – 7 | do. |
| 211 | do. | 1-(β-hydroxyethyl)-3-methyl-pyrazolone-(5) | 5 – 6 | do. |
| 212 | 2 mol 1-amino-3-acetylamino-benzene 6-sulfonic acid (hydrolyzed) | 1 mol bis-pyrazolone from 4,4'-bis-hydrazino-dibenzyl-2,2'-disulfonic acid and acetoacetic ethyl ester | 5 – 6 | do. |
| 213 | 1 mol 1-amino-3-acetylamino-benzene 6-sulfonic acid (hydrolyzed) | 1-(4'-sulfophenyl)-3-carboxy-pyrazolone-(5) | 5 – 6 | do. |
| 214 | 1-amino-5-acetyl-amino-naphthalene-3,7-disulfonic acid (hydrolyzed) | 1-(4'-sulfophenyl)-3-carboxy-pyrazolone-(5) | 5 – 6 | reddish yellow |
| 215 | 1-amino-2-methyl-benzene-4,6-disulfonic acid | 2-acetylamino-5-naphthol-7-sulfonic acid (hydrolyzed) | 7 – 8 | orange |
| 216 | do. | 2-acetylamino-8-naphthol-6-sulfonic acid (hydrolyzed) | 7 – 8 | red |
| 217 | 1-amino-2-methyl-benzene-4,6-disulfonic acid | 1-chloro-2-acetyl-amino-5-naphthol-7-sulfonic acid (hydrolyzed) | 7 – 8 | orange |
| 218 | 1-aminobenzene-2-sulfonic acid | 1-acetylamino-8-hydroxy-naphthalene-4,6-disulfonic acid (hydrolyzed) | 7 – 8 | red |
| 219 | 2-aminonaphthalene-3,6-disulfonic acid | do. | 7 – 8 | bluish red |
| 220 | 2-aminonaphthalene-3,7-disulfonic acid | do. | 7 – 8 | bluish red |
| 221 | 2-aminonaphthalene-4,8-disulfonic acid | do. | 7 – 8 | bluish red |
| 222 | 2-aminonaphthalene-3,6-disulfonic acid | 1-acetylamino-8-hydroxynaphthalene-3,6-disulfonic acid (hydrolyzed) | 7 – 8 | bluish red |
| 223 | 2-aminonaphthalene-4,8-disulfonic acid | 1-acetylamino-8-hydroxynaphthalene-3,6-disulfonic acid (hydrolyzed) | 7 – 8 | bluish red |
| 224 | 1-amino-4-methoxy-benzene-2-sulfonic acid | 2-(N-acetyl-N-methyl-amino)-5-hydroxy-naphthalane-7-sulfonic acid (hydrolyzed) | 7 – 8 | yellowish red |
| 225 | do. | 2-(N-acetyl-N-methyl-amino)-8-hydroxy-naphthalene-6-sulfonic acid (hydrolyzed) | 7 – 8 | red |
| 226 | 1-aminobenzene-2-sulfonic acid | do. | 7 – 8 | do. |
| 227 | 1-aminobenzene-3-sulfonic acid | do. | 7 – 8 | do. |
| 228 | 1-aminobenzene-4-sulfonic acid | do. | 7 – 8 | do. |
| 229 | 1-amino-4-methyl-benzene-2-sulfonic acid | do. | 7 – 8 | do. |
| 230 | 1-amino-2,4-dimethyl-benzene-6-sulfonic acid | 2-(N-acetyl-N-methyl-amino)-8-hydroxynaphthalene-6-sulfonic acid (hydrolyzed) | 7 – 8 | red |
| 231 | do. | 2-acetylamino-8-hydroxynaphthalene-6-sulfonic acid (hydrolyzed) | 7 – 8 | do. |
| 232 | 1-amino-2,4-dimethyl-benzene-6-sulfonic acid | 2-acetylamino-8-hydroxynaphthalene-3,6-disulfonic acid (hydrolyzed) | 7 – 8 | red |
| 233 | 4-aminoazobenzene-3,4'-disulfonic acid | 1-amino-3-acetyl-aminobenzene | 5 – 6 | yellowish brown |
| 234 | do. | 1-amino-3-hydroxy-acetylaminobenzene | 5 – 6 | do. |
| 235 | do. | 1-amino-naphthalene-6-sulfonic acid | 5 – 6 | do. |
| 236 | do. | 1-amino-naphthalene-7-sulfonic acid | 5 – 6 | do. |

—Continued

| Example No. | Diazo component | Azo component | pH of coupling medium | Shade on cellulose |
|---|---|---|---|---|
| 237 | do. | 1-amino-2-(4'-amino-2'-sulfophenyl-(1')-azo)-8-hydroxynaphthalene-3,6-disulfonic acid | 8 | black |

The examples presented in the foregoing tabular form are repeated using instead of the 2,4-bis-methyl-sulfonyl-6-methyl-pyrimidine, equivalent amounts of 2-methyl-sulfonyl-4,5-dichloro-6-methyl-pyrimidine. The corresponding reactive dyestuffs containing the 5-chloro-pyrimidine group are obtained and are employed with the same results in the described procedures.

EXAMPLE 238

In 1000 parts of water are dissolved 52.4 parts of the disodium salt of 4-([4''-aminophenyl]-amino)-2'-nitro-diphenylamine-3,4'-disulfonic acid and the solution is stirred with 25.0 parts of 2,4-bis-methyl-sulfonyl-6-methyl-pyrimidine at 55° to 65°C for 1 hour, while continuously neutralizing the liberated acid to a pH value of 6.5–7.5 with sodium carbonate. The resultant reactive nitro dyestuff of the formula

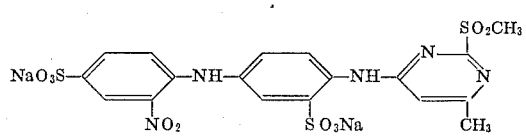

is salted out, filtered off, washed and dried. It dyes cellulose fibers from a long bath or by one of the conventional padding processes in the presence of sodium carbonate as an acid-binding agent, indeep violet-brown shades fast to wet processing and rubbing.

The foregoing example is repeated employing instead of the 2,4-bis-methyl-sulfonyl-6-methyl-pyrimidine, equivalent amounts of 2,4-bis-methyl-sulfonyl-5-chloro-6-methyl-pyrimidine. The corresponding reactive dyestuff containing the 5-chloropyrimidine group is obtained and is employed with the same results in the described procedures.

EXAMPLE 239

A neutral solution of 54.7 parts of the disodium salt of 1-amino-4-(2'methyl-3'aminophenyl)-amino-anthraquinone-2,5-disulfonic acid in 1000 parts of water is stirred with 22.0 parts of 2-methyl-sulfonyl-4-chloro-6-methyl-pyrimidine at 65°C for 1 hour, while continuously neutralizing the liberated hydrochloric acid to a pH value of 6.5–7.5. When the reaction is completed, the resultant reactive dyestuff of the formula

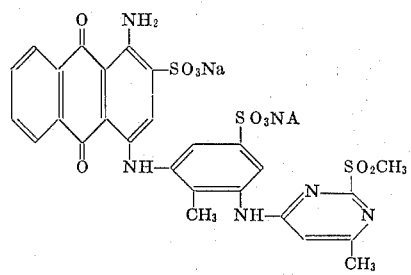

is salted out, filtered off, washed and dried at 30° to 40°C. The dyestuff dyes cellulose materials in clear blue shades of very good fastness to wet processing, rubbing, and light.

The foregoing example is repeated employing instead of the 2-methyl-sulfonyl-4-chloro-6-methyl-pyrimidine, equivalent amounts of 2-methyl-sulfonyl-4,5-dichloro-6-methyl-pyrimidine. The corresponding reactive dyestuff containing the 5-chloro-pyrimidine group is obtained and is employed with the same results in the described procedures.

Blue dyestuffs with similar properties are obtained by proceeding as described above but acylating instead of the stated water-soluble amino-anthraquinone derivative, equivalent amounts of the amino-anthraquinone-sulfonic acid derivatives mentioned below with 2-methyl-sulfonyl-4-chloro-6-methyl-pyrimidine.

| Example No. | Water-soluble amino-anthraquinone derivative |
|---|---|
| 240 | 1-amino-4-(3'-aminophenyl)-amino-anthraquinone-2,5'-disulfonic acid |
| 241 | 1-amino-4-(2'-chloro-3'-aminophenyl)-amino-anthraquinone-2,5'-disulfonic acid |
| 242 | 1-amino-4-(2'-methyl-3'-methylaminophenyl)-amino-anthraquinone-2,5'-disulfonic acid |
| 243 | 1-amino-4-(4'-aminophenyl)-amino-anthraquinone-2,6,3'-trisulfonic acid |
| 244 | 1-amino-4-(3'-aminophenyl)-amino-anthraquinone-2,6,4'-trisulfonic acid |
| 245 | 1-amino-4-(4'-aminophenyl)-amino-anthraquinone-2,5,3'-trisulfonic acid |
| 246 | 1-amino-4-(3'-aminophenyl)-amino-anthraquinone-2,5,4'-trisulfonic acid |
| 247 | mixture of 1-amino-4-(3'-aminophenyl)-amino-anthraquinone-2,4',5- and 2,4',8-trisulfonic acid furthermore the derivatives subsequently sulfonated at 20 – 30°C with 5% oleum |

| Example No. | Water-soluble amino-anthraquinone derivative |
|---|---|
| 248 | 1-amino-4-[4'-(4''-aminobenzyl)-phenyl]-amino-anthraquinone-2-sulfonic acid |
| 249 | 1-amino-4-(4'-methylaminophenyl)-amino-anthraquinone-2-sulfonic acid |
| 250 | 1-amino-4-(3'-methylaminophenyl)-amino-anthraquinone-2-sulfonic acid |
| 251 | 1-amino-4-(2'-methylaminophenyl)-amino-antrhaquinone-2-sulfonic acid |
| 252 | 1-amino-4-(7'-amino-naphthyl-[2'])-amino-anthraquinone-2-sulfonic acid |
| 253 | the condensation product obtained from 1 mol cyanuric chloride with 1 mol 1,4-diamino-anthraquinone-2-sulfonic acid, 1 mol aniline-2,5-disulfonic acid and 1 mol ethylene-diamino (one-sided), yields, after acylation with 2,4-bis-methylsulfonyl-6-methyl-pyrimidine, a violet reactive dyestuff. |

EXAMPLE 254

A solution of 107 g of a mixture of equal molar proporttions of copper-phthalocyanine-trisulfonic acid-(3,3',3'')-mono-(m-amino-p-sulfophenyl)-amide and copper-phthalocyaninetrisulfonic acid-(3,3',3'')-di-(m-amino-p-sulfophenyl)-amide is adjusted to 1.3 liter and a pH of 7; 40 parts of 2,4-bismethyl-sulfonyl-6-methyl-pyrimidine are introduced at 50° to 55°C. While stirring, the temperature is raised every hour by 5°C and finally maintained at 65° to 70°C for several hours. At the same time, a pH of 6.5–7.5 is maintained by the dropwise addition of 3N NaOH, until, on average, each dyestuff molecule is provided with at least one pyrimidine radical; this can easily be ascertained by the consumption of sodium hydroxide solution, on the one hand, and by an amino group determination, on the other hand. For working up, the dyestuff solution can also be slightly heated at the stated pH, without substantially reducing the reactivity of the dyestuffs toward cellulose. The separation of the unreacted 2,4-bis-methylsulfonyl-6-methyl-pyrimidine and of the hydrolysis products formed therefrom is effected by filtration or in a separator. The reaction product is precipitated by introducing 150 g of sodium chloride per liter of dyestuff solution. The product is filtered off with suction and dried at about 30°C under normal pressure or in a vacuum. There are obtained 195–200 g of crude dyestuff which still contains about 30% sodium chloride. The sodium chloride can be substantially removed by stirring the crude dyestuff with 250 ml of water and again filtering it off with suction.

The dyestuff dyes cellulose materials by the pad-thermofixing process at 140°C and by the pad-steam process in turquoise shades fast to wet processing, rubbing, and light.

The dyestuff mixture used as starting material can be obtained by known methods, e.g. by adding 3 mol of 2,4-diaminobenzene-sulfonic acid to an aqueous suspension of sulfonic acid group-free copper-phthalocyanine-trisulfonic acid chloride at 0° to 20°C and at a pH of about 6.5 and simultaneously catalyzing the hydrolysis with 3 mol of pyridine, the above-mentioned mixture of Pc-sulfonamides being thus formed.

A similar product is obtained when a mixture containing the said components in a molar ratio of 4:1 is used as starting material. This mixture is obtained from the same copper-phthalocyanine-trisulfonic acid chloride and 2 mol of 2,4-diaminobenzene-sulfonic acid according to the same process.

Instead of the said starting materials, there may also be used those which contain nickel instead of copper as the central atom, or which are prepared from copper-phthalocyanine-trisulfonic acid chloride-(4,4',4'') or from the phthalocyanine-tetrasulfonic acid chlorides -(3,4',4'',4''') or -(4,4',4'',4'''), or with the use of other arylene-diamine-sulfonic acids such as toluylene-diamine-(2,4)-sulfonic acid-(5); 4,4'-diaminodibenzyl-disulfonic acid-(2,2'), naphthylene-diamine-(1,5)-disulfonic acid-(3,7). Products of this type and their preparation have frequently been described in the patent literature. The reaction thereof with 2,4-bis-methyl-sulfonyl-6-methyl-pyrimidine or 3,6-bis-methyl-sulfonyl-pyridazine can always be carried out in the same manner.

The foregoing example is repeated employing instead of the 2,4-bis-methyl-sulfonyl-6-methyl-pyrimidine, equivalent amounts of 2,4-bis-methyl-sulfonyl-5-chloro-6-methyl-pyrimidine. The corresponding reactive dyestuff containing the 5-chloropyrimidine group is obtained and is employed with the same results in the described procedures.

This applies also to the reactions of 2-methyl-sulfonyl-4-chloro-6-methyl-pyrimidine or 2-methyl-sulfonyl-4,5-dichloro-6-methyl-pyrimidine with the copper- and nickel-phthalocyanine intermediates leading to green reactive dyestuffs such as can be obtained, e.g. by polysulfochlorination of tetra-(3,3',3'', 3''')-(p-tolylmercapto)-copper-phthalocyanine with chlorosulfonic acid, condensation of 1 to 2 sulfochloride groups per molecule with 1,3-phenylene-diamine-4-sulfonic acid or 1,4-phenylene-diamine-3-sulfonic acid, and hydrolysis of the remaining sulfochloride groups; also the homogeneous or mixed amino and sulfo group-containing arylation and alkylation products of tri- and tetra-mercapto-copper- (or nickel-)-phthalocyanine can be converted into valuable green reactive dyestuffs in an analogous manner by acylation of their amino group with 2,4-bis-methyl-sulfonyl-6-methyl-pyrimidine or 2,4-bis-methyl-sulfonyl-5-chloro-6-methyl-pyrimidine.

EXAMPLE 255

Following the procedure of Example 18, except that the resultant dyestuff intermediate is not coupled with the diazo compound obtained from 17.5 parts of 2-aminobenzene-sulfonic acid, but with the diazo compound from 20.8 parts of 3-chloroaniline-6-sulfonic acid in the presence of 12 parts of sodium carbonate at a final pH of 7, there is obtained a reactive dyestuff of the formula

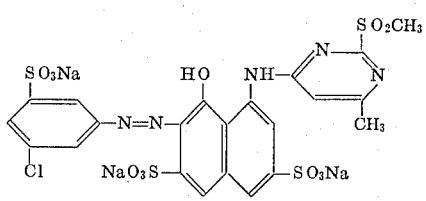

with which cellulose materials can be dyed or printed from a long bath at 40°C or according to one of the padding or printing processes customary for reactive dyestuffs with the use of sodium carbonate as an acid-binding agent, in brilliant red shades fast to wet processing.

The foregoing example is repeated employing instead of the 2,4-bis-methyl-sulfonyl-6-methyl-pyrimidine, equivalent amounts of 2,4-bis-methyl-sulfonyl-5-chloro-6-methyl-pyrimidine. The corresponding reactive dyestuff containing the 5-chloropyrimidine group is obtained and is employed with the same results in the described procedures.

In an analogous manner, there are obtained from the coupling components stated in the following Table, by acylation of their amino groups with 2-methyl-sulfonyl-4-chloro-6-methyl-pyrimidine and coupling of the resultant dyestuff intermediates with the stated diazo components, valuable reactive dyestuffs with which cellulose materials can be dyed or printed, preferably in the presence of sodium carbonate, in the specified shades.

The examples in the foregoing tabular form are repeated using instead of the 2-methyl-sulfonyl-4-chloro-6-methylpyrimidine, equivalent amounts of 2-methyl-sulfonyl-4,5-dichloro-6-methyl-pyrimidine. The corresponding reactive dyestuffs containing the 5-chloropyrimidine group are obtained and are employed with the same results in the described procedures.

EXAMPLE 269

Following the procedure of Example 30, except that the dyestuff intermediate obtained from 1,3-diaminobenzene-6-sulfonic acid and 2-methyl-sulfonyl-4-chloro-6-methyl-pyrimidine is coupled after diazotization at 10°C and a pH of 6.5–7.5 with a solution of 40.5 parts of the disodium salt of 2-sulfoacetylamino-5-hydroxynaphthalene-7-sulfonic acid, a reactive dyestuff of the formula

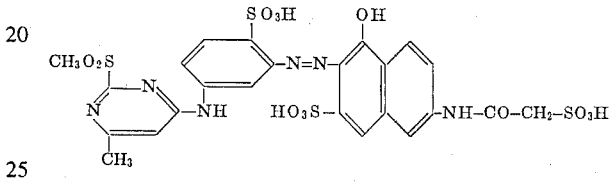

is obtained, which dyes cellulose materials by the usual methods of application with the use of sodium carbonate as an acid-binding agent in fast orange shades.

The foregoing example is repeated employing instead of the 2-methyl-sulfonyl-4-chloro-6-methyl-pyrimidine, equivalent amounts of 2-methyl-sulfonyl-4,5-dichloro-6-methyl-pyrimidine. The corresponding reactive dyestuff containing the 5-chloropyrimidine group is obtained and is employed with the same results in the described procedures.

| Example No. | Diazo component | Coupling component | Coupling pH | Shade |
|---|---|---|---|---|
| 256 | 1-amino-4-methoxy-benzene-6-sulfonic acid | 1-amino-8-hydroxy-naphthalene-3,6-disulfonic acid | 7 – 8 | violet |
| 257 | do. | 1-amino-8-hydroxy-naphthalene-4,6-disulfonic acid | 7 – 8 | reddish violet |
| 258 | do. | 2-amino-5-hydroxy-naphthalone-1,7-disulfonic acid | 7 | scarlet |
| 259 | 1-amino-5-chloro-benzene-2-sulfonic acid | 2-amino-5-hydroxy-naphthalene-1,7-disulfonic acid | 7 | orange |
| 260 | 1-aminobenzene-3-sulfonic acid | do. | 7 | do. |
| 261 | 1-aminobenzene-4-sulfonic acid | do. | 7 | do. |
| 262 | do. | 2-amino-8-hydroxy-naphthalene-3,6-disulfonic acid | 7 – 8 | scarlet |
| 263 | 4-aminobenzoic acid-(β-sulfo-ethyl)-amide | 1-amino-8-hydroxy-naphthalene-3,6-disulfonic acid | 7 – 8 | red |
| 264 | 1-amino-4-sulfo-acetylamino-benzene-6-sulfonic acid | do. | 7 – 8 | violet |
| 265 | 1-amino-3-sulfonic acetylamino-benzene-6-sulfonic acid | 2-amino-5-hydroxy-naphthalene-1,7-disulfonic acid | 7 | orange |
| 266 | 1-amino-4-sulpho-acetylamino-benzene | 2-amino-5-hydroxy-naphthalene-1,7-disulfonic acid | 7 | scarlet |
| 267 | 1-aminobenzene-2,4-disulfonic acid | 1-(2'-methyl-3'-amino-5'-sulfophenyl)-3-methyl-pyrazolone-(5) | 6 | yellow |
| 268 | 2-amino-naphthalene-4,8-disulfonic acid | do. | 6 | yellow |

EXAMPLE 270

Following the procedure of Example 206, except that instead of the aminoazo dyestuff there employed, 53.15 parts of the disodium salt of the aminoazo dyestuff obtained by coupling of diazotized 1-amino-4-nitrobenzene-sulfonic acid with 1-(2'-chloro-5'-sulfophenyl)-3-methyl-pyrazolone-(5) and subsequent reduction of the nitro group with sodium sulfide, are acylated with 2,4-bis-methyl-sulfonyl-6-methyl-pyrimidine, a valuable reactive dyestuff is likewise obtained with which cellulose materials can be dyed or printed by the usual dyeing and printing processes, in fast yellow shades.

The foregoing example is repeated employing instead of the 2,4-bis-methyl-sulfonyl-6-methyl-pyrimidine, equivalent amounts of 2,4-bis-methyl-sulfonyl-5-chloro-6-methyl-pyrimidine. The corresponding reactive dyestuff containing the 5-chloropyrimidine group is obtained and is employed with the same results in the described procedures.

Similar reactive dyestuffs are obtained when instead of the aminoazo dyestuff mentioned above, one of the aminoazo dyestuffs synthesized from the components stated in the following Table is acylated with 2-methyl-sulfonyl-4-chloro-6-methyl-pyrimidine.

is prepared by coupling of diazotized 1-hydroxy-2-amino-4-chloro-benzene-5-sulfonic acid with 2-methylamino-8-hydroxynaphthalene-6-sulfonic acid and coppering of the resultant azo dyestuff. In 700 parts of water are dissolved neutral 58 parts of this dyestuff and 22.0 parts of finely powdered 2-methyl-sulfonyl-4-chloro-6-methyl-pyrimidine are added, and the reaction mixture is stirred at 60° to 65°C, while continuously neutralizing the liberated hydrochloric acid to a pH of 7–7.5 with a sodium carbonate solution, until free amino groups can no longer be detected. The resultant reactive dyestuff of the formula

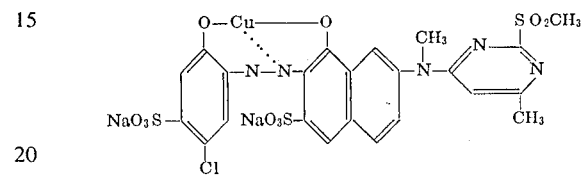

is salted out, filtered off, washed and dried at 30° to 40°C. The dyestuff dyes cellulose materials by one of

| Example No. | Diazo component | Azo component | Shade |
|---|---|---|---|
| 271 | 1-amino-4-nitro-benzene-2-sulfonic acid (reduced) | 1-(2'-methyl-4'-sulfophenyl)-3-methyl-pyrazolone-(5) | yellow |
| 272 | do. | 1-(2',5'-disulfophenyl)-3-methyl-pyrazolone-(5) | yellow |
| 273 | do. | 1-(2'-methyl-4'-sulfo-6'-chlorophenyl)-3-methyl-pyrazolone-(5) | yellow |
| 274 | do. | 1-(2',5'-dichloro-4'-sulfophenyl)-3-methyl-pyrazolone-(5) | yellow |
| 275 | 1-amino-3-acetylamino-benzene-6-sulfonic acid (hydrolyzed) | 1-(2'-methyl-4'-sulfophenyl)-3-methyl-pyrazolene-(5) | greenish yellow |
| 276 | do. | 1-(4'-sulfophenyl)-3-methyl-pyrazolone-(5) | greenish yellow |
| 277 | do. | 1-(2'-methyl-4'-sulfophenyl)-3-carboxy-pyrazolone-(5) | do. |
| 278 | do. | 1-(2'-chloro-4'-sulfophenyl)-3-carboxypyrazolone-(5) | do. |

The examples in the foregoing tabular form are repeated using instead of the 2-methyl-sulfonyl-4-chlor-6-methyl-pyrimidine, equivalent amounts of 2-methyl-sulfonyl-4,5-dichloro-6-methyl-pyrimidine. The corresponding reactive dyestuffs containing the 5-chloro-pyrimidine group are obtained and are employed with the same results in the described procedures.

EXAMPLE 279

The dyestuff of the formula

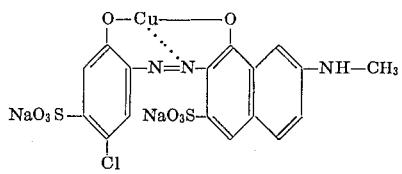

the processes described above, in very fast violet shades.

The foregoing example is repeated employing instead of the 2-methyl-sulfonyl-4-chloro-6-methyl-pyrimidine, equivalent amounts of 2-methyl-sulfonyl-4,5-dichloro-6-methyl-pyrimidine. The corresponding reactive dyestuff containing the 5-chloropyrimidine group is obtained and is employed with the same results in the described procedures.

Dyestuffs with similar properties are obtained by a method analogous to that described above from the copper complexes, obtained by simple demethylating or oxidizing coppering, of the mono- and disazo dyestuffs prepared from the diazo and azo components stated in the following Table.

| Example No. | Diazo component | Azo component | Coupling pH | Shade |
|---|---|---|---|---|
| 280 | 1-hydroxy-2-amino-4-chlorobenzene-5-sulfonic acid | 2-amino-8-hydroxy-naphthalene-3,6-disulfonic acid | 10 | reddish violet |

— Continued

| Example No. | Diazo component | Azo component | Coupling pH | Shade |
|---|---|---|---|---|
| 281 | do. | 1-amino-8-hydroxy-naphthalene-3,6-disulfonic acid | 10 | bluish violet |
| 282 | 2-amino-naphthalene-4,6,8-trisulfonic acid (coppered with oxidation) | 2-hydroxy-6-acetylamino-naphthalene-4-sulfonic acid (hydrolyzed) | 8 – 9 | reddish blue |
| 283 | 1-amino-2-hydroxy-6-nitronaphthalene-4-sulfonic acid (reduced) | 1-hydroxy-8-ethoxy-naphthalene-3,6-disulfonic acid | 10 | blue |
| 284 | 1-hydroxy-2-amino-benzene-4,6-disulfonic acid | 2-hydroxy-3-amino-naphthalene-5,7-disulfonic acid | 10 | red |
| 285 | 2-amino-naphthalene-4,8-disulfonic acid (coppered with oxidation) | do. | 8 – 9 | blue |
| 286 | 2-aminoaphthalene-4,6,8-trisulfonic acid (coppered with oxidation) | 2-hydroxy-3-amino-naphthalene-7-sulfonic acid | 8 – 9 | blue |
| 287 | 3-methoxy-4-amino-6-methyl-azobenzene-2',4'-disulfonic acid (coppered with dimethylation) | 2-methylamino-5-hydroxynaphthalene-7-sulfonic acid | 10 | navy blue |
| 288 | do. | 2-amino-8-hydroxy-naphthalene-3,6-di-sulfonic acid | 10 | do. |
| 289 | do. | 2-amino-5-hydroxy-naphthalene-1,7-di-sulfonic acid | 10 | do. |
| 290 | 3-methoxy-4-amino-6-methyl-azobenzene-2',5'-disulfonic acid (coppered with demethylation) | 2-methylamino-5-hydroxynaphthalene-7-sulfonic acid | 10 | navy blue |
| 291 | 3-methoxy-4-amino-6-methyl-azobenene-2',5'-disulfonic acid (coppered with demethylation) | 2-amino-8-hydroxy-naphthalene-3,6-di-sulfonic acid | 10 | do. |
| 292 | do. | 2-amino-5-hydroxy-naphthalene-1,7-di-sulfonic acid | 10 | do. |

The examples in the foregoing tabular form are repeated using instead of the 2-methyl-sufonyl-4-chloro-6-methyl-pyrimidine, equivalent amounts of 2-methyl-sulfonyl-4,5-dichloro-6-methyl-pyrimidine. The corresponding reactive dyestuffs containing the 5-chloropyrimidine group are obtained and are employed with the same results in the described procedures.

EXAMPLE 293

Following the procedure of Example 239, but using instead of the 54.7 parts of the disodium salt of 1-amino-4-([2'-methyl-3'-aminophenyl]-amino)-anthraquinone-2,5-disulfonic acid there mentioned, 63.5 parts of the trisodium salt of 1-amino-4-([3'-aminophenyl]-amino)-anthraquinone-2,4',6'-(or 2,2',6')-tri-sulfonic acid, a reactive dyestuff is obtained which dyes cellulose fibers by one of the usual dyeing processes in clear reddish-blue shades of very good fastness to wet processing.

When equivalent amounts of 1-amino-4-(3'-aminophenyl-amino)-anthraquinone-2,5,8-trisulfonic acid are used, a valuable reactive dyestuff is again obtained which dyes cotton in fast greyish-blue shades.

The foregoing example is repeated employing instead of the 2-methyl-sulfonyl-4-chloro-6-methyl-pyrimidine, equivalent amounts of 2-methyl-sulfonyl-4,5-dichloro-6-methyl-pyrimidine. The corresponding reactive dyestuff containing the 5-chloropyrimidine group is obtained and is employed with the same results in the described procedures.

EXAMPLE 294

In 300 parts of water are dissolved neutral 30.4 parts of 2-amino-8-hydroxynaphthalene-3,6-disulfonic acid, heated to 60° to 65°C, and 20 parts of 2,4-bis-methyl-sulfonyl-6-methylpyrimidine are added. 40 Parts of a 15% sodium carbonate solution are added in the course of one hour so that the pH value is between 6 and 7.5. The acylation product is in part precipitated.

A diazonium salt solution freshly prepared from 13.6 parts of p-aminobenzyl-sulfonic acid is added dropwise at 0° to 5°C to the suspension of the acylation product, which has been mixed with 12.5 parts of sodim carbonate. After further sitrring at ice-bath temperature for 5 hours, the product is salted out with sodium chloride, filtered off with suction, washed with a dilute sodium chloride solution and dried at 30°C in a vacuum dryer. The resultant dyestuff corresponds to the formula

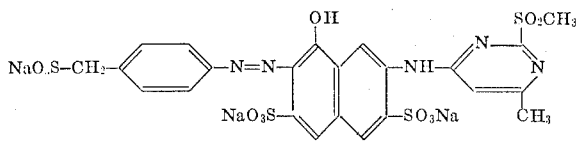

when the procedure described above is followed, but instead of 30.4 parts of 2-amino-8-hydroxynaphthalene-3,6-disulfonic acid, 30.4 parts of 2-amino-5-hydroxynaphthalene-1,7-disulfonic acid are acylated with 2-methyl-sulfonyl-4-chloro-6-methyl-pyrimidine, and the reactive group-containing coupling component is coupled with diazotized p-aminobenzylsulfonic acid, a readily soluble reactive dyestuff is obtained which dyes fabrics containing cellulose fibers in brilliant reddish-orange shades.

The foregoing example is repeated employing instead of the 2-methyl-sulfonyl-4-chloro-6-methyl-pyrimidine, equivalent amounts of 2-methyl-sulfonyl-4,5-dichloro-6-methyl-pyrimidine. The corresponding reactive dyestuff containing the 5-chloropyrimidine group is obtained and is employed with the same results in the described procedures.

A cotton or staple fiber fabric is impregnated on the foulard at 20° to 25°C with a solution containing, per liter of liquor, 30 g of the dyestuff described in Paragraph 1 of the present example, 100 g of urea and 20 g of sodium carbonate, the fabric is squeezed to a moisture content of about 100%, and the moist fabric is rolled up again. After standing at room temperature for 24 hours, the fabric is rinsed, soaped at the boil in the usual manner, and dried. A brilliant scarlet dyeing of good fastness to wet processing and light is obtained.

A cotton or staple fiber fabric is impregnated on the fourlard at 20° to 25°C with a solution containing, per liter of liquor, 30 g of the dyestuff described in Paragraph 1 of the present example, 100 g of urea and 20 g of sodium carbonate, the fabric is squeezed to a moisture content of about 100% and steamed at 103°C for 30 seconds. After rinsing, soaping at the boil, and drying, a brilliant scarlet dyeing of good fastness to wet processing and light is likewise obtained.

A cotton fabric is impregnated with a solution at 20° to 25°C which contains, per liter of liquor, 20 g of the dyestuff obtainable according to Paragraph 1 of the present example and 0.5 g of a non-ionic wetting agent (e.g. a polyoxethylated oleyl alcohol), as well as 150 g of urea and 15 g of sodium bicarbonate. The fabric is subsequently squeezed between two rubber rollers to a moisture content of about 100%. After an intermediate drying at 50° to 60°C, the fabric is heated at 140°C for 10 minutes, and the dyeing thus obtained is thorougly rinsed with water and treated at the boil for 10 minutes with a solution containing, per liter, 5 g of Marseilles soap and 2 g of sodium carbonate. After rinsing and drying, an intense scarlet dyeing of good fastness to wet processing and light is obtained.

When a cellulose fabric is printed with a printing paste which contains, per kilogram, 30 g of the dyestuff described in Paragraph 1 of the present example, 100 g of urea, 300 g of water, 500 g of alginate thickener (60 g of sodium alginate per kg of thickener), 10 g of sodium carbonate and 10 g of the sodium salt of 3-nitrobenzene-sulfonic acid, and which has been made up with water to 1 kilogram, the fabric is subsequently subjected to an intermediate drying and then steamed in a suitable steaming apparatus at 103° to 115°C for 30 seconds, rinsed and soaped at the boil, an intense scarlet dyeing of good fastness properties is obtained.

100 Parts of wool are introduced at 40°C into a bath which contains, in 5000 parts of water, 1.5 parts of the dyestuff described in Paragraph 1 of the present example, as well as 6 parts of 30% acetic acid and 0.5 parts of a polyoxethylated hydroxyl group-containing stearylamine derivative. The dyebath is brought to the boil within 30 minutes, and dyeing is then carried out at the boil for one hour. After rinsing and drying, a brilliant scarlet dyeing of good fastness to washing, milling and light is obtained.

The foregoing example is repeated employing instead of the 2,4-bis-methyl-sulfonyl-6-methyl-pyrimidine, equivalent amounts of 2,4-bis-methyl-sulfonyl-5-chloro-6-methyl-pyrimidine. The corresponding reactive dyestuff containing the 5-chlorophyrimidine group is obtained and is employed with the same results in the described procedures.

EXAMPLE 295

2-Amino-1-methylbenzene-3,5-disulfonic acid (monosodium salt), 28.9 parts, is diazotized and the diazo compound is coupled with 13.7 g of 1-amino-2-methoxy-5-methylbenzene in a weakly acidic medium. The monoazo dyestuff obtained is isolated and subsequently diazotized, or diazotized immediately in solution without isolation, and coupled in an alkaline medium with 25.3 parts of 2-methylamino-5-hydroxynaphthalene-7-sulfonic acid. The resultant disazo dyestuff is salted out by the addition of sodium chloride, filtered off with suction and the isolated product is metallized with about 50 parts of crystalline copper sulfate, 40 parts of diethanolamine, 50 parts of ammonia (d 0.88) at 95° to 100°C within 5 hours. The dyestuff is isolated from the coppering solution by the addition of salt and careful acidification.

The coppered amino-disazo dyestuff is then acylated in an aqueous solution at a pH of 7–8 and at a temperature of 60° to 65° C with 22.0 parts of 2-methyl-sulfonyl-4-chloro-6-methyl-pyrimidine, while maintaining the pH within the stated range by the addition of sodium carbonate. When the acylation is completed, the dyestuff is isolated by means of sodium chloride and dried at 35°C. In the form of the free sulfonic acid, the dyestff corresponds to the formula

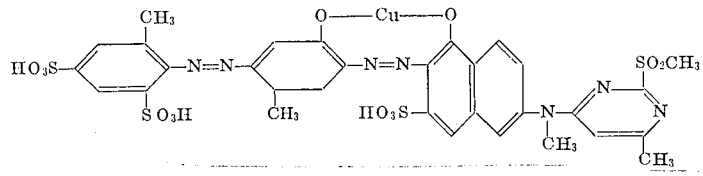

The dyestuff dyes cellulose fabrics by the processes known for reactive dyestuffs, in navy blue shades fast to wet processing and light.

Further dyestuff according to the invention can be prepared in a similar manner, when the above monoazo dyestuff obtained from 2-amino-1-methylbenzene-3,5-disulfonic acid and 1-amino-2-methoxy-5-methylbenzene is combined according to the instructions given above with the aminonaphthol-sulfonic acids stated in the following Table and with 2-methyl-sulfonyl-4-chloro-6-methyl-pyrimidine.

Coupling component
  2-amino-5-hydroxynaphthalene-1,7-disulfonic acid 2-amino-8-hydroxynaphthalene-3,6-disulfonic acid The dyestuffs obtained have a blue color.

The foregoing example is repeated employing instead of the 2-methyl-sulfonyl-4-chloro-6-methyl-pyrimidine, equivalent amounts of 2-methyl-sulfonyl-4,5-dichloro-6-methyl-pyrimidine. The corresponding reactive dyestuff containing the 5-chloropyrimidine group is obtained and is employed with the same results in the described procedures.

EXAMPLE 296

4-Ureido-2-amino-1-hydroxybenzene-5-sulfonic acid, 0.1 mol, is diazotized and coupled in a soda-alkaline medium with 0.1 mol of 1-amino-8-hydroxynaphthalene-2,4-disulfonic acid. The coupling solution is adjusted to a content of 2 mol/liter with caustic soda and then boiled under reflux for three hours to hydrolyze the ureido group. After cooling, the reaction mixture is neutralized with hydrochloric acid. The dyestuff is metallized at 45°C and a pH value of 4–6 by the addition of 25 parts of copper sulfate and 100 parts of 2N sodium hydroxide solution and, after 30 minutes, acylated at a pH of 7–7.5 and at temperatures of 60° to 70°C with 0.1 mol of 2-methyl-sulfonyl-4-chloro-6-methyl-pyrimidine. The resultant dyestuff of the formula

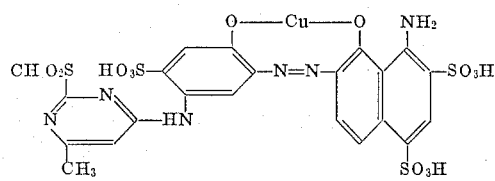

is salted out. A blue dyeing is obtained on cotton.

The foregoing example is repeated employing instead of the 2-methyl-sulfonyl-4-chloro-6-methyl-pyrimidine, equivalent amounts of 2-methyl-sulfonyl-4,5-dichloro-6-methyl-pyrimidine. The corresponding reactive dyestuff containing the 5-chloropyrimidine group is obtained and is employed with the same results in the described procedures.

EXAMPLE 297

A neutral paste of copper-phthalocyanine-3,3′, 3″-trisulfonic acid chloride, prepared from 600 g of technical 96% copper-phthalocyanine, is slurried with a little water, adjusted to 4 liters and reacted at a pH of 3.5–6.0 with 216 g of N-methyl-N-(4′-amino-2′-sulfobenzyl)-amine, initially at 0° to 3°C, finally at 20° to 35°C, with the addition of 300 ml (295 g) of pyridine, and the pyridine is then distilled off with steam at a pH of 9.0 from the resultant solution of copper-phthalocyanine-disulfonic acid-monosulfonic acid-(3′-sulfo-4′-methyl-aminoethyl-anilide). The solution is heated to 60°C, and 330 g of finely powdered 2,4-bis-methyl-sulfonyl-6-methyl-pyrimidine are strewn in portionwise in the course of one to two hours, while maintaining a pH of 7.5–8.5 by the addition of a dilute sodium hydroxide solution. At the same time the reaction mixture is diluted, as required, with sufficient water for the dyestuff to remain constantly dissolved.

There is thus obtained 10 liters of a dyestuff solution which is separated from the excess acylating agent, adjusted to a pH of 7.0 by the addition of acetic acid, and precipitated by adding 2.5 liters of a concentrated sodium chloride solution while stirring.

After filtering off with suction and drying at 30°C, a clear turquoise-blue dyestuff is obtained which is fixed on cotton from a soda-alkaline solution at 40° to 60°C with a very good yield and very good fastness to washing.

When NiPc-3,3′,3″-trisulfonic acid is used as starting material, a turquoise-blue is obtained which is only slightly more greenish and has equally valuable properties.

The foregoing example is repeated employing instead of the 2,4-bis-methyl-sulfonyl-7-methyl-pyrimidine, equivalent amounts of 2-methyl-sulfonyl-4,5-dichloro-7-methyl-pyrimidine. The corresponding reactive dyestuff containing the 5-chloropyrimidine group is obtained and is employed with the same results in the described procedures.

EXAMPLE 298

The aminoazo dyestuff having the formula

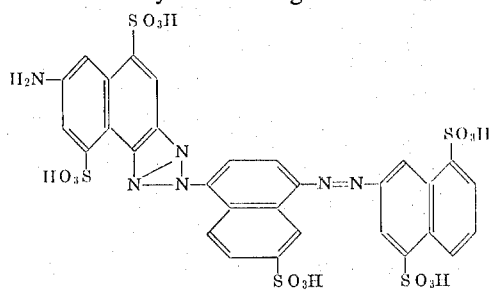

is prepared according to the procedure set forth in German Pat. No. 1,115,865 through coupling of the diazo compound obtained from 2-aminonaphthalene-4,8-disulfonic acid with 1-aminonaphthalene-6-sulfonic acid and further diazotization of the resulting aminoazo dyestuff followed by coupling with equivalent amounts of 2,5-diaminonaphthalene-4,8-disulfonic acid and transformation into the aminotriazole. This dyestuff, 0.1 mol, is dissolved in water at a pH of 6, and reacted under agitation at 60° to 65°C with 21 parts of 2-methylsulfonyl-4-chloro-6-methyl-pyrimidine. The released hydrochloric acid is neutralized slowly with a sodium carbonate solution until the reaction is completed. The dyestuff is separated by the addition of sodium chloride, isolated and dried in a vacuum at about 50°C. A yellow powder dissolving in water with a yellow color is obtained.

The foregoing example is repeated employing instead of the 2-methyl-sulfonyl-4-chloro-6-methyl-pyrimidine, equivalent amounts of 2-methyl-sulfonyl-4,5-dichloro-6-methyl-pyrimidine. The corresponding reactive dyestuff containing the 5-chloropyrimidine group is obtained and is employed with the same results in the described procedures.

EXAMPLE 299

In 200 parts of water at a pH of 8 and at a temperature of 70° to 80°C is slurried 38.9 parts of the dyestuff obtained by soda-alkaline coupling from 6-nitro-2-diazo-1-hydroxybenzene-4-sulfonic acid and 2-hydroxynaphthalene and 67.9 parts of the chromium complex compound of the azo dyestuff from 4-chloro-2-diazo-1-hydroxybenzene-6-sulfonic acid and 1-amino-8-hydroxynaphthalene-3,6-disulfonic acid, containing 1 chromium atom per dyestuff molecule, are added to this suspension, while maintaining the pH between 7 and 9 by the dropwise addition of a sodium carbonate solution. After 20 minutes at 70° to 80°C, a dark blue solution has formed. The paper chromatogram shows that a uniform mixed complex has been formed. The mixed complex is acylated within one hour at 65°C and a pH of 7–8 with 25.0 parts of 2-methyl-sulfonyl-4-chloro-6-methyl-pyrimidine, the pH being maintained within the stated range by the dropwise addition of a sodium carbonate solution. the acylated dyestuff is salted out with a 20% potassium chloride solution, filtered off and dried at 30°C. A dark powder is obtained which dissolves in water, with a blue-grey color.

In the form of the pentasodium salt, the dyestuff corresponds to the formula

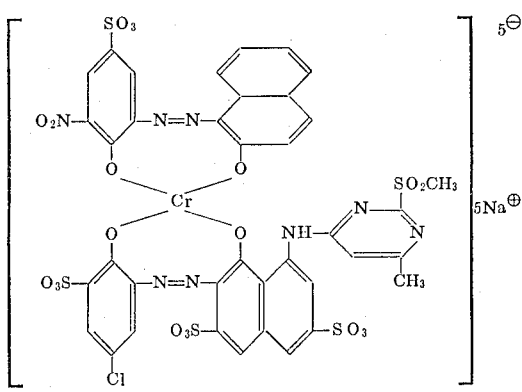

The dyestuff dyes cotton by the processes described in Examples 1–3, in grey to black shades.

The foregoing example is repeated employing instead of the 2-methyl-sulfonyl-4-chloro-6-methyl-pyrimidine, equivalent amounts of 2-methyl-sulfonyl-4,5-dichloro-6-methyl-pyrimidine. The corresponding reactive dyestuff containing the 5-chloropyrimidine group is obtained and is employed with the same results in the described procedures.

Valuable dyestuffs can also be obtained in the manner described in the present example from the starting components given the following Table. For the production of these dyestuffs, the azo dyestuff containing the reactive group in the 2:1 mixed complex was always used as 1:1 chromium complex.

| Example No. | 1:1 Chromium complex (In terms of reactive components) | Metal-free dyestuff (In terms of coupling components) | Shade on cotton |
|---|---|---|---|
| 300 | 4-nitro-2-amino-1-hydroxybenzene-6-sulfonic acid → 1-amino-8-hydroxynaphthalene-3,6-disulfonic acid | 4-nitro-2-amino-1-hydroxybenzene → 2-hydroxynaphthalene | black |
| 301 | do. | do. | do. |
| 302 | do. | do. | do. |
| 303 | do. | 4-nitro-2-amino-1-hydroxybenzene → 2-hydroxynaphthalene-6-sulfonic acid | do. |
| 304 | do. | do. | do. |
| 305 | do. | 4-nitro-2-amino-1-hydroxybenzene → 1-hydroxnaphthalene-4-sulfonic acid | navy blue |
| 306 | do. | 6-nitro-2-amino-1-hydroxybenzene-4-sulfonic acid → 2-hydroxynaphthalene | black |
| 307 | do. | 4-nitro-2-amino-1-hydroxybenzene → 1-acetylamino-7-hydroxynaphthalene | do. |
| 308 | do. | 6-nitro-1-amino-2-hydroxynaphthalene-4-sulfonic acid → 2-hydroxynaphthalene | do. |
| 309 | 4-nitro-2-amino-1-hydroxybenzene-6-sulfonic acid → 1-amino-8-hydroxynaphthalene-4,6-disulfonic acid | 4-nitro-2-amino-1-hydroxynaphthalene-6-sulfonic acid → 2-hydroxynaphthalene | black |
| 310 | 4-chloro-2-amino-1-hydroxybenzene-6-sulfonic acid → 1-amino-8-hydroxynaphthalene-3,6-disulfonic acid | 4-nitro-2-amino-1-hydroxybenzene → 2-hydroxynaphthalene | blue-black |
| 311 | do. | do. | do. |
| 312 | do. | 4-nitro-2-amino-1-hydroxbenzene → 2-hydroxynaphthalene-6-sulfonic acid | do. |
| 313 | do. | 4-chloro-2-amino-1-hydroxybenzene → 2-hydroxynaphthalene | navy blue |
| 314 | do. | 4-nitro-2-amino-1-hydroxybenzene → 1-acetylamino-8-hydroxynaphthalene-3,6-disulfonic acid | blue |
| 315 | do. | 4-nitro-2-amino-1-hydroxbenzene → 1-amino-8-hydroxynaphthalene 2,4-disulfonic acid | navy blue |
| 316 | do. | 6-nitro-1-amino-2-hydroxynaphthalene-4-sulfonic acid → 2-hydroxynaphthalene | blue-black |
| 317 | do. | 2-aminobenzene-1-carboxylic acid-5-sulfonic acid → 1-phenyl-3-methyl-5-pyrazolone | grey-green |
| 318 | 4-nitro-2-amino-1-hydroxybenzene-6-sulfonic acid → 1-amino-8-hydroxynaphthalene-3,6-disulfonic acid | 6-nitro-1-amino-2-hydroxynaphthalene-4-sulfonic acid → 2-hydroxynaphthalene | black |
| 319 | 4-chloro-2-amino-1-hydroxybenzene-6-sulfonic acid → 1-amino-8-hydroxynaphthalene-3,6-disulfonic acid | 4-chloro-2-amino-1-hydroxybenzene → 1(4'-sulfophenyl-3-methyl-5-pyrazolone | violet |
| 320 | 4-methyl-2-amino-1-hydroxybenzene-6-sulfonic acid → 1-amino-8-hydroxynaphthalene-3,6-disulfonic acid | 4-chloro-2-amino-1-hydroxybenzene → 2-hydroxynaphthalene-6-sulfonic acid | reddish blue |
| 321 | 4-nitro-2-amino-1-hydroxybenzene-6-sulfonic acid → 1-amino-8-hydroxynaphthalene-3,6-disulfonic acid | 5-nitro-2-amino-1-hydroxybenzene → 2-hydroxynaphthalene-6-sulfonic acid | black |
| 322 | do. | 4-nitro-2-amino-1-hydroxybenzene → 2-hydroxynaphthalene-8-sulfonic acid | do. |
| 323 | do. | 4-nitro-2-amino--hydroxybenzene → 1-hydroxynaphthalene-5-sulfonic acid | do. |
| 323a | do. | 6-nitro-4-chloro-1-hydroxybenzene → 1-hydroxynaphthalene-5-sulfonic acid | do. |

The examples in the foregoing tabular form are repeated using instead of the 2-methyl-sulfonyl-4-chloro-6-methylpyrimidine, equivalent amounts of 2-methyl-sulfonyl-4,5-dichloro-6-methyl-pyrimidine. The corresponding reactive dyestuffs containing the 5-chloropyrimidine group are obtained and are employed with the same results in the described procedures.

EXAMPLE 324

In 300 parts of water at 70° to 80° C and a pH of 8-9 are mixed 62.0 parts of the trisodium salt of the dyestuff obtained by soda-alkaline coupling from diazotized 4-chloro-2-amino-1-hydroxybenzene-6-sulfonic acid and 1-amino-8-hydroxynaphthalene-3,6-disulfonic acid with 54.2 parts of the 1:1 chromium complex of the dyestuff from 6-nitro-1-diazo-2-hydroxynaphthalene-4-sulfonic acid and 2-hydroxynaphthalene. A deep blue solution was formed after 10 minutes.

The mixed complex is acylated within about 1 hour at 60° to 65°C and at a pH of 6.5–7.5 with 25 parts of 2-methylsulfonyl-4-chloro-6-methyl-pyrimidine, while maintaining a constant pH by the dropwise addition of a sodium carbonate solution. The acylated dyestuff is separated with a 20% sodium chloride solution, filtered off with suction and dried at 30°C, and has the formula

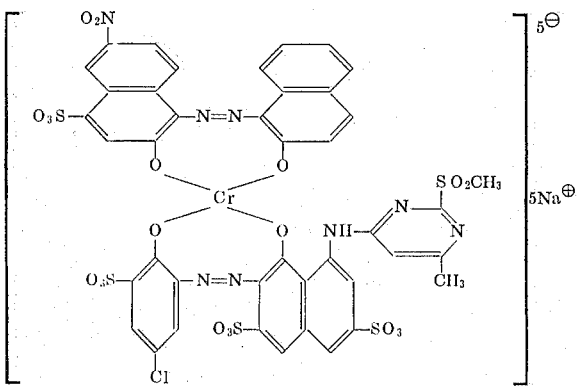

A blue-black print of excellent fastness to light and washing is obtained on cotton by the process described in Example 3.

The foregoing example is repeated employing instead of the 2-methyl-sulfonyl-4-chloro-6-methyl-pyrimidine, equivalent amounts of 2-methyl-sulfonyl-4,5-dichloro-6-methyl-pyrimidine. The corresponding reactive dyestuff containing the 5-chloropyrimidine group is obtained and is employed with the same results in the described procedures.

EXAMPLE 325

In 180 ml of water are dissolved in the form of the sodium salt at 40°C, 6 g of 1-amino-4 -(4'-aminophenylamino)-anthraquinone -2,5,8-trisulfonic acid, the solution is adjusted to a pH of 8, and 2.5 g of 2-methyl-sulfonyl-4-chloro-6-methylpyrimidine are introduced in small portions at 65° to 70°C. At the same time a dilute sodium hydroxide solution is added dropwise in such a manner that a pH of 7.5–8.5 is maintained during the reaction. Stirring is continued at 65° to 70°C, until the starting material has completely disappeared, the product is filtered off with suction from the excess pyrimidine derivative, and salted out at 10°C with sufficient solid sodium chloride for a 10% sodium chloride solution to result. After filtering off with suction and washing with a little sodium chloride solution, the resultant dyestuff of the formula

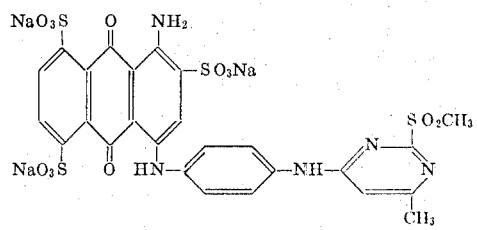

is dried in a vacuum below 40°C. About 8.5 g of the dyestuff is obtained in the form of blue-green needles.

The dyestuff dyes cotton by the processes customary for reactive dyestuffs, in intense blue-green shades of good fastness to wet processing and light.

The 1-amino-4-(4'-aminophenylamino)-anthrquinone-2,5,8-trisulfonic acid used as starting material is obtained as follows: 31.2 g of p-phenylene-diamine are introduced under nitrogen into a solution of 62 g of 1-amino-4-bromo-anthraquinone -2,5,8-trisulfonic acid sodium salt and 12 g of sodium carbonate, and stirred with the addition of a CuCl paste at 40°C until disulfonated bromoamino acid can no longer be detected. The solution is then mixed with dilute hydrochloric acid, the dyestuff thus precipitated is filtered off with suction, washed with dilute hydrochloric acid, mixed in 300 g of water with just sufficient dilute sodium hydroxide solution to form a solution, and the dyestuff is precipitated in the hot in the form of the sodium salt; the product is then washed and dried.

The foregoing example is repeated employing instead of the 2-methyl-sulfonyl-4-chloro-6-methyl-pyrimidine, equivalent amounts of 2-methyl-sulfonyl-4,5-dichloro-6-methyl-pyrimidine. The corresponding reactive dyestuff containing the 5-chloropyrimidine group is obtained and is employed with the same results in the described procedures.

In the above examples, the reactive components employed can be interchanged under the same or similar reaction conditions. It is also possible to use, with equally goor or similar results, the reactive components stated on page 11 in the first full paragraph, for the reactions according to the above examples, instead of the reactive components there mentioned.

EXAMPLE 326

In 500 parts of water are dissolved at 60° to 65°C, 79.9 parts of the aminoazo compound of the formula

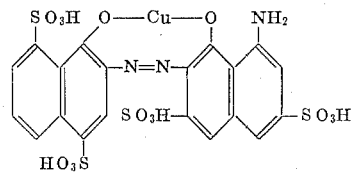

prepared according to Belgian Pat. Specification No. 599,581, and mixed at the same temperature with 21 parts of 2-methyl-sulfonyl-4-chloro-6-methyl-pyrimidine, while stirring. The slowly liberated hydrochloric acid is neutralized with a sodium carbonate solution while maintaining a pH value between 5 and 6. When the condensation is completed, the dyestuff is salted out by the adddition of 150 parts of potassium chloride, isolated, and dried at about 50°C in a vacuum. A dark powder is obtained which dissolves in water, with a blue color, and dyes cotton in reddish-blue shades of excellent fastness to light and washing.

The foregoing example is repeated employing instead of the 2-methyl-sulfonyl-4-chloro-6-methyl-pyrimidine, equivalent amounts of 2-methyl-sulfonyl-4,5-dichloro-6-methyl-pyrimidine. The corresponding reactive dyestuff containing the 5-chloropyrimidine group is obtained and is employed with the same results in the described procedures.

EXAMPLE 327

To a solution of 34.7 parts of 2-aminonaphthalene-4,8-disulfonic acid sodium salt and 7 parts of sodium nitrite in 300 parts of water are added 28 parts by volume of concentrated hydrochloric acid while cooling with ice, and the mixutre is stirred at 0° to 10°C for 30 minutes. After removing the excess nitrous acid, 10.7 parts of 3-aminotoluene dissolved in 10 parts by volume of concentrated hydrochloric acid and 150 parts of water are added, and coupling is completed by neutralizing the mixture to a pH of 3–5. The resultant aminoazo dyestuff is salted out, filtered off with suction, washed and then redissolved at a pH of 7 in 700 parts of water with the addition of a sodium hydroxide solution. The aqueous solution is then mixed with 24 parts of 2-methyl-sulfonyl-4,5-dichloro-6-methyl-pyrimidine and vigorously stirred. The temperature of the reaction mixture is maintained at about 65°C by heating; the liberated hydrochloric acid is neutralized with a sodium carbonate solution, until the reaction is completed. The resultant dyestuff

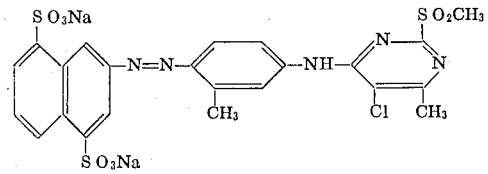

is salted out with 80 parts of sodium chloride, pressed off, washed and dried at about 50°C in a vacuum. It is a yellow powder which dissolves in water, with a yellow color.

When a cellulose farbic is printed with a printing paste which contains, per kilogram, 15 g of the dyestuff, 100 g of urea, 300 ml of water, 500 g of alginate thickener (60 g of sodium alginate per kg of thickener), 2 g of sodium hydroxide and 10 g of sodium carbonate, and which has been made up with water to 1 kilogram, the fabric is then dried, steamed at 105°C for 8 minutes, rinsed with hot water, and soaped at the boil, an intense, reddish-yellow print of good fastness to washing and light is obtained.

EXAMPLE 328

The copper complex compound

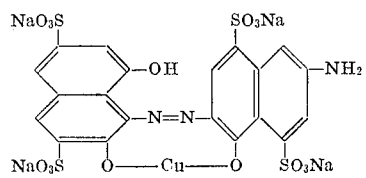

is prepared according to the instructions of German Patent Specification No. 1,117,235 by coupling of diazotized 1-amino-8-(benzene-sulfonyloxy)-naphthalene-disulfonic acid-(3,6) in a soda-alkaline medium with the equivalent amount of 2-acetylamino-5-hydroxynaphthalene-disulfonic acid-(4,8), conversion of the monoazo compound into the copper complex by oxidative coppering, and hydrolysis of the acetyl and benzene sulfonyl groups. This complex, 0.1 mol, is dissolved at a pH of 6–6.5 in 2500 parts by volume of water at 60° to 65°C and mixed at this temperature with 0.12 mol of 2-methylsulfonyl-4,5-dichloro-6-methyl-pyrimidine.

A pH of 7–7.5 is maintained during the condensation by the addition of a sodium carbonate solution. When the reaction is completed, the dyestuff is salted out and isolated. When dried, the dyestuff is a dark powder which dissolves in water, with a blue color.

A cotton fabric, 100 parts, is treated on the foulard at room temperature with an aqueous solution containing 2% of the dyestuff, 15 g/liter of sodium bicarbonate and 150 g/liter of urea, subjected to intermediate drying, heated at 140°C for ten minutes, then rinsed and soaped at the boil. The fabric is dyed in very clear blue shades fast to wet processing.

EXAMPLE 329

46 Parts of the monoazo dyestuff obtained in analogy with the instructions of Example 1 by coupling diazotized 2-aminonaphthalene-4,8-disulfonic acid with 3-methylamino-toluene, are dissolved at a pH of 7–8 in 400 parts of water at 60° to 65°C, the solution is mixed portionwise with a total of 25 parts, 2,4-bis-methyl-sulfonyl-5-chloro-6-methyl-pyrimidine in the presence of excess sodium acetate or calcium carbonate and stirred at the same temperature, until acidification of a sample no longer leads to a change of color. The resultant dyestuff of the probable formula

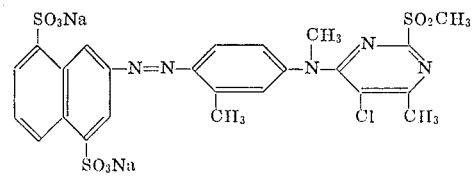

is salted out, filtered off with suction, washed and dried.

A cotton fabric is impregnated with a solution at 20° to 25°C, which contains, per liter of liquor, 20 g of the above dyestuff and 0.5 g of a non-ionic wetting agent (e.g. a polyoxethylated oleyl alcohol) as well as 150 g of urea and 15 g of sodium bicarbonate. The fabric is subsequently squeezed between two rubber rollers to a moisture content of about 100%. After an intermediate drying at 50° to 60°C, the fabric is heated at 140°C for 10 minutes and the dyeing thus obtained is thoroughly rinsed with hot water and treated for 20 minutes at the boil with a solution containing, per liter, 5 g of Marseilles soap and 2 g of sodium carbonate. After rinsing and drying, an intense, reddish-yellow dyeing of good fastness to wet processing, rubbing, and light is obtained.

EXAMPLE 330

In 150 parts by volume of concentrated hydrochloric acid are dissolved 12.5 parts of 3-amino-4-sulfobenzyl-N-methylamine. To the solution are added, dropwise, 4 parts of sodium nitrate in 20 parts by volume of water. The resulting clear solution of the diazonium salt is added dropwise at 30° to 35°C to an aqueous solution of an equivalent quantity of 1-N-benzoylamino-8-oxynaphthalene-4,6-disulfonic acid and 16 parts of sodium bicarbonate in 200 parts by volume of water.

The dyestuff partially precipitates and is dissolved by the addition of 2000 parts by volume of water at a temperature of 50° to 60°C; there is then added 20 parts of 2,4-bis-methylsulfonyl-6-methyl-pyrimidine. By the dropwise addition of a sodium carbonate solution, the pH is maintained at 7–8. Upon completion of the acylation, which is determined by the use of the sodium carbonate, the dyestuff is salted out with 10% sodium chloride, filtered off and dried in a vacuum oven at 30°C. The resulting bluish-red dyestuff has, in the acidic form, the formula

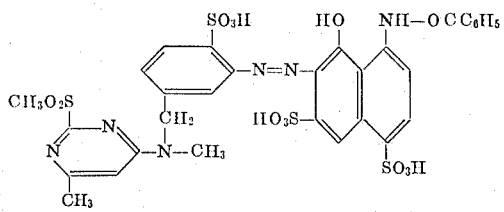

EXAMPLE 331

To an ice-cold, aqueous-methanolic suspension which contains 50.1 parts of 2,4,6-trisphenylsulfonyl-triazine-(1,3,5), which contains 2 parts of the condensation product of oleylalcohol with 20 mol of ethyleneoxide, is added dropwise with continuous neutralization of the released acid to a pH of 5–6 at about 0°C, 1500 parts by volume of an aqueous solution containing 56.8 parts of the trisodium salt of an aminoazo compound which is obtained through coupling of diazotized 1-aminobenzene-2-sulfonic acid with 1-acetylamino-8-hydroxynaphthalene-3,6-disulfonic acid in the presence of sodium carbonate and with the splitting off of the acetyl group through heating in a 4% aqueous solution of sodium hydroxide at 80° to 85°C. The solution is stirred for a few minutes at 0° to 5°C and at a pH of 5–6, and then adjusted to a pH of 6.5 with 100 parts by volume of a solution of 185 parts of $KH_2PO_4$ and 262 parts of $Na_2HOP_4.12\ H_2O$ in 1000 parts of water.

The resulting dyestuff having the formula

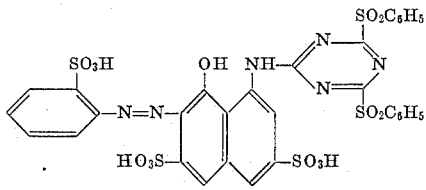

is salted out with 200 parts of sodium chloride, filtered off with suction and washed with acetone. The resulting dark powder is mixed with 10 parts of a mixture of 42 parts of $Na_2HPO_4$ and 75 parts of $KH_2PO_4$, and dried at a temperature of 20° to 30°C in a vacuum. The material dissolves in water with the formation of a red color.

The same dyestuff is obtained if the trisphenylsulfonyltriazine acylated 1-amino-8-hydroxynaphthalene-3,6-disulfonic acid is coupled with diazotized 1-aminobenzene-sulfonic acid at a pH of 5–6 and at a temperature of 0° to 5°C.

The dyestuff produced by the foregoing procedures when employed in the printing of cellulosic materials with sodium carbonate as the acid-binding material results in a strong bluish-red print of good fastness of wet processing and light. Similar shades are obtained on cotton fabrics using a long bath according to the thermofix process, or according to the so-called cold-bath-pad process.

EXAMPLE 332

To an ice-cold, aqueous methanolic suspension of 18.5 parts of 2,4,6-tris-phenylsulfonyl-triazine (1,3,5) which contains 1 part of the condensation product of oleylalcohol with 20 mol of ethyleneoxide, is added under continuous neutralization of the liberated acid to a pH of 5–6, a sodium carbonate neutralized solution of 19.2 parts of a dyestuff having the formula

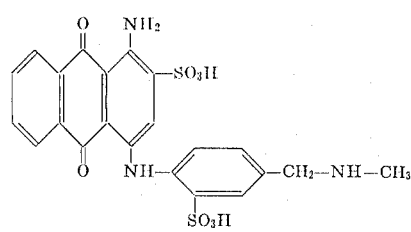

in 1000 parts of water. The resulting mixture is stirred for a few minutes at a temperature of 0° to 5°C and at a pH of 5–6, and then adjusted to a pH of 6.5 with 50 parts by volume of a solution containing 185 parts of $KH_2PO_4$ and 262 parts of $Na_2HPO_4.12\ H_2O$ in 1000 parts of water. The resulting dyestuff having the formula

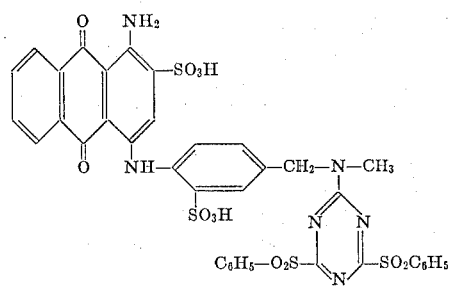

is salted out with 50 parts of sodium chloride, filtered off under pressure, and dried with 5 g of the phosphate mixture set forth in Example 331, in a vacuum at a temperature of 20° to 30°C. A dark powder is obtained which dissolves in water with a blue color and dyes cellulose fibers to a blue shade if applied from a sodium-alkali solution at room temperature, or from an aqueous solution through padding and after treatment of the padded material suitably after drying with a sodium hydroxide-or sodium chloride-containing aqueous solution, or when applied under pressure in a urea and sodium carbonate-containing printing paste. The dyed materials are characterized by high fastness to washing and light.

The reaction of 2,4,6-trisphenylsulfonyl-triazine-(1,3,5) with other amino-group containing anthraquinone dyestuff also results in valuable reactive dyestuffs which have the following formulas

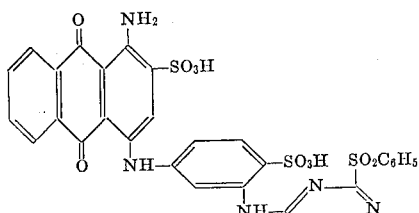

and

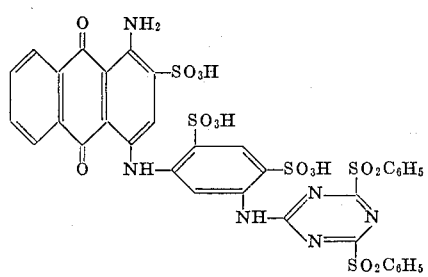

These also result in blue shades on cellulose fibers.

EXAMPLE 333

Following the procedure of Example 331, 54.4 parts of 2,4,6-tris-(o-methylphenyl)-sulfonyl-triazine-(1,3,5) is reacted with 49.7 parts of the disodium salt of the decylated aminoazo compound obtained from diazotized 4-aminoanisolsulfonic acid-(3) and 2-acetylamino-5-oxynaphthalene-7-sulfonic acid, one obtains a dyestuff having the formula

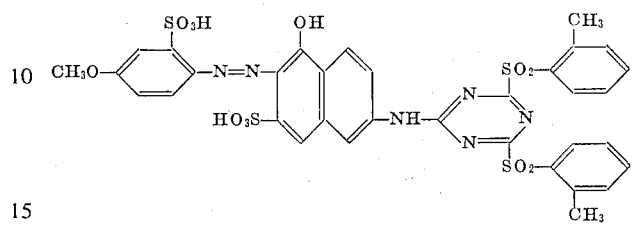

This dyestuff is a brownish-red powder which dissolves in water with red color and dyes cellulosic materials in fast scarlet shades.

Following the procedure of Example 331, 2,4,6-trisphenylsulfonyl-triazine-(1,3,5) is reacted with other aminoazo compounds to result in the dyestuffs set forth in the following Table which also shows the shades obtained with these dyestuffs on cellulosic materials.

| Dyestuff | Shade |
|---|---|
| | Orange. |
| | Do. |
| | Do. |
| | Do. |
| | Do. |
| | Do. |

-Continued

| Dyestuff | Shade |
|---|---|
| (structure) | Do. |
| (structure) | Scarlet. |
| (structure) | Do. |
| (structure) | Do. |
| (structure) | Do. |
| (structure) | Red. |
| (structure) | Red. |
| (structure) | Bluish-red. |
| (structure) | Do. |
| (structure) | Violet. |

Additional red or orange dyestuffs are obtained if one employs the dyestuffs which are obtained from the components listed in Examples 19–29 and need not be further specified here.

EXAMPLE 334

Following the procedure of Example 331, but using instead of the there indicated aminoazo dyestuff, 0.1 mol of the coupling product obtained from diazotized 2-aminonaphthalene-4,8-disulfonic acid and 3-aminotoluene, a dyestuff is obtained which has the formula

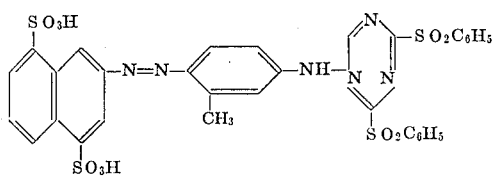

A yellow powder is obtained which dissolves in water with formation of a yellow color and which dyes cellulosic materials in fast yellow shades.

Yellow shades are also obtained on cellulosic material if the following dyestuffs are employed which are obtained in the above-described manner from the corresponding components.

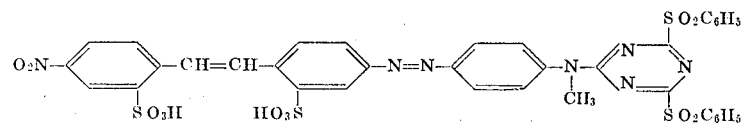

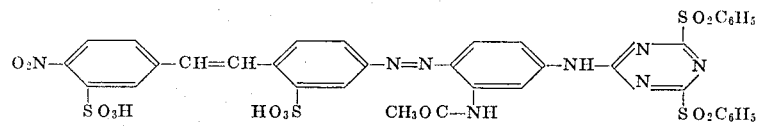

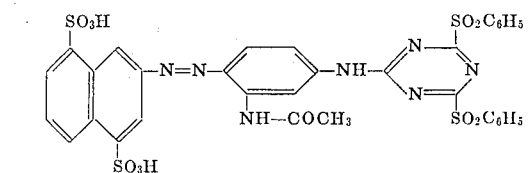

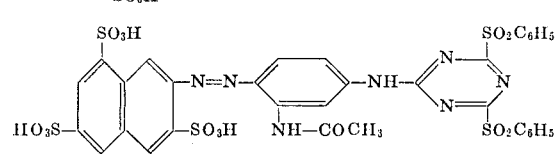

Similar yellow dyestuffs of this type are obtained by the condensation of 2,4,6-trisphenylsulfonyl-triazine-(1,3,5) with the dyes set forth in Examples 4–17.

EXAMPLE 335

Following the procedure of Example 331, 45.4 parts of 2,4,6-tri-(p-methylphenyl)-sulfonyl-triazine-(1,3,5) are reacted with 48.3 parts of the deacylated aminoazo compound obtained from diazotized 4-(N-acetylamino)-2-aminobenzenesulfonic acid and 1-(4'-sulfophenyl)-pyrazolone-5-carboxylic acid-(3) the dyestuff having the formula

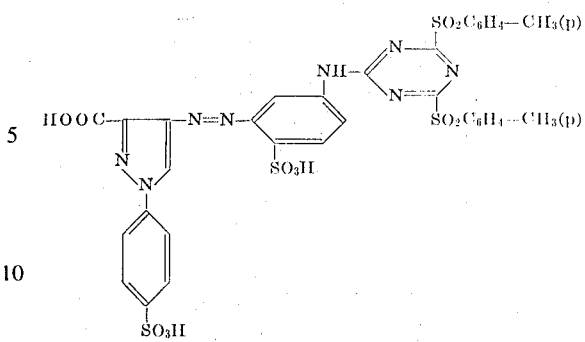

is obtained. The dyestuff is a yellow powder which dissolves in water with a yellow color and which dyes cotton in greenish-yellow shades with good fastness properties.

Dyestuffs prepared by analogous procedures and which result in analogous shades on cotton are

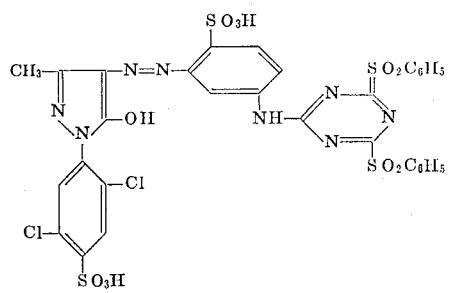

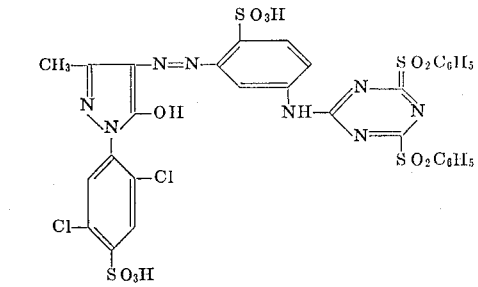

and

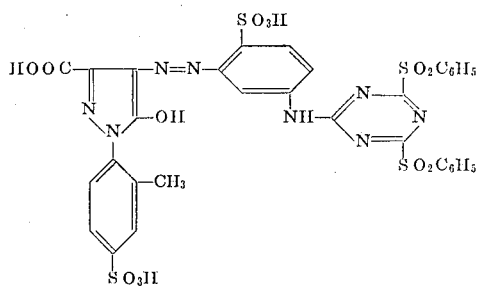

EXAMPLE 336

In 1500 parts of water at a pH of 6 is dissolved 0.1 mol of the copper complex having the formula

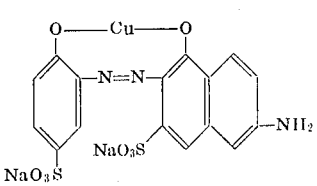

and condensed with neutralization using a sodium carbonate solution at a temperature of 0° to 5°C with an aqueous methanolic dispersion of 0.1 mol of 2,4,6-tris-phenylsulfonyltriazine-(1,3,5) which contains 2 parts of an emulsifying agent. The resulting reactive dyestuff dyes cellulose material in ruby shades fast to washing, rubbing, and light. Employing the foregoing procedure, similar reactive dyestuffs are obtained by the reaction of the metal complex compound set forth in Examples 48 to 63 with the sulfonyltriazine.

Extremely brilliant shades are obtained on cotton with the analogously produced dyestuff having the formula

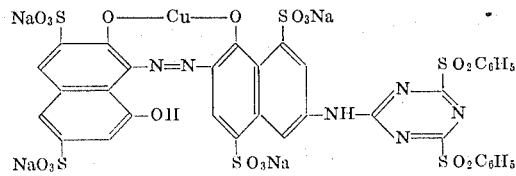

EXAMPLE 337

To a solution of 21 parts of the sodium salt of 1,3-diaminobenzene-6-sulfonic acid in 100 of water are added with stirring, 50.1 parts of 2,4,6-tris-phenylsulfonyl-triazine-(1,3,5) in aqueous methanolic solution. The reaction mixture is stirred at 0° to 5°C with continuous neutralization of the released acid to a pH of 5-6 until a sample on diazotization and coupling with 1-hydroxynaphthalene-4-sulfonic acid results in a clear yellowish-red color. The resulting dyestuff intermediate on addition of ice is diazotized directly with 7 parts of sodium nitrite and 28 parts of concentrated HCl and then combined with a prepared solution of 47 parts of the sodium salt of 1-benzoylamino-8-hydroxynaphthalene-3,6-disulfonic acid and 12 parts of sodium carbonate in 200 parts of water whereby coupling to a dyestuff having the formula

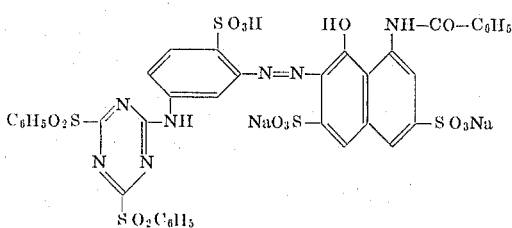

which dyestuff is salted out, filtered, washed and dried at 20°C in a vacuum. The dyestuff dissolves in water with a red color and results in clear bluish-red shades or prints of high fastness properties on cellulose materials.

In a similar manner, dyestuffs can be obtained which have the described nuances if the combination recited in Examples 31-46 are employed.

EXAMPLE 338

Employing the reaction product of copper phthalocyanine sulfochloride and 1,3-diaminobenzene-4-sulfonic acid described in Example 64, there are obtained by condensation with 2,4,6-tris-phenylsulfonyl-triazine-(1,3,5) at 5° to 10°C and at a pH of 6-7, dyestuffs which dye cotton and regenerated cellulose according to one of the above-described dyeing or printing processes in clear turquoise shades of good washing, rubbing, and light fastness.

A particularly valuable dyestuff class is obtained if the condensation product of copper phthalocyanine sulfochloride and 1,3-diaminobenzene-4-sulfonic acid is reacted with an ammonium hydroxide solution, resulting is a compound of the following composition

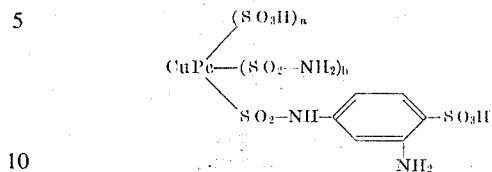

wherein $a$ is 2.7 to 2 and $b$ is 0.3 to 1. The condensation of the reactive components such as, for example, 2-methyl-sulfonyl-4,5-dichloro-6-methyl-pyrimidine, 2-methyl-sulfonyl-4-chloro-6-methyl-pyrimidine, 2,4,6-tris-phenyl-sulfonyl-trioxane-(1,3,5), 2-methyl-sulfonyl-4-chloro-5-bromo-6-methyl-pyrimidine, 2-methyl-sulfonyl-4-chloro-5-cyanopyrimidine, etc., is accomplished using in each instance the here generally applicable conditions.

EXAMPLE 339

Reactive dyestuffs are obtained by employing the amino group-containing dyestuffs or dyestuff intermediates in Examples 65-326 and condensing such according to the procedures in Examples 331-338 with 2,4,6-tris-phenylsulfonyltriazine-(1,3,5) and suitably reacting such further as indicated in said examples. The reactive dyestuffs obtained result in dyed products of excellent wet fastness.

EXAMPLE 340

The reactive dyestuffs described in Examples 331-339 which contain two phenylsulfonyl groups in each triazine ring can be reacted in a mol ratio of 1:1 at 20° to 70°C with neutralization of the liberated acid with colorless amino-, hydroxy- or mercapto derivatives such as, for example, N-methylaniline, aminobenzene-3-sulfonic acid, aminobenzene-4-sulfonic acid, aminobenzene-3-carboxylic acid, ethylamine, β-hydroxyethylamine, β,β'-dihydroxydiethylamine, N,N-dimethylhydrazine, methylalcohol, ethylalcohol, trichloroethylalcohol, phenol, phenolsulfonic acid, methylmercaptan, thiophenol, or thiourea, so that only one phenylsulfonic acid group for each triazine ring remains, to similarly result in reactive dyestuffs which result in dyed materials of excellent wet and acid fastness. The reactive component, 2,4,6-tris-phenylsulfonyl-triazine-(1,3,5), is obtained by the oxidation of 2,4,6-tris-phenylmercaptotriazine-(1,3,5) employing chlorine in aqueous methanolic solution at −10° to +10°C.

EXAMPLE 341

Reactive dyestuffs of similarly good properties are obtained if the 2-methylsulfonyl-4,5-dichloro-6-methylpyrimidine or the 2,4-bis-methylsulfonyl-5-chloro-6-methylpyrimidine is replaced by 2-methylsulfonyl-4-chloro-5-bromo-6-methylpyrimidine or, respectively, 2,4-bis-methylsulfonyl-5-bromo-6-methylpyrimidine, in the herein described examples.

EXAMPLE 342

Reactive dyestuffs of similarly good properties are obtained if the 2-methylsulfonyl-4-chloro-6-methylpyrimidine or the 2,4-bis-methylsulfonyl-6-methylpyrimidine of Examples 1–329 is replaced by 2-methylsulfonyl-4-chloro-6-phenylpyrimidine or, re-

EXAMPLE 343

Reactive dyestuffs of similarly good properties are obtained if the 2-methylsulfonyl-4,5-dichloro-6-methylpyrimidine or, respectively, the 2,4-bis-methylsulfonyl-5-chloro-6-methylpyrimidine of Examples 1-329 is replaced with 2-methylsulfonyl-4,5-dichloropyrimidine or, respectively, 2,4-bis-methylsulfonyl-5-chloropyrimidine.

EXAMPLE 344

Reactive dyestuffs with improved solubility properties are obtained if the 2-methylsulfonyl-4-chloro-6-methylpyrimidine of Examples 1-326 is replaced with 2-carboxymethylsulfonyl-4-chloro-6-methylpyrimidine.

The following Table gives the diazo components, coupling components, and the reactive components which can be linked to the amino group, from which dyestuffs can be synthesized in analogy with Examples 327-329; the shades obtained by one of the methods of application described above are also specified in the Table. In the Table, reactive component A is 2-methyl-sulfonyl-4,5-dichloro-6-methyl-pyrimidine, and reactive component B is 2,4-bis-methyl-sulfonyl-5-chloro-6-methylpyrimidine.

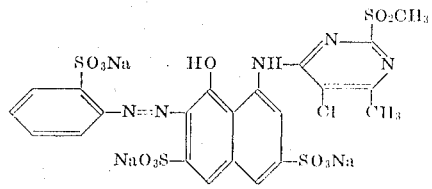

formed at a final pH of about 7, is salted out with 100 parts of sodium chloride, filtered off with suction, washed and dried at 30° to 40°C in a vacuum. The dyestuff forms small red needles of metallic luster which readily dissolve in water, with a red color.

When a fabric of cotton or regenerated cellulose is dyed or printed with this dyestuff according to the process described in Examples 327-329, clear bluish-red shades and prints of good fastness to wet processing, rubbing, and light are obtained.

Equally good results are obtained according to the following process.

Cotton skein, 50 g, is dyed in 1 liter of a dyebath which contains 1.5 g of the above dyestuff, by raising the temperature within 30 minutes from 20°C to about 80°C while adding a total of 50 g of sodium chloride in several portions, subsequently adding 20 g of sodium carbonate and treating the material at this temperature

| | Abbreviations for the reactive components: | A: 2-methylsulfonyl-4-chloro-6-methyl-pyrimidine<br>B: 2,4-bis-methylsulfonyl-6-methyl-pyrimidine | | |
|---|---|---|---|---|
| Example No. | Diazo component | Coupling component | Reactive component | Shade |
| 345 | 2-aminonaphthalene-4,8-disulfonic acid | 1-amino-2-methoxy-5-methylbenzene | A | yellow |
| 346 | do. | do. | B | do. |
| 347 | 1-aminonaphthalene-3,6-disulfonic acid | 1-amino-3-methylbenzene | A | do. |
| 348 | do. | do. | B | do. |
| 349 | 2-aminononaphtahlene-5,7-disulfonic acid | 1-amino-3-methylbenzene | A | do. |
| 350 | do. | do. | B | do. |
| 351 | 2-aminonaphthalene-6,8-disulfonic acid | 1-amino-3-methylbenzene- | A | do. |
| 352 | do. | do. | B | do. |
| 353 | 4-aminoazobenzene-3,4'-disulfonic acid | 1-amino-3-methylbenzene | A | brown-yellow |
| 354 | 1-aminobenzene-4-sulfonic acid 1-aminonaphthalene-6-sulfonic acid | 1-amino-3-methylbenzene | B | brown-yellow |
| 355 | 2-(3'-sulfo-4'-aminophenyl)-6-methyl-benzothiazole-7-sulfonic acid | do. | A | yellow |
| 356 | 2-aminonaphthalene-4,8-di- | 1-methylamino-3-methoxybenzene | B | do. |
| | | 1-amino-3-acetylamino-benzene | A | do. |
| 358 | do. | aniline | A | do. |

EXAMPLE 359

Into a solution of 36.5 parts of the sodium salt of 1-amino-8-hydroxy-naphthalene-3,6-disulfonic acid in 100 parts of water are introduced with good stirring at 50° to 60°C, 29 parts of 2,4-bis-methyl-sulfonyl-5-chloro-6-methylpyrimidine and the reaction mixture is stirred, while continuously neutralizing the liberated hydrochloric acid to pH 6-7, until free amino groups can no longer be detected. The dyestuff intermediate thus obtained is coupled, after dilution with 600 parts of water and addition of 12 parts of sodium carbonate, at 5° to 10°C, with 17.5 parts of diazotized 2-aminobenzene-sulfonic acid dissolved in 200 parts of water. The dyestuff of the formula for 60 minutes. After rinsing, soaping at the boil, and drying, a bluish-red shade of good fastness to wet processing, rubbing, and light is obtained.

The following Table gives the shades of further dyestuffs which are synthesized from the diazo components, coupling components, and reactive componenst which can be linked to the amino group in the coupling component employing the procedure of Example 359, or also by reactive the corresponding aminoazo dyestuffs with the reactive components, and which can be applied to cellulose materials by dyeing or printing according to one of the processes described above.

The abbreviations for the reactive components A and B having been defined in Examples 345-358.

| Example No. | Diazo component | Coupling component | Reactive component | Shade |
|---|---|---|---|---|
| 360 | 1-aminobenzene-2-sulfonic acid | 1-amino-8-hydroxy-naphthalene-3,6-disulfonic acid | B | red |
| 361 | aminobenzene | 1-(3'-aminobenzoyl-amino)-8-hydroxy-naphthalene-3,6-disulfonic acid | A | do. |
| 362 | do. | do. | B | do. |
| 363 | 1-amino-2-carboxybenzene-4-sulfonic acid | 1-amino-8-hydroxy-naphthalene-3,6-disulfonic acid | A | do. |
| 364 | 1-amino-4-methylbenzene-2-sulfonic acid | do. | A | do. |
| 365 | 1-amino-3-acetylamino-benzene-6-sulfonic acid | do. | B | do. |
| 366 | 1-amino-3-(2'-[4''-sulfophenylamino]-4'-chloro-triazine-1',3',5'-yl-6')-aminobenzene-6-sulfonic acid | do. | A | do. |
| 367 | 1-aminobenzene-2-sulfonic acid | 2-amino-5-hydroxy-naphthalene-7-sulfonic acid | A | orange |
| 376a | 1-amino-3-(2'-[4''-sulfophenylamino]-4'-methylamino-triazine-1',3',5'-yl-6')-aminobenzene-6-sulfonic acid | 2-amino-5-hydroxy-naphthalene-7-sulfonic acid | A | do. |
| 368 | 1-aminobenzene-2-sulfonic acid | 2-methylamino-5-hydroxy-naphthalene-7-sulfonic acid | A | orange |
| 369 | 1-amino-4-acetyl-amino-6-sulfonic acid | do. | A | scarlet |
| 370 | do. | 2-amino-5-hydroxy-naphthalene-7-sulfonic acid | A | do. |

EXAMPLE 371

Into a solution of 21 parts of the sodium salt of 1,3-diaminobenzene-6-sulfonic acid in 100 parts of water are introduced, with good stirring, 24.0 parts of 2-methylsulfonyl-4,5-dichloro-6-methyl-pyrimidine and the mixture is stirred at 60° to 65°C, while continuously neutralizing the liberated hydrochloric acid to pH 7–8, until diazotization of a sample and coupling with 1-hydroxynaphthalene-4-sulfonic acid yields a clear yellowish-red coloration. After the addition of ice, the resultant dyestuff intermediate is directly diazotized with 7 parts of sodium nitrite and 28 parts of concentrated hydrochloric acid and the product is subsequently added to a solution of 47 parts of the sodium salt of 1-benzoylamino-8-hydroxy-naphthalene-3,6-disulfonic acid and 12 parts of sodium carbonate in 200 parts of water, whereupon coupling takes place, giving the dyestuff of the formula which is salted out, filtered off with suction, washed and dried at 30° to 40°C in a vacuum. The dyestuff readily dissolves in water, with a red color, and yields clear bluish-red shades and prints on cellulose materials by one of the processes described above.

The following Table gives the shades and the pH value of the coupling medium of dyestuffs which are prepared by following the procedure of Example 371 from a diazo component containing a further, preferably acylatable, amino group, a coupling component, and a reactive component which can be linked to the diazo component. The processes described above can be used for dyeing and printing of cellulose materials with the dyestuffs of the Table below.

Abbreviations for the reactive components A and B have been defined in Examples 345–358.

EXAMPLE 388

The dyestuff of the formula

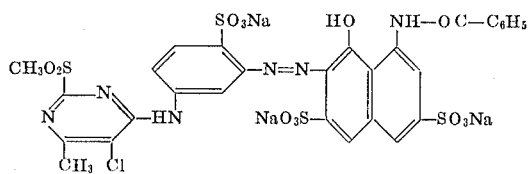

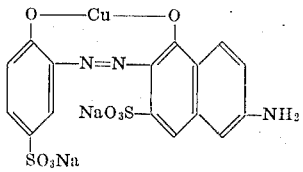

| Example No. | Diazo component | Coupling Component | Reactive component | pH of coupling medium | Shade |
|---|---|---|---|---|---|
| 372 | 1,3-diaminobenzene-4-sulfonic acid | 2-aminonaphthalene-5,7-disulfonic acid | A | 4–5 | orange |
| 373 | do. | 2-aminonaphthalene-3,6-disulfonic acid | A | 4–5 | do. |
| 374 | do. | 2-aminophthalene-6-sulfonic acid | B | 4–5 | do. |
| 375 | do. | 2-N-methlamino-8-hydroxynaphthalene-6-sulfonic acid | A | 4–5 | do. |
| 376 | do. | 1-(3',5'-dichloro-1',2'-thiazole-4'-carbon-amido)-8-hydroxynaphthalene-3,6-disulfonic acid | A | 7–8 | red |

—Continued

| Example No. | Diazo component | Coupling Component | Reactive component | pH of coupling medium | Shade |
|---|---|---|---|---|---|
| 377 | 1,3-diaminobenzene-4-sulfonic acid | 1-(2',4'-dihydroxy-triazine-1',3',5',-yl-6'-amino)-8-hydroxy-naphthalene-3,6-disulfonic acid | B | 7–8 | red |
| 378 | do. | 1-(3',5'-dichloro-1',2'-thiazole-4'-carbon-amido)-8-hydroxynaphthalene-3,6-disulfonic acid | A | 7–8 | do. |
| 379 | do. | 2-hydroxynaphthalene-3,6-disulfonic acid | A | 8 | scarlet |
| 380 | do. | 1-acetylamino-8-hydroxy-naphthalene-3,6-disulfonic acid | B | 7–8 | red |
| 381 | do. | 1-(3'-sulfophenyl)-3-methyl-pyrazolone-5 | A | 6 | yellow |
| 382 | do. | 1-(2',5'-dichloro-4'-esulfophenyl)-3-methyl-pyrazolone-5 | A | 6 | yellow |
| 383 | do. | 1-(5',7'-disulfonaph-thyl-2'-)-3-methyl-pyrazolone-5 | A | 6 | yellow |
| 384 | do. | 1-(3'-sulfophenyl)-3-methyl-5-aminopyrazole | B | 6 | do. |
| 385 | 1,4-diaminobenzene-3-sulfonic acid | 2-amino-8-hydroxynaphtha-lene-6-sulfonic acid | A | 4–4.5 | red |
| 386 | do. | 2-acetylamino-5-hydroxy-naphthalene-7-sulfonic acid | A | 6–7 | scarlet |
| 387 | do. | 1-acetylamino-5-hydroxy-naphthalene-7-sulfonic acid | B | 6–7 | red | is obtained by diazotizing 1-hydroxy-2-aminobenzene-4-sulfonic acid and coupling with 2-amino-5-hydroxynaphthalene-7-sulfonic acid in water/pyridine in the presence of sodium carbonate, followed by treatment with a copper-yielding agent. In 1500 parts of water at a pH of 7 is dissolved 51.6 parts of this dyestuff and 24.0 parts of 2-methyl-sulfonyl-4,5-dichloro-6-methyl-pyrimidine at 60° to 65°C with good stirring. The liberated hydrochloric acid is continuously neutralized to a pH of 7–8 with a sodium carbonate solution. When free amino groups can no longer be detected, the resultant reactive dyestuff of the formula

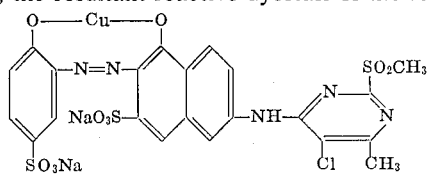

is salted out, pressed off, washed and dried in a vacuum at 30° to 40°C. Fabrics of cellulose materials can be dyed or printed with this dyestuff by one of the processes described above, in ruby shades fast to wet processing, rubbing, and light.

The following Table gives the heavy metal complexes of further aminoazo dyestuffs and the reactive components linked to the amino group, as well as the shades of these dyestuffs on cellulose materials. The preparation of the amino dyestuffs and of their metal complexes, and the reaction of the latter with the reactive components can be carried out according to the procedures of Example 388.

Reactive components A and B are defined as in Examples 345–358.

| Example No. | Aminoazo (shown in terms of dyestuff components coupled) | Complex linked heavy metal | Reactive component | Shade |
|---|---|---|---|---|
| 389 | 1-hydroxy-2-aminobenzene-4,6-disulfonic acid → 2-amino-5-hydroxy-naphthalene-7-sulfonic acid | Cu | A | ruby |
| 390 | 1-hydroxy-2-aminobenzene-4-sulfonic acid → 2-ethylamino-5-hydroxy-naphthalene-7-sulfonic acid | Cu | A | ruby |
| 391 | 1-amino-2-hydroxy-6-nitro-naphthalene-4-sulfonic acid → 2-amino-5-hydroxy-naphthalene-7-sulfonic acid | Cu | A | ruby |
| 392 | do. | Cr | A | greenish grey |
| 393 | 1-amino-2-hydroxy-6-nitronaphthlene-4-sulfonic acid → 1-amino-8-hydroxy-naphthalene-4-sulfonic acid | Co | B | reddish black |
| 394 | 1-amino-2-hydroxy-5-methylsulfonyl-benzene → 1-amino-8-hydroxy-naphthalene-3,6-disulfonic acid | Cu | A | Violet |
| 395 | do. | Co | A | grey |
| 396 | do. | Cr | A | greenish black |
| 397 | 1-amino-2-methylbenzene-4-sulfonic acid → 1-amino-2-hydroxy-5-methylbenzene → 1-amino-8-hydroxynaphthalene-4,6-disulfonic acid | Cu | B | blue |
| 398 | 1-amino-2-methylbenzene-4-sulfonic acid → 1-amino-2-hydroxy-5-methylbenzene → 1-amino-8-hydroxynaphthalene-4,6-disulfonic acid | Co | B | grey |

| Example No. | Aminoazo (shown in terms of dyestuff components coupled) | Complex linked heavy metal | Reactive component | Shade |
|---|---|---|---|---|
| 399 | do. | Cr | A | greenish black |
| 400 | (1-amino-2-chlorobenzene-4-sulfonic acid → 1-hydroxy-2-acetylaminobenzene), hydrolysed, → 1-amino-8-hydroxy-naphthalene-3,6-disulfonic acid | Cu | A | navy blue |
| 401 | do. | Co. | A | grey |
| 402 | 1-amino-8-hydroxynaphthalene-4-sulfonic acid ← 1-hydroxy-2,6-diaminobenzene-4-sulfonic acid → 1,3-dihydroxybenzene | Co | A | black |
| 403 | 1-amino-8-hydroxynaphthalene-3,6-disulfonic acid ← 1-hydroxy-2,6-diaminobenzene-4-sulfonic acid → 2-hydroxy-naphthalene | Co | A | do. |
| 404 | 1-amino-8-hydroxynaphthalene-4-sulfonic acid ← 1-hydroxy-2,6-diaminobenzene-4-sulfonic acid → 3-methyl-pyrazolone-(5) | Co | A | do. |

EXAMPLE 405

The copper-phthalocyanine tetrasulfochloride freshly prepared in the usual manner by the reaction of chlorosulfonic acid and thionyl chloride with copper-phthalocyanine, or of the isomeric copper-phthalocyanine tetrasulfochloride synthesized from 1-sulfobenzene-3,4-dicarboxylic acid via the corresponding copper-phthalocyanine tetrasulfonic acid, 96 parts (referred to 100% goods), are suspended in the form of the moist, thoroughly washed filter cake in 500 parts of water and 500 parts of ice, a solution of 50 parts of the sodium salt of 1,3-diaminobenzene-4-sulfonic acid in 500 parts of water, is added and the pH is adjusted to 8.5 with sodium carbonate. The suspension is stirred at room temperature for 24 hours, while maintaining a constant pH of 8.5 by the continuous addition of sodium carbonate. The resultant condensation product is precipitated at a pH of 1–2 by the addition of sodium chloride, filtered off with suction, washed, and then redissolved neutral in 1000 parts of water. 80 Parts of 2,4-bis-methyl-sulfonyl-5-chloro-6-methyl-pyrimidine are introduced into the blue solution with intense stirring, and the reaction mixture is stirred at 60° to 65°C while continuously neutralizing it to a pH of 7–8 by means of a sodium carbonate solution, until free amino groups can no longer be detected. The reactive dyestuff of the formula

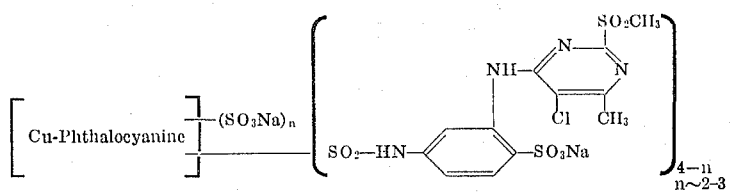

thus obtained is salted out, washed and dried at 30° to 40°C in a vacuum. It is a dark blue powder which dissolves in water, with a blue color, and dyes cotton and regenerated cellulose by one of the dyeing or printing processes described above in clear blue shades of good fastness to wet processing, rubbing, and light.

Instead of 96 parts of copper-phthalocyanine tetrasulfochloride, there can also be used 87 parts (referred to 100% goods) of the copper- or nickel-phthalocyanine trisulfochloride obtainable by the reaction of chlorosulfonic acid with copper- or nickel-phthalocyanine, in the form of the moist filter cake thoroughly washed with ice water, the procedure being otherwise the same as in Example 65; reactive dyestuffs yielding clear blue shades are thus likewise obtained.

When the procedure described in Example 405 is followed, except employing 87 parts of copper-phthalocyanine trisulfochloride and using 90 parts of the sodium salt of 4,4'-diaminodiphenyl-2,2'-disulfonic acid or 90 parts of the sodium salt of 4,4''-diamino-stilbene-2,2'-disulfonic acid instead of 50 parts of the sodium salt of 1,3-diaminobenzene-4-sulfonic acid, reactive dyestuffs are again obtained which dye cellulose materials by one of the processes described above in clear blue shades fast to wet processing, rubbing, and light.

When 4',4'',4''',4''''-tetraphenyl-Cu-phthalocyanine is used as starting material, sulfochlorination and reaction with 1,3-phenylene-diamine-4-sulfonic acid, followed by acylation with 2,4-bis-methyl-sulfonyl-5-chloro-6-methyl-pyrimidine yield a reactive dyestuff which dyes cellulose materials in the presence of acid-binding agents in clear green shades fast to wet processing and light.

EXAMPLE 406

The amino-anthraquinone dyestuff obtained by reacting 1-amino-4-bromo-anthraquinone-2-sulfonic acid with an excess of 4,4'-diamino-diphenyl-2,2'-disulfonic acid, 71 parts, is dissolved in 700 parts of water; 25 parts of 2-methyl-sulfonyl-5-dichloro-6-methyl-pyrimidine are added at 60° to 65°C with good stirring, and a pH of 7-7.5 is maintained by the continuous addition of a sodium carbonate solution. When amino groups can no longer be detected, the resultant dyestuff of the formula

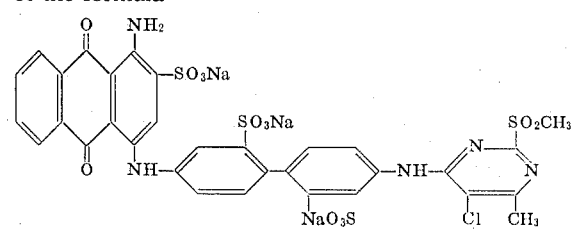

is salted out, filtered off with suction, washed and dried at 30° to 40°C in a vacuum. The dyestuff dyes cotton and regenerated cellulose by one of the processes described above in blue shades fast to wet processing, rubbing, and light.

Following the procedure of Example 406 but using instead of the 71 parts of the starting dyestuff there employed, equivalent amounts of one of the following derivatives of 1-amino-4-(aminoacrylamino)-anthraquinone-2-sulfonic acid, similar dyestuffs are obtained, which likewise yield blue shades with fastness properties similar to those of the dyestuff obtained above; 1-amino-4-(4'-amino-2'-sulfophenylamino)-anthraquinone-2-sulfonic acid, 1-amino-4-(4'-aminophenylamino)-anthraquinone-2,6-disulfonic acid, isomer mixture of 1-amino-4-(4'-aminophenylamino)-anthraquinone-2,5- and -2,8-disulfonic acid, isomer mixture of 1-amino-4-(4'-amino-2'-sulfophenylamino)-anthraquinone-2,5- and -2,8-disulfonic acid, isomer mixture of 1-amino-4-(3'-amionophenylamino)-anthraquinone-2,5- and -2,8-disulfonic acid, 1-amino-4-(3'-aminophenylamino)-anthraquinone-2,6-disulfonic acid, 1-amino-4-(3'-amino-4'-sulfophenylamino)-anthraquinone-2-sulfonic acid. With 1-amino-4-(4'-[4''-amino-2''-sulfophenyl]aminophenyl)-anthraquinone-2,6-disulfonic acid there are obtained reactive dyestuffs which dye in bluish-grey shades.

EXAMPLE 407

Employing the procedure of Example 388, but using instead of the copper-containing amino-monoazo dyestuff there employed, the equivalent amount of the chromium complex of the aminoazo dyestuff obtained by coupling diazotized 1-amino-2-hydroxy-3-chlorobenzene-5-sulfonic acid with 1-[3'-(3''-aminophenyl)]-sulfonylimido-sulfophenyl-3-methyl-pyrazolone-(5), a reactive dyestuff is obtained which dyes cellulose materials by one of the processes described above in yellow-brown shades of good fastness of wet processing, rubbing, and light.

EXAMPLE 408

In 3000 parts of volume of water is dissolved at a pH of 6, 0.1 mol of the copper complex compound of the formula

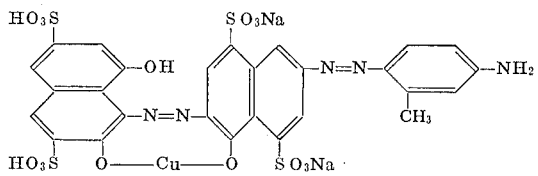

and the solution is combined at a temperature of about 60°C, while stirring, with 24 parts (0.1 mol) of 2-methyl-sulfonyl-4,5-dichloro-6-methyl-pyrimidine. The mixture is stirred, until the condensation is completed, the dyestuff is separated by the addition of a little sodium chloride, and isolated. The residue is washed with acetone and dried at room temperature under reduced pressure. A dark powder is obtained which dissolves in water, with a green color, and dyes cotton by the methods described in Examples 327–329, in green shades.

A cotton fabric is impregnated with a solution at 20° to 25°C which contains, per liter of liquor, 25 g of the above dyestuff and 0.5 g of a non-ionic wetting agent (e.g. a polyoxethylated oleyl alcohol), 150 g of urea and 20 g of sodium carbonate. The fabric is subsequently squeezed between two rubber rollers to a moisture content of about 100%. After an intermediate drying at 50° to 60°C, the fabric is heated at 140°C for 10 minutes, the dyeing thus obtained is thoroughly rinsed with hot water and treated at the boil for 20 minutes with a solution containing, per liter, 5 g of Marseilles soap and 2 g of sodium carbonate. After rinsing and drying, a green shade of good fastness to wet processing, rubbing, and light is obtained.

Clear green shades of good fastness properties are also obtained on cellulose materials by one of the other dyeing or printing processes described in Examples 327–329, 359, and 371.

EXAMPLE 409

The paste of the aminoazo compound of the formula

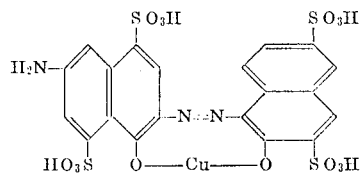

0.1 mol, which is obtained by coupling the diazonium compound from 6-acetamino-2-aminonaphthalene-4,8-disulfonic acid with 2-hydroxynaphthalene-3,6-disulfonic acid, hydrolysis and conversion of the monoazo compound into the copper complex, is dissolved at pH 6.5 in 2000 parts by volume of water and combined with 29 parts of 2,4-bis-methyl-sulfonyl-5-chloro-6-methyl-pyrimidine. The reaction mixture is stirred at 60° to 65°C, until the condensation is completed, while maintaining the pH of the reaction solution at 7–7.5 by the addition of sodium carbonate. When the reaction is completed, the dyestuff is salted out, isolated and dried in a vacuum.

The dry dyestuff is a dark powder which dissolves in water, with a violet color, and dyes cotton in the presence of alkali in bluish-violet shades.

EXAMPLE 410

An aqueous solution of 0.1 mol of the copper complex of the formula

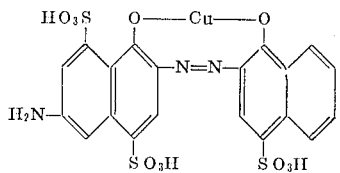

prepared according to the instructions of German Patent Specification No. 1,061,460 or 1,085,988, is reacted in the usual manner with 24 parts of 2-methyl-sulfonyl-4,5-dichloromethyl-pyrimidine. A pH of 7–7.5 is maintained by the addition of sodium carbonate, and when the reaction is completed, the dyestuff is isolated by salting out. In the dry state, the dyestuff is a dark powder which dissolves in water, with a violet color. Cotton fabrics are dyed in violet shades fast to light and to wet processing.

EXAMPLE 411

In 150 parts of water are dissolved 27.5 parts of 2-methylamino-5-hydroxynaphthalene-7-sulfonic acid sodium salt, the solution is mixed with 29 parts of 2,4-bis-methyl-sulfonyl-5-chloro-6-methyl-pyrimidine and stirred at 50° to 55°C, while continuously neutralizing the methane-sulfinic acid formed with a total of 34 parts by volume of a 16% sodium carbonate solution. The acylation is completed after a short time; the pH is 6 and changes no more.

Sodium bicarbonate, 30 parts, is then added and the diazo suspension prepared from 34 parts of the disodium salt of 2-aminonaphthalene-1,7-disulfonic acid in 200 parts of water is added dropwise at 20°C within 15 minutes. The orange-colored reactive dyestuff of the formula

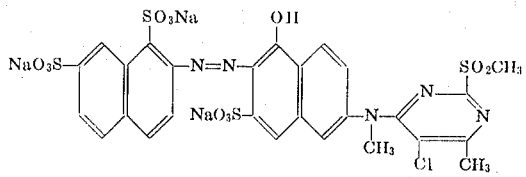

which is immediately formed, is completely separated, after further stirring for 1 hour, by the addition of 80 parts of sodium chloride, filtered off, washed with a dilute sodium chloride solution, and dried at 35°C in a vacuum. The dyestuff dyes cellulose materials by the processes described above in reddish-orange shades of very good fastness to wet processing and good fastness to chlorine.

When equivalent amounts of 2-methyl-sulfonyl-4,5-dichloro-6-methyl-pyrimidine are used in this example instead of 25 parts of 2,4-bis-methyl-sulfonyl-5-chloro-6-methyl-pyrimidine, a reactive dyestuff is obtained which dyes in orange shades and whose dyeing properties correspond to those of the reaction product of the bis-methyl-sulfonyl derivative.

Orange to red reactive dyestuffs are obtained in an analogous manner by acylating the aminonaphthol-sulfonic acids listed in Column 3 of the following Table with 2,4-bis-methyl-sulfonyl-5-chloro-6-methyl-pyrimidine, or 2-methyl-sulfonyl-4,5-dichloro-6-methyl-pyrimidine, and coupling the acylamino-naphthol-sulfonic acids formed with the diazo components stated in Column 2.

| Example No. | Diazo component | Aminonaphthol-sulfonic acid | Shade on cotton |
|---|---|---|---|
| 412 | 2-aminonaphthalene-1,7-disulfonic acid | 2-ethylamino-5-hydroxy-naphthalene-7-sulfonic acid | orange |
| 413 | do. | 2-(β-hydroxyethylamino)-5-hydroxynaphthalene-7-sulfonic acid | do. |
| 414 | do. | 2-amino-5-hydroxynaphthalene-7-sulfonic acid | do. |
| 415 | do. | 2-amino-5-hydroxynaphthalene-1,7-disulfonic acid | do. |
| 416 | do. | 2-amino-8-hydroxynaphthalene-6-sulfonic acid | scarlet |
| 417 | do. | 2-amino-8-hydroxynaphthalene-3,6-disulfonic acid | do. |
| 418 | 2-aminonaphthalene-1,5-disulfonic acid | 2-methylamino-5-hydroxy-naphthalene-7-sulfonic acid | orange |
| 419 | do. | 2-ethylamino-5-hydroxy-naphthalene-7-sulfonic acid | do. |
| 420 | do. | 2-(β-hydroxyethylamino)-5-hydroxynaphthalene-7-sulfonic acid | do. |
| 421 | do. | 2-amino-5-hydroxynaphthalene-7-sulfonic acid | do. |
| 422 | do. | 2-amino-5-hydroxynaphthalene-1,7-disulfonic acid | do. |
| 423 | 2-aminonaphthalene-1,5-disulfonic acid | 2-amino-8-hydroxynaphthalene-6-sulfonic acid | scarlet |
| 424 | do. | 2-amino-8-hydroxynaphthalene-3,6-disulfonic acid | do. |
| 425 | 2-aminonaphthalene-1,5,7-trisulfonic acid | 2-amino-5-hydroxynaphthalene-7-sulfonic acid | orange |
| 426 | do. | 2-methylamino-5-hydroxy-naphthalene-7-sulfonic acid | do. |
| 427 | do. | 2-amino-8-hydroxynaphthalene-6-sulfonic acid | scarlet |
| 428 | 2-aminobenzene-sulfonic acid | 2-methylamino-5-hydroxy-naphthalene-7-sulfonic acid | orange |
| 429 | do. | 2-(β-hydroxyethylamino)-5-hydroxynaphthalene-7-sulfonic acid | do. |
| 430 | do. | 2-amino-8-hydroxynaphthalene-6-sulfonic acid | scarlet |
| 431 | do. | 2-amino-8-hydroxynaphthalene-3,6-disulfonic acid | do. |
| 432 | do. | 2-amino-5-hydroxynaphthalene-1,7-disulfonic acid | orange |
| 433 | 2-aminonaphthalene-1-sulfonic acid | 1-amino-8-hydroxynaphthalene-3,6-disulfonic acid | bluish red |
| 434 | do. | 1-amino-8-hydroxynaphthalene-4,6-disulfonic acid | do. |
| 435 | 2-aminonaphthalene-1,5-disulfonic acid | 1-amino-8-hydroxynaphthalene-3,6-disulfonic acid | do. |
| 436 | do. | 1-amino-8-hydroxynaphthalene-4,6-disulfonic acid | do. |
|  |  | 1-amino-8-hydroxynaphthalene-6-sulfonic acid | do. |
| 438 | 2-aminonaphthalene-1,7-disulfonic acid | 1-amino-8-hydroxynaphthalene-3,6-disulfonic acid | bluish red |
| 439 | do. | 1-amino-8-hydroxynaphthalene-4,6-disulfonic acid | do. |
| 440 | do. | 1-amino-8-hydroxynaphthalene-6-sulfonic acid | do. |
| 441 | 2-aminonaphthalene-1,5,7-trisulfonic acid | 1-amino-8-hydroxynaphthalene-6-sulfonic acid | do. |
| 442 | 1-amino-4-chlorobenzene-2-sulfonic acid | 1-amino-8-hydroxynaphthalene-3,6-disulfonic acid | do. |

| Example No. | Diazo component | Aminonaphthol-sulfonic acid | Shade on cotton |
|---|---|---|---|
| 443 | 1-amino-2-methoxy-benzene-5-sulfonic acid | 1-amino-8-hydroxynaphtha-lene-3,6-disulfonic | do. |
| 444 | 1-amino-benzene-2-carboxylic acid-4-sulfonic acid | 1-amino-8-hydroxynaphtha-lene-3,6-disulfonic acid | do. |
| 445 | 1-amino-4-acetyl-aminobenzene-2-sulfonic acid | do. | violet |
| 446 | do. | 1-amino-8-hydroxynaphtha-lene-4,6-disulfonic acid | bluish red |

EXAMPLE 447

The diaminoazo dyestuff obtained by coupling of diazotized 1-amino-3-acetylaminobenzene-6-sulfonic acid with 2-amino-naphthalene-5,7-disulfonic acid in an acetic acid medium and subsequent alkaline or acidic hydrolysis of the acetylamino group, 56.8 parts, is dissolved at a pH of 7 in 450 parts of water. After the addition of 24.0 parts of 2-methyl-sulfonyl-4,5-dichloro-6-methyl-pyrimidine, the reaction mixture is stirred at 60°C for about 1 hour, while continuously neutralizing the liberated sulfinic acid to a pH of 7–7.5 with a sodium carbonate solution. When the acylation is completed, the resultant reactive dyestuff of the formula

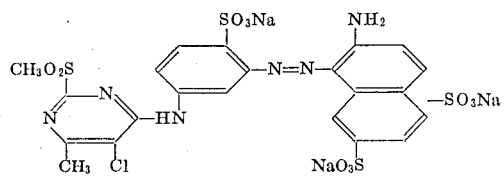

is salted out, filtered off, redissolved in 4000 parts of water at 30°C, filtered and separated from the filtrate in a completely pure form by the addition of 400 parts of sodium chloride. The dyestuff is dried as usual at 35°C in a vacuum. It dyes cellulose materials by one of the processes described above in fast yellowish-orange shades.

EXAMPLE 448

2-Methylsulfonyl-4,5-dichloro-6-methyl-pyrimidine, 24 parts, is added to a neutral solution of 60 parts of the trisodium salt of the aminoazo dyestuff obtained by coupling diazotized 2-aminonaphthalene-3,6,8-trisulfonic acid with 3-acetylaminoaniline in an acetic acid medium in 500 parts of water, and the reaction mixture is stirred at 65°C for 1 hour, while maintaining a pH value of 7–7.5 by the continuous addition of a sodium hydroxide solution. The partially precipitated acylation product is completely separated at a pH of 7 by the addition of 100 parts of sodium chloride and filtered off. For purification, the reactive dyestuff thus obtained can be redissolved in 2500 parts of water at 30°C, clarified and separated again by salting out the filtrate with 350 parts of sodium chloride. The dyestuff has the formula

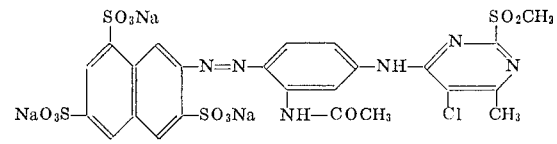

after filtering, drying at 35°C and grinding, it is a yellow powder which readily dissolves in water, with a yellow color, and dyes cellulose fibers by one of the dyeing processes described above in the presence of acid-binding agents in very fast reddish-yellow shades. Fast yellow shades are also obtained on wool and polyamide fibers.

Similar dyestuffs are obtained by proceeding as described above, but using instead of 60 parts of 4'-amino-2'-acetylamino-phenyl-(1')-azo-naphthalene-(2)-3,6,8-trisulfonic acid sodium salt, equivalent amounts of the aminoazo dyestuffs obtained from the amino compounds stated in Column 2 and the coupling components stated in Column 3 in the usual manner by diazotization and coupling in an acetic acid medium, and acylating with 2-methyl-sulfonyl-4,5-dichloro-6-methyl-pyrimidine.

| Example No. | Diazo component | Coupling component | Shade on cotton |
|---|---|---|---|
| 449 | 2-aminonaphthalene-1,5-disulfonic acid | 1-amino-3-methyl-6-methoxy-benzene | strongly reddish yellow |
| 450 | do. | 1-amino-3-methylbenzene | yellow |
| 451 | do. | 1-aminonaphthalene-6-sulfonic acid | reddish yellow |
| 452 | do. | 1-amino-3-acetylamino-benzene | do. |
| 453 | do. | 3-aminophenyl urea | do. |
| 454 | do. | 1-amino-3-hydroxyacetyl-aminobenzene | do. |
| 455 | 2-aminonaphthalene-5,7-disulfonic acid | 1-amino-3-methyl-6-methoxy-benzene | strongly reddish yellow |
| 456 | do. | 1-aminonaphthalene-7-sulfonic acid | reddish yellow |
| 457 | do. | 1-amino-3-acetylaminobenzene | do. |
| 458 | do. | 3-aminophenyl urea | do. |
| 459 | do. | 1-amino-3-hydroxyacetyl-aminobenzene | do. |
| 460 | 1-aminonaphthalene-3,7-disulfonic acid | 1-amino-3-methyl-6-methoxybenzene | strongly reddish yellow |
| 461 | do. | 1-amino-3-methylbenzene- | reddish yellow |
| 462 | 1-aminonaphthalene-3,7-disulfonic acid | 1-aminonaphthalene-6-sulfonic acid | reddish yellow |

-Continued

| Example No. | Diazo component | Coupling component | Shade on cotton |
|---|---|---|---|
| 463 | 2-aminonaphthalene-3,6-disulfonic acid | 1-amino-3-methylbenzene | do. |
| 464 | do. | 1-amino-3-methyl-6-methoxy-benzene | strongly reddish yellow |
| 465 | 2-aminonaphthalene-3,6-disulfonic acid | 1-amino-3-acetylamino-benzene | reddish yellow |
| 466 | do. | 3-aminophenyl urea | do. |
| 467 | do. | 1-amino-3-hydroxyacetyl-aminobenzene | do. |
| 468 | do. | 1-aminonaphthalene-6-sulfonic acid | do. |
| 469 | 2-aminonaphthalene-6,8-disulfonic acid | 1-amino-3-acetylaminobenzene | do. |
| 470 | do. | 1-amino-2-methoxynaphthalene-6-sulfonic acid | strongly reddish yellow |
| 471 | do. | 1-aminonaphthalene-6-sulfonic acid | reddish yellow |
| 472 | 2-aminonaphthalene-4,8-disulfonic acid | 1-aminonaphthalene-6-sulfonic acid | yellow |
| 473 | do. | 1-aminonaphthalene-7-sulfonic acid | do. |
| 474 | 2-aminonaphthalene-4,8-disulfonic acid | 1-amino-2-methoxynaphthalene-6-sulfonic acid | strongly reddish yellow |
| 475 | do. | 1-methylamino-3-methylbenzene | yellow |
| 476 | 2-aminonaphthalene-4,8-disulfonic acid | 1-ethylamino-3-methylbenzene | do. |
| 477 | do. | N-methylaniline | do. |
| 478 | do. | N-ethylaniline | do. |
| 479 | do. | N-(β-hydroxyethyl)-aniline | do. |
| 480 | do. | N-butylaniline | do. |
| 481 | 2-aminonaphthalene-3,6,8-trisulfonic acid | aniline | reddish yellow |
| 482 | do. | 1-amino-3-methylbenzene | do. reddish yellow |
| 483 | 2-aminonaphthalene-3,6,8-trisulfonic acid | 3-aminophenyl urea | |
| 484 | do. | 1-amino-3-hydroxyacetyl-aminobenzene | do. |
| 485 | do. | 1-amino-3-acetylamino-6-methoxybenzene | yellowish orange |
| 486 | do. | 1-amino-3-acetylamino-6-methylbenzene | reddish yellow |
| 487 | do. | 1-amino-3-methane-sulphonyl-aminobenzene | do. |
| 488 | do. | 2,5-dimethoxyaniline | yellowish orange |
| 489 | do. | 3-methyl-6-methoxyaniline | do. |
| 490 | do. | N-methylaniline | reddish yellow |
| 491 | 2-aminonaphthalene-3,6,8-trisulfonic acid | N-ethylaniline | do. |
| 492 | do. | N-butylaniline | do. |
| 493 | do. | N-(β-hydroxyethyl)-aniline | do. |
| 494 | do. | 3-(N-ethylamino)-toluene | do. |
| 495 | do. | 2-aminotoluene | do. |
| 496 | do. | 1-amino-2,5-dimethylbenzene | strongly reddish yellow |
| 497 | do. | 1-amino-2-methoxybenzene | do. |
| 498 | do. | 1-amino-3-methoxybenzene | reddish yellow |
| 499 | do. | 1-ethylamino-3-methoxybenzene | do. |
| 500 | do. | 1-aminonaphthalene-6-sulfonic acid | do. |
| 501 | do. | 1-aminonaphthalene-7-sulfonic acid | do. |
| 502 | 2-aminonaphthalene-4,6,8-trisulfonic acid | 1-amino-3-methylbenzene | reddish yellow |
| 503 | do. | 1-amino-3-acetylaminobenzene | do. |
| 504 | 1-aminonaphthalene-2,4,7-trisulfonic acid | 1-amino-3-methylbenzene | yellow |
| 505 | do. | 1-aminonaphthalene-6-sulfonic acid | do. |
| 506 | 4-nitro-4'-aminostilbene-2,2'-disulfonic acid | 1-amino-3-acetylaminobenzene | reddish yellow |
| 507 | do. | 3-aminophenyl urea | do. |
| 508 | do. | 1-amino-3-hydroxyacetylamino-benzene | do. |
| 509 | 4-nitro-4'-aminostilbene-2,2'-disulfonic acid | N-methylaniline | do. |
| 510 | do. | N-ethylaniline | do. |
| 511 | do. | N-butylanilaniline | do. |
| 512 | do. | N-(β-hydroxyethyl)-aniline | do. |
| 513 | do. | 1-(N-ethylamino)-3-methylbenzene | do. |
| 514 | aniline-2,5-disulfonic acid | 1-aminonaphthalene-6-sulfonic acid | do. |
| 515 | do. | 1-aminonaphthalene-7-sulfonic acid | do. |
| 516 | do. | 1-amino-3-methylbenzene | yellow |
| 517 | do. | 1-amino-3-acetylaminobenzene | do. |
| 518 | do. | 1-amino-2-methoxy-5-methylbenzene | reddish yellow |

—Continued

| Example No. | Diazo component | Coupling component | Shade on cotton |
|---|---|---|---|
| 519 | do. | 1-amino-2,5-dimethoxybenzene | do. |
| 520 | aniline-2,4-disulfonic acid | 1-amino-2-methoxy-5-methyl-benzene | do. |

EXAMPLE 521

In 700 parts of water are dissolved 65 parts of the dyestuff having the formula

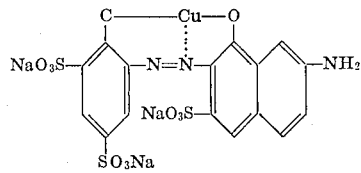

prepared by coupling of diazotized 1-hydroxy-2-aminobenzene-4,6-disulfonic acid with 2-amino-8-hydroxynaphthalene-6-sulfonic acid and coppering of the resultant azo dyestuff. 24 Parts of 2-methylsulfonyl-4,5-dichloro-6-methyl-pyrimidine are added and the reaction mixture is stirred at 60° to 65°C, while continuously neutralizing the liberated acid to a pH of 7–7.5 with a sodium carbonate solution, until free amino groups can no longer be detected. The resultant reactive dyestuff of the formula

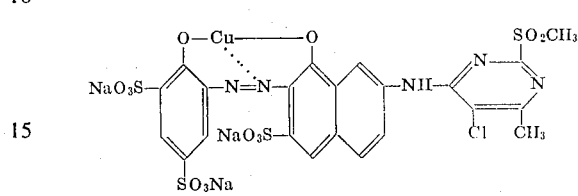

is salted out, filtered off, washed and dried at 30° to 40°C. The dyestuff dyes cellulose materials by one of the processes described above in very fast ruby shades.

Dyestuffs with similar properties are obtained by a method analogous to that described above from the copper complexes of the azo dyestuffs prepared from the diazo and azo components stated in the following Table.

| Example No. | Diazo component | Coupling component | Shade on cotton |
|---|---|---|---|
| 522 | 1-hydroxy-2-amino-benzene-4-sulfonic acid | 2-methylamino-5-hydroxy-naphthalene-7-sulfonic acid | ruby |
| 523 | do. | 2-ethylamino-5-hydroxy-naphthalene-7-sulfonic acid | do. |
| 524 | do. | 2-($\beta$-hydroxyethylamino)-5-hydroxynaphthalene-7-sulfonic acid | do. |
| 525 | do. | 2-amino-8-hydroxynaphthalene-3,6-disulfonic acid | do. |
| 526 | 1-hydroxy-2-amino-benzene-4,6-disulfonic acid | 2-amino-5-hydroxynaphthalene-1,7-disulfonic acid | do. |
| 527 | do. | 2-amino-8-hydroxynaphthalene-3,6-disulfonic acid | do. |
| 528 | do. | 2-methylamino-5-hydroxy-naphthalene-7-sulfonic acid | do. |
| 529 | do. | 2-ethylamino-5-hydroxy-naphthalene-7-sulfonic acid | do. |
| 530 | do. | 2-($\beta$-hydroxyethylamino)-5-hydroxynaphthalene-7-sulfonic acid | do. |
| 531 | 1-hydroxy-2-amino-benzene-4,6-disulfonic acid | 1-amino-8-hydroxynaphthalene-3,6-disulfonic acid | violet |
| 532 | do. | 1-amino-8-hydroxynaphthalene-4,6-disulfonic acid | do. |
| 533 | 1-hydroxy-2-amino-benzene-5-sulfonic acid | 1-amino-8-hydroxynaphthalene-3,6-disulfonic acid | do. |
| 534 | do. | 1-amino-8-hydroxynaphthalene-4,6-disulfonic acid | do. |
| 535 | 1-hydroxy-2-amino-4-acetylaminobenzene-6-sulfonic acid | 1-amino-8-hydroxynaphthalene-3,6-disulfonic acid | bluish violet |
| 536 | 1-hydroxy-2-amino-4-acetylaminobenzene-6-sulfonic acid (4-positioned acetylamino group subsequently hydrolyzed) | 1-ethoxy-8-hydroxynaphthalene-3,6-disulfonic acid | do. |
| 537 | do. | 1-amino-8-hydroxynaphthalene-2,4-disulfonic acid | blue |
| 538 | do. | 1-amino-8-hydroxynaphthalene-2,4,6-trisulfonic acid | do. |
| 539 | 1-hydroxy-2-amino-6-acetylaminobenzene-4-sulfonic acid (6-positioned acetylamino group hydrolyzed) | 1-amino-8-hydroxynaphthalene-2,4-disulfonic acid | blue |
| 540 | 1-amino-2-hydroxy-6-nitronaphthalene-4-sulfonic acid (6-positioned nitro group subsequently reduced to $-NH_2$) | do. | do. |
| 541 | 1-amino-2-hydroxy-6-nitronaphthalene-4-sulfonic acid (6-positioned nitro group subsequently reduced to $-NH_2$) | 1-amino-8-hydroxynaphthalene-2,4,6-trisulfonic acid | |
| 542 | 1-hydroxy-2-amino-6-acetylaminobenzene-4-sulfonic acid (6-positioned acetylamino group hydrolyzed) | do. | do. |

EXAMPLE 543

The procedure is the same as that described in Example 371, but the diazotized, reactive group-containing intermediate product is coupled in a soda-alkaline medium with 40 parts of the sodium salt of 1-acetylamino-8-hydroxy-naphthalene-3,6-disulfonic acid, instead of with 47 parts of the sodium salt of 1-benzoylamino-8-hydroxy-naphthalene-3,6-disulfonic acid, and the resultant dyestuff of the formula

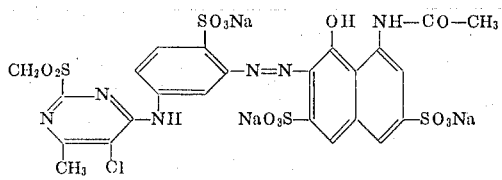

is isolated in the manner described in Example 30. The water-soluble dyestuff dyes cellulose materials by the pad-steam or pad-thermofixing process (at 140°C) in white-dischargeable, bluish-red shades fast to wet processing, rubbing, and light.

EXAMPLE 544

A solution of 19.5 parts of the sodium salt of 1-amino-benzene-4-sulfonic acid and 6.9 parts of sodium nitrite in 200 parts of water is allowed to run into a mixture of 100 parts of ice and 28 parts by volume of concentrated hydrochloric acid; the reaction mixture is then stirred at 0° to 10°C for 30 minutes, and the excess nitrous acid is subsequently removed. To the diazo suspension thus obtained there is added at 0° to 10°C the cooled and thus partially recrystallized solution of 26.2 parts of the potassium salt of 1-amino-naphthalene-8-sulfonic acid in 250 parts of hot water, and the strongly acidic coupling mixture is neutralized at 10° to 20°C to a pH of 4 by the careful addition of a sodium hydroxide solution. The coupling is rapidly completed; the resultant aminoazo dyestuff is completely salted out with 100 parts of sodium chloride, filtered off with suction, washed and redissolved in 500 parts of water at 10°C and a pH of 6–7. The aqueous solution is mixed with 29.0 parts of 2,4-bis-methyl-sulfonyl-5-chloro-6-methyl-pyrimidine and stirred at 55° to 60°C for 1 hour, while continuously neutralizing the liberated acid to a pH of 7–7.5 with a sodium carbonate solution. When the aminoazo dyestuff can no longer be detected, the partially precipitated reactive dyestuff of the formula

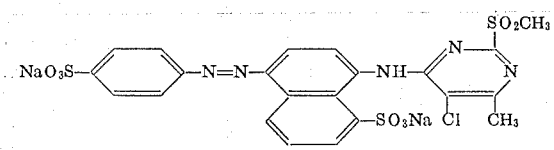

is salted out with 40 parts of sodium chloride, filtered off and redissolved in 800 parts of warm water for purification. After clarification of the solution, the pure dyestuff is separated from the filtrate by the addition of 80–100 parts of sodium chloride. After filtering off, drying at 35°C and grinding, a yellow powder is obtained which readily dissolves in water, with a yellow color, and dyes cellulose fibers by one of the dyeing processes described above in the presence of acid-binding agents in yellow shades of very good fastness to wet processing, light, and chlorine. Fast yellow shades are also obtained on wool and polyamide fibers.

By proceeding as described above but coupling instead of 19.5 parts of the sodium salt of 1-aminobenzene-4-sulfonic acid, equivalent amounts of the diazo components stated in the following Table with 1-aminonaphthalene-8-sulfonic acid and acylating with 2-methyl-sulfonyl-4,5-dichloro-6-methyl-pyrimidine, valuable yellow to brown reactive dyestuffs are also obtained.

| Diazo component | Shade on cellulose fibre |
|---|---|
| 1-aminobenzene-2,5-disulfonic acid | Reddish yellow. |
| 2-amino-naphthalene-4,8-disulfonic acid | Strongly reddish yellow. |
| 2-amino-naphthalene-5,7-disulfonic acid | Do. |
| 2-amino-naphthalene-6,8-disulfonic acid | Do. |
| 2-amino-naphthalene-3,6,8-trisulfonic acid | Do. |
| 2-amino-naphthalene-4,6,8-trisulfonic acid | Do. |
| 4-amino-azobenzene-3,4'-disulfonic acid | Yellowish brown. |
| 4-amino-2-acetylamino-azobenzene-2',5'-disulfonic acid | Orange-brown. |

| Structure | Shade |
|---|---|
| (1-aminobenzene-2,5-disulfonic acid coupled in an acidic medium with 1-amino-naphthalene-6-sulfonic acid). | Reddish brown. |
| (1-aminobenzene-2,5-disulfonic acid coupled in an acidic medium with the technical mixture of 1-amino-naphthalene-6- and 7-sulfonic acid). | Reddish brown. |
| (1-amino-naphthalene-2,5,7-trisulfonic acid coupled in an acidic medium with 1-amino-naphthalene-6-sulfonic acid) | Violettish brown. |
| (1-amino-naphthalene-2,5,7-trisulfonic acid coupled in an acidic medium with 1-amino-2-methoxy-5-methylbenzene) | Reddish brown. |

EXAMPLE 545

When a cellulose fabric is printed with a printing paste which contains, per kilogram, 30 g of the dyestuff described in Example 359, 100 g of urea, 300 g of water, 500 g of alginate thickener (60 g of sodium alginate per kg of thickener), 10 g of sodium carbonate and 10 g of the sodium salt of 3-nitro-benzene-sulfonic acid, and which has been made up with water to 1 kilogram, the fabric is subsequently subjected to an intermediate drying, then steamed in a suitable steaming apparatus at 103° to 115°C for 30 seconds, rinsed and soaped at the boil, an intense bluish-red print of good fastness to wet processing, rubbing, and light is obtained.

EXAMPLE 546

A mixture of the solutions of 65.5 parts each of the 2:1 chromium complex and the 2:1 cobalt complex of the dyestuff of the formula

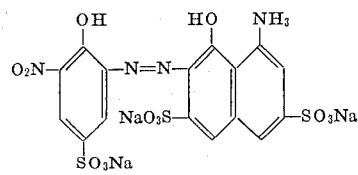

in 400 parts of water each time, is stirred with 60 parts of finely powdered 2-methyl-sulfonyl-4,5-dichloro-6-methyl-pyrimidine at 60° to 70°C for about 2 hours, while maintaining a pH of 7–8. When no more aminoazo dyestuff can be detected chromatographically (Co-complex: blue; Cr-complex: blue-green), the resultant mixture of the two reactive dyestuffs is salted out with potassium chloride, filtered off and dried.

The dyestuff yields on cellulose materials by the pad-dyeing processes or by printing in the presence of acid-binding agents, intense black shades of very good fastness to wet processing and light.

Valuable black dyestuffs are also obtained by proceeding in an analogous manner, but using a mixture of the 2:1 chromium and 2:1 cobalt complexes of the following aminoazo dyestuffs:

| Diazo component | Coupling component | Coupling pH |
|---|---|---|
| 1-hydroxy-2-amino-4-nitrobenzene | 1-hydroxy-8-amino-naphthalene-3,6-disulfonic acid | 9 |
| 1-hydroxy-2-amino-4-nitronaphthalene-7-sulfonic acid | do. | 9 |

EXAMPLE 547

2-Methyl-sulfonyl-4,5-dichloro-6-methyl-pyrimidine, 25.0 parts, is added to a neutral solution of 53.15 parts of the disodium salt of the aminoazo dyestuff obtained by coupling of diazotized 1-amino-4-nitrobenzene-2-sulfonic acid with 1-(2'-chloro-5'-sulfophenyl)-3-methyl-pyrazolone-(5) and subsequent reduction of the nitro group with sodium sulfide, in 300 parts of water, and the mixture is stirred at 55° to 60°C for 1 hour, while continuously neutralizing the liberated acid to a pH value of 6.5–7 with a sodium carbonate solution. The separated dyestuff of the formula

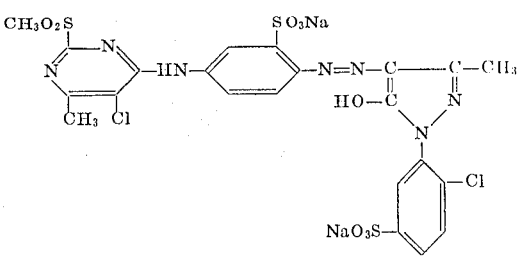

is filtered off, dissolved warm in 3,000 parts of water at a pH of 6–7, and reprecipitated from the filtered solution by the addition of sodium chloride. After filtering off, drying and pulverizing, a yellow powder is obtained which is readily soluble in water and dyes cellulose materials from a long bath at 60°C or by the cold batch-pad process with the use of sodium carbonate as an acid-binding agent, in clear yellow shades fast to washing, rubbing, and light.

Valuable new reactive dyestuffs are also obtained by proceeding as described above but using instead of the stated aminoazo dyestuff, equivalent amounts of the aminoazo dyestuffs synthesized from the components given in the following Table.

In the Table below, the term "hydrolyzed" means that an acylamino group contained in the aminoazo dyestuff is subsequently hydrolyzed, whereas the term "reduced" indicates that a nitro group contained in the diazo component is reduced, after coupling, to form the amino group, whereby the desired aminoazo dyestuff is formed.

| Example No. | Diazo component | Azo component | pH of coupling medium | Shade on cellulose |
|---|---|---|---|---|
| 548 | 1-amino-4-nitro-benzene-2-sulfonic acid (4-positioned nitro group subsequently reduced) | 1-(4-'-sulfophenyl)-3-methyl-pyrazolone-(5) | 5 – 6 | yellow |
| 549 | do. | 1-(4'-sulfophenyl)-3-carboxy-pyrazolone-(5) | 5 – 6 | reddish |
| 550 | do. | 1-(3'-sulfophenyl)-3-methyl-5-amino-pyrazole | 6 – 7 | yellow |
| 551 | 1-amino-3-acetyl-amino-benzene-6-sulfonic acid (3-positioned acetylamino group subsequently hydrolyzed) | do. | 6 – 7 | do. |
| 552 | do. | 1-(β-hydroxyethyl)-3-methyl-pyrazolone-(5) | 5 – 6 | do. |
| 553 | 2 mol 1-amino-3-acetylamino-benzene 6-sulfonic acid (hydrolyzed) | 1 mol bis-pyrazolone from 4,4'-bis-hydrazino-dibenzyl-2,2'-disulfonic acid and acetoacetic ethyl ester | 5 – 6 | do. |
| 554 | 1 mol 1-amino-3-acetylamino-benzene 6-sulfonic acid (hydrolyzed) | 1-(4'-sulfophenyl)-3-carboxy-pyrazolone-(5) | 5 – 6 | do. |
| 555 | 1-amino-5-acetyl-amino-naphthalene-3,7-disulfonic acid (hydrolyzed) | 1-(4'-sulfophenyl)-3-carboxy-pyrazolone-(5) | 5 – 6 | reddish yellow |
| 556 | 1-amino-2-methyl-benzene-4,6-disulfonic acid | 2-acetylamino-5-naphthol-7-sulfonic acid (hydrolyzed) | 7 – 8 | orange |

—Continued

| Example No. | Diazo component | Azo component | pH of coupling medium | Shade on cellulose |
|---|---|---|---|---|
| 557 | do. | 2-acetylamino-8-naphthol-6-sulfonic acid (hydrolyzed) | 7 – 8 | red |
| 558 | 1-amino-2-methyl-benzene-4,6-disulfonic acid | 1-chloro-2-acetyl-amino-5-naphthol-7-sulfonic acid (hydrolyzed) | 7 – 8 | orange |
| 559 | 1-aminobenzene-2-sulfonic acid | 1-acetylamino-8-hydroxy-naphthalene-4,6-disulfonic acid (hydrolized) | 7 – 8 | red |
| 560 | 2-aminonaphthalene-3,6-disulfonic acid | do. | 7 – 8 | bluish red |
| 561 | 2-aminophthalene-3,7-disulfonic acid | do. | 7 – | bluish red |
| 562 | 2-aminonaphthalene-4,8-sulfonic acid | do. | 7 – 8 | bluish red |
| 563 | 2-aminonaphthalene-3,6-disulfonic acid | 1-acetylamino-8-hydroxynaphthalene-3,6-disulfonic acid (hydrolyzed) | 7 – 8 | bluish |
| 564 | 2-aminonaphthalene-4,8-disulfonic acid | 1-acetylamino-8-hydroxynaphthalene-3,6-disulfonic acid (hydrolyzed) | 7 – 8 | bluish red |
| 565 | 1-amino-4-methoxy-benzene-2-sulfonic acid | 2-(N-acetyl-N-methyl-amino-5-hydroxy-naphthalene-7-sulfonic acid (hydrolyzed) | 7 – 8 | yellowish red |
| 566 | do. | 2-(N-acetyl-N-methyl-amino)-8-hydroxy-naphthalene-6-sulfonic acid (hydrolyzed) | 7 – 8 | red |
| 567 | 1-aminobenzene-2-sulfonic acid | do. | 7– 8 | do. |
| 568 | 1-aminobenzene-3-sulfonic acid | do. | 7 – 8 | do. |
| 569 | 1-aminobenzene-4-sulfonic acid | do. | 7 – 8 | do. |
| 570 | 1-amino-4-methyl-benzene-2-sulfonic acid | do. | 7 – 8 | do. |
| 571 | 1-amino-2,4-dimethyl-benzene-6-sulfonic acid | 2-(N-acetyl-N-methyl-amino)-8-hydroxynaphtha-lene-6-sulfonic acid (hydrolyzed) | 7 – 8 | red |
| 572 | do. | 2-acetylamino-8-hydroxynaphthalene-6-sulfonic acid (hydrolyzed) | 7 – 8 | do. |
| 573 | 1-amino-2,4-dimethyl-benzene-6-sulfonic acid | 2-acetylamino-8-hydroxynaphthalene-3,6-disulfonic acid (hydrolyzed) | 7 – 8 | red |
| 574 | 4-aminoazobenzene-3,4'-disulfonic acid | 1-amino-3-acetyl-aminobenzene | 5 – 6 | yellowish brown |
| 575 | do. | 1-amino-3-hydroxy-acetylaminobenzene | 5 – 6 | do. |
| 576 | do. | 1-amino-naphthalene-6-sulfonic acid | 5 – 6 | do. |
| 577 | do. | 1-amino-naphthalene-7-sulfonic acid | 5 – 6 | do. |
| 578 | do. | 1-amino-2-(4'-amino-2'-sulfophenyl-(1')-azo)-8-hydroxynaphtha-lene-3,6-disulfonic acid | 8 | black |

EXAMPLE 579

In 1,000 parts of water are dissolved 52.4 parts of the disodium salt of 4-([4''-aminophenyl]-amino)-2'-nitro-diphenylamine-3,4'-disulfonic acid and the solution is stirred with 30.0 parts of 2,4-bis-methyl-sulfonyl-5-chloro-6-methylpyrimidine at 55° to 65°C for 1 hour, while continuously neutralizing the liberated acid to a pH value of 6.5–7 with sodium carbonate. The resultant reactive nitro dyestuff of the formula

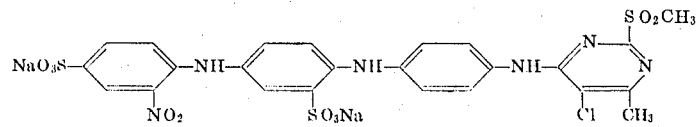

is salted out, filtered off, washed and dried. It dyes cellulose fibers from a long bath or by one of the conventional padding processes in the presence of sodium carbonate as an acid-binding agent, in deep violet-brown shades fast to wet processing and rubbing.

EXAMPLE 580

A neutral solution of 54.7 parts of the disodium salt of 1-amino-4(2'-methyl-3' aminophenyl)-amino-anthraquinone-2,5-disulfonic acid in 1,000 parts of water is stirred with 24.0 parts of 2-methyl-sulfonyl-4,5-dichloro-6-methylpyrimidine at 65°C for 1 hour, while continuously neutralizing the liberated hydrochloric acid to a pH value of 6.5–7.5. When the reaction is completed, the resultant reactive dyestuff of the formula

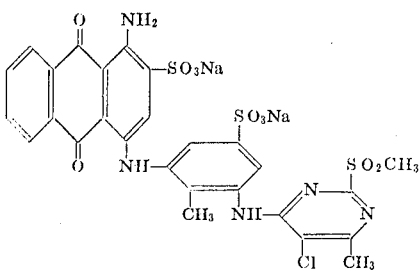

is salted out, filtered off, washed and dried at 30° to 40°C. The dyestuff dyes cellulose materials in clear blue shades of very good fastness to wet processing, rubbing, and light.

Blue dyestuffs with similar properties are obtained by proceeding as described above but acylating instead of the stated water-soluble amino-anthraquinone derivative, equivalent amounts of the amino-anthraquinone-sulfonic acid derivatives mentioned below with 2-methyl-sulfonyl-4,5-dichloro-6-methyl-pyrimidine.

heated at the stated pH, without substantially reducing the reactivity of the dyestuffs toward cellulose. The separation of the unreacted 2,4-bis-methyl-sulfonyl-5-chloro-6-methyl-pyrimidine and of the hydrolysis products formed therefrom is effected by filtration or in a separator. The reaction product is precipitated by introducing 150 g of sodium chloride per liter of dyestuff solution. The product is filtered off with suction and dried at about 30°C under normal pressure or in a vacuum. There are obtained 195–200 g of crude dyestuff which still contains about 30% sodium chloride. The sodium chloride can be substantially removed by stirring the crude dyestuff with 250 ml of water and again filtering it off with suction.

The dyestuff dyes cellulose materials by the pad-thermofixing process at 140°C and by the pad-steam process, in turquoise shades fast to wet processing, rubbing, and light.

The dyestuff mixture used as starting material can be obtained by known methods, e.g. by adding 3 mol of

| Example No. | Water-soluble amino-anthraquinone derivative |
|---|---|
| 581 | 1-amino-4-(3'-aminophenyl)-amino-anthraquinone-2,5'-disulfonic acid |
| 582 | 1-amino-4-(2'-chloro-3'-aminophenyl)-amino-anthraquinone-2,5'-disulfonic acid |
| 583 | 1-amino-4-(2'-methyl-3'-methylaminophenyl)-amino-anthraquinone-2,5'-disulfonic acid |
| 584 | 1-amino-4-(4'-aminophenyl)-amino-anthraquinone-2,6,3'-trisulfonic acid |
| 585 | 1-amino-4-(3'-aminophenyl)-amino-anthraquinone-2,6,4'-trisulfonic acid |
| 586 | 1-amino-4-(4'-aminophenyl)-amino-anthraquinone-2,5,3'-trisulfonic acid |
| 587 | 1-amino-4-(3'-aminophenyl)-amino-anthraquinone-2,5,4'-trisulfonic acid |
| 588 | mixture of 1-amino-4-(3'-aminophenyl)-amino-anthraquinone 2,4',5- and 2,4',8-trisulfonic acid furthermore the derivatives subsequently sulfonated at 20 – 30°C with 5% oleum |
| 589 | 1-amino-4-[4'-(4''-aminobenzyl)-phenyl]-amino-anthraquinone-2-sulfonic acid |
| 590 | 1-amino-4-(4'-methylaminophenyl)-amino-anthraquinone-2-sulfonic acid |
| 591 | 1-amino-4-(3'-methylaminophenyl)-amino-anthraquinone-2-sulfonic acid |
| 592 | 1-amino-4-(2'-methylaminphenyl)-amino-anthraquinone-2-sulfonic acid |
| 593 | 1-amino-4-(7'-amino-naphthyl-[2'])-amino-anthraquinone-2-sulfonic acid |
| 594 | the condensation product obtained from 1 mol cyanuric chloride with 1 mol 1,4-diamino-anthraquinone-2-sulfonic acid, 1 mol aniline-2,5-disulfonic acid and 1 mol ethylene-diamine (one-sided), yields after acylation with 2,4-bis-methylsulfonyl-6-methyl-pyrimidine, a violet reactive dyestuff. |

EXAMPLE 595

A solution of 107 g of a mixture of equal molar proportions of copper-phthalocyanine-trisulfonic acid-(3,3',3'')-mono-(m-amino-p-sulfonphenyl)-amide and copper-phthalocyanine-trisulfonic acid-(3,3',3'')-di-(m-amino-p-sulfophenyl)-amide is adjusted to 1.3 liter and a pH of 7; 50 parts of 2,4-bis-methyl-sulfonyl-5-chloro-6-methyl-pyrimidine are introduced at 50° to 55°C. While stirring, the temperature is raised every hour by 5°C and finally maintained at 65°C to 70°C for several hours. At the same time, a pH of 6.5–7.5 is maintained by the dropwise addition of 3N NaOH, until, on average, each dyestuff molecule is provided with at least one pyrimidine radical; this can easily be ascertained by the consumption of sodium hydroxide solution, on the one hand, and by an amino group determination, on the other hand. For working up, the dyestuff solution can also be slightly 2,4-diamino-benzene-sulfonic acid to an aqueous suspension of sulfonic acid group-free copper-phthalocyanine-trisulfonic acid chloride at 0° to 20°C and at a pH of about 6.5 and simultaneously catalyzing the hydrolysis with 3 mol of pyridine, the above-mentioned mixture of Pc-sulfonamides being thus formed.

A similar product is obtained when a mixture containing the said components in a molar ratio of 4:1 is used as starting material. This mixture is obtained from the same copper-phthalocyanine-trisulfonic acid chloride and 2 mol of 2,4-diamino-benzene-sulfonic acid according to the same process.

Instead of the said starting materials, there may also be used those which contain nickel instead of copper as the central atom, or which are prepared from copper-phthalocyanine-trisulfonic acid chloride-(4,4',4'') or from the phthalocyanine-tetrasulfonic acid chlorides- (3,4',4'',4''') or -(4,4',4'',4'''), or with the use of other arylene-diaminesulfonic acids such as toluylene-diamine-(2,4)-sulfonic acid-(5); 4,4'-diamino-dibenzyl-disulfonic acid-(2,2'), or naphthylene-diamine-(1,5)-disulfonic acid-(3,7). Products of this type and their preparation have frequently been described in the patent literature. The reaction thereof with 2,4-bis-methyl-sulfonyl-5-chloro-6-methyl-pyrimidine or 2-methyl-sulfonyl-4,5-dichloro-6-methyl-pyrimidine can always be carried out in the same manner.

This applies also to the reactions of 2-methyl-sulfonyl-4,5-dichloro-6-methyl-pyrimidine with the copper- and nickel-phthalocyanine intermediates leading to green reactive dyestuffs such as can be obtained, e.g. by polysulfochlorination of tetra-(3,3',3'',3''')-(p-tolylmercapto)-copper-phthalocyanine with chlorosulfonic acid, condensation of 1 to 2 sulfochloride groups per molecule with 1,3-phenylene-diamine-4-sulfonic acid or 1,4-phenylene-diamine-3-sulfonic acid, and hydrolysis of the remaining sulfochloride groups; also the homogeneous or mixed amino and sulfo group-containing arylation and alkylation products of tri- and tetra-mercapto copper-(or nickel-)-phthalocyanine can be converted into valuable green reactive dyestuffs in an analogous manner by acylation of their amino group with 2,4-bis-methyl-sulfonyl-5-chloro-6-methyl-pyrimidine.

EXAMPLE 596

Following the procedure of Example 359, except that the resultant dyestuff intermediate is not coupled with the diazo compound obtained from 17.5 parts of 2-aminobenzene-sulfonic acid, but with the diazo compound from 20.8 parts of 3-chloroaniline-6-sulfonic acid in the presence of 12 parts of sodium carbonate at a final pH of 7, there is obtained a reactive dyestuff of the formula

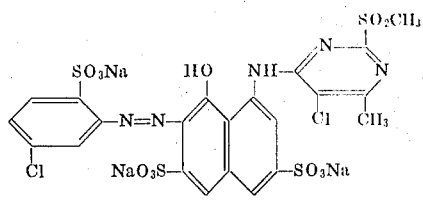

with which cellulose materials can be dyed or printed from a long bath at 40°C or according to one of the padding or printing processes customary for reactive dyestuffs with the use of sodium carbonate as an acid-binding agent, in brilliant red shades fast to wet processing.

In an analogous manner, there are obtained from the coupling components stated in the following Table, by acylation of their amino groups with 2-methyl-sulfonyl-4,5-dichloro-6-methyl-pyrimidine and coupling of the resultant dyestuff intermediates with the stated diazo components, valuable reactive dyestuffs with which cellulose materials can be dyed or printed, preferably in the presence of sodium carbonate, in the specified shades.

| Example No. | Diazo component | Coupling component | Coupling pH | Shade |
|---|---|---|---|---|
| 597 | 1-amino-4-methoxy-benzene-6-sulfonic acid | 1-amino-8-hydroxy-naphthalane-3,6-disulfonic acid | 7 – 8 | violet |
| 598 | do. | 1-amino-8-hydroxy-naphthalene-4,6-disulfonic acid | 7 – 8 | reddish violet |
| 599 | do. | 2-amino-5-hydroxy-naphthalene-1,7-disulfonic acid | 7 | scarlet |
| 600 | 1-amino-5-chloro-benzene-2-sulfonic acid | 2-amino-5-hydroxy-naphthalene-1,7-disulfonic acid | 7 | orange |
| 601 | 1-aminobenzene-3-sulfonic acid | do. | 7 | do. |
| 602 | 1-aminobenzene-4-sulfonic acid | do. | 7 | do. |
| 603 | do. | 2-amino-8-hydroxy-napthalene-3,6-disulfonic acid | 7 – 8 | scarlet |
| 604 | 4-aminobenzoic acid-(β-sulfo-ethyl)-amide | 1-amino-8-hydroxy-naphthalene-3,6-disulfonic acid | 7 – 8 | red |
| 605 | 1-amino-4-sulfo-acetylamino-benzene-6-sulfonic acid | do. | 7 – 8 | violet |
| 606 | 1-amino-3-sulfo-acetylamino-benzene-6-sulfonic acid | 2-amino-5-hydroxy-naphthalene-1,7-disulfonic acid | 7 | orange |
| 607 | 1-amino-4-sulpho-acetylamino-benzene | 2-amino-5-hydroxy-naphthalene-1,7-disulfonic acid | 7 | scarlet |
| 608 | 1-aminobenzene-2,4-disulfonic acid | 1-(2'-methyl-3'-amino-5'-sulfophenyl)-3-methyl-pyrazolene-(5) | 6 | yellow |
| 609 | 2-amino-naphthalene-4,8-disulfonic acid | do. | 6 | yellow |

EXAMPLE 610

Following the procedure of Example 371, except that the dyestuff intermediate obtained from 1,3-diaminobenzene-6-sulfonic acid and 2-methyl-sulfonyl-4,5-dichloro-6-methyl-pyrimidine is coupled after diazotization at 10°C and a pH of 6.5–7.5 with a solution of 40.5 parts of the disodium salt of 2-sulfoacetylamino-5-hydroxy-naphthalene-7-sulfonic acid, a reactive dyestuff of the formula

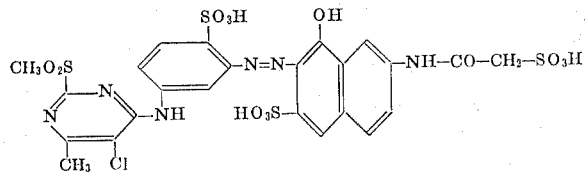

is obtained, which dyes cellulose materials by the usual methods of application with the use of sodium carbonate as an acid-binding agent, in fast orange shades.

EXAMPLE 611

Following the procedure of Example 547, except that instead of the aminoazo dyestuff therein employed, 53.15 parts of the disodium salt of the aminoazo dyestuff obtained by coupling of diazotized 1-amino-4-nitrobenzene-sulfonic acid with 1-(2'-chloro-5'-sulfophenyl)-3-methylpyrazolone-(5) and subsequent reduction of the nitro group with sodium sulfide, are acylated with 2,4-bis-methylsulfonyl-5-chloro-6-methyl-pyrimidine, a valuable reactive dyestuff is likewise obtained with which cellulose materials can be dyed or printed by the usual dyeing and printing processes, in fast yellow shades.

Similar reactive dyestuffs are obtained when instead of the aminoazo dyestuff mentioned above, one of the aminoazo dyestuffs synthesized from the components stated in the following Table is acylated with 2-methyl-sulfonyl-4,5-chloro-6-methyl-pyrimidine.

is prepared by coupling of diazotized 1-hydroxy-2-amino-4-chlorobenzene-5-sulfonic acid with 2-methylamino-8-hydroxynaphthalene-6-sulfonic acid and coppering of the resultant azo dyestuff. In 700 parts of water are dissolved neutral 58 parts of this dyestuff and 24.0 parts of finely powdered 2-methyl-sulfonyl-4,5-dichloro-6-methyl-pyrimidine are added, and the reaction mixture is stirred at 60° to 65°C, while continuously neutralizing the liberated hydrochloric acid to a pH of 7–7.5 with a sodium carbonate solution, until free amino groups can no longer be detected. The resultant reactive dyestuff of the formula

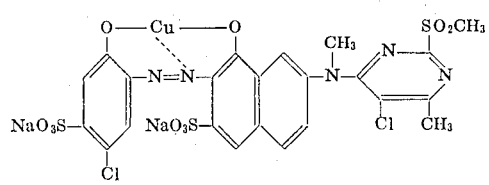

is salted out, filtered off, washed and dried at 30° to

| Example No. | Diazo component | Azo component | Shade |
|---|---|---|---|
| 612 | 1-amino-4-nitro benzene-2-sulfonic acid (reduced) | 1-(2'-methyl-4'-sulfophenyl)-3-methyl-pyrazolone-(5) | yellow |
| 613 | do. | 1-(2',5'-disulfophenyl)-3-methyl-pyrazolone-(5) | yellow |
| 614 | do. | 1-(2'-methyl-4'-sulfo-6'-chlorophenyl-3-methyl-pyrazolone-(5) | yellow |
| 615 | do. | 1-(2',5'-dichloro-4'-sulfo-phenyl)-3-methyl-pyrazolone-(5) | yellow |
| 616 | 1-amino-3-acetylamino-benzene-6-sulfonic acid (hydrolyzed) | 1-(2'-methyl-4'-sulfonphenyl)-3-methyl-pyrazolone-(5) | greenish yellow |
| 617 | do. | 1-(4'-sulfophenyl)-3-methyl-pyrazolone-(5) | greenish yellow |
| 618 | do. | 1-(2'-methyl-4'-sulfophenyl)-3-carboxy-pyrazolone-(5) | do. |
| 619 | do. | 1-('-chloro-'-sulfophenyl)-3-carboxypyrazolone-(5) | do. |

EXAMPLE 620

The dyestuff of the formula

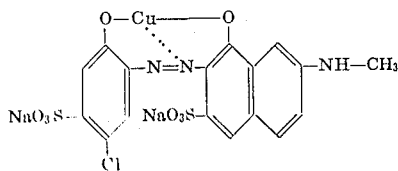

40°C. The dyestuff dyes cellulose materials by one of the processes described above, in very fast violet shades.

Dyestuffs with similar properties are obtained by a method analogous to that described above from the copper complexes, obtained by simple demethylating or oxidizing coppering, of the mono- and disazo dyestuffs prepared from the diazo and azo components stated in the following Table.

| Example No. | Diazo component | Azo component | Coupling pH | Shade |
|---|---|---|---|---|
| 621 | 1-hydroxy-2-amino-4-chlorobenzene-5-sulfonic acid | 2-amino-8-hydroxy-naphthalene-3,6-disulfonic acid | 10 | reddish violet |
| 622 | do. | 1-amino-8-hydroxy-naphthalene-3,6-disulfonic acid | 10 | bluish violet |
| 623 | 2-amino-naphthalene-4,6,8-trisulfonic acid (coppered with oxidation) | 2-hydroxy-6-acetylamino-naphthalene-4-sulfonic acid (hydrolyzed) | 8 – 9 | reddish blue |
| 624 | 1-amino-2-hydroxy-6-nitronaphthalene-4-sulfonic acid (reduced) | 1-hydroxy-8-ethoxy-naphthalene-3,6-disulfonic acid | 10 | blue |
| 625 | 1-hydroxy-2-amino-benzene-4,8-disulfonic acid | 2-hydroxy-3-amino-naphthalene-5,7-disulfonic acid | 10 | red |

— Continued

| Example No. | Diazo component | Azo component | Coupling pH | Shade |
|---|---|---|---|---|
| 626 | 2-amino-naphthalene-4,8-disulfonic acid (coppered with oxidation) | do. | 8 – 9 | blue |
| 627 | 2-aminonaphthalene-4,6,8-trisulfonic acid (coppered with oxidation) | 2-hydroxy-3-amino-naphthalene-7-sulfonic acid | 8 – 9 | blue |
| 628 | 3-methoxy-4-amino-6-methyl-azobenzene-2',4'-disulfonic acid (coppered with demethylation) | 2-methylamino-5-hydroxynaphthalene-7-sulfonic acid | 10 | navy blue |
| 629 | do. | 2-amino-8-hydroxy-naphthalene-3,6-disulfonic acid | 10 | do. |
| 630 | do. | 2-amino-5-hydroxy-naphthalene-1,7-disulfonic acid | 10 | do. |
| 631 | 3-methoxy-4-amino-6-methyl-azobenzene-2',5'-disulfonic acid (coppered with demethylation | 2-methylamine-5-hydroxynaphthalene-7-sulfonic acid | 10 | navy blue |
| 632 | 3-methoxy-4-amino-6-methyl-azobenzene-2',5'-disulfonic acid (coppered with demethylation) | 2-amino-8-hydroxy-naphthalene-3,6-disulfonic acid | 10 | do. |
| 633 | do. | 2-amino-5-hydroxy-naphthalene-1,7-disulfonic acid | 10 | do. |

EXAMPLE 634

Following the procedure of Example 580, but using instead of the 54.7 parts of the disodium salt of 1-amino-4-([2'-methyl-3'-aminophenyl]-amino)-anthraquinone-2,5-disulfonic acid there mentioned, 63.5 parts of the trisodium salt of 1-amino-4-([3'-aminophenyl]-amino)-anthraquinone-2,4',6'-(or 2,2',6')-trisulfonic acid, a reactive dyestuff is obtained which dyes cellulose fibers by one of the usual dyeing processes in clear reddish-blue shades of very good fastness to wet processing.

When equivalent amounts of 1-amino-4-(3'-aminophenylamino)-anthraquinone-2,5,8-trisulfonic acid are used, a valuable reactive dyestuff is again obtained which dyes cotton in fast greyusg-blue greyish-blue

EXAMPLE 635

In 300 parts of water are dissolved neutral 30.4 parts of 2-amino-8-hydroxy-naphthalene-3,6-disulfonic acid, heated to 60° to 65°C, and 25 parts of 2,4-bis-methylsulfony-5-chloro-6-methyl-pyrimidine are added. 40 Parts of a 15% sodium carbonate solution are added in the course of one hour so that the pH value is between 6 and 7.5. The acylation product is in part precipitated.

A diazonium salt solution freshly prepared from 13.6 parts of p-aminobenzyl-sulfonic acid is added dropwise at 0° to 5°C to the suspension of the acylation product, which has been mixed with 12.5 parts of sodium carbonate. After further stirring at ice-bath temperature for 5 hours, the product is salted out with sodium chloride, filtered off with suction, washed with a dilute sodium chloride solution and dried at 30°C in a vacuum dryer. The resultant dyestuff corresponds to the formula

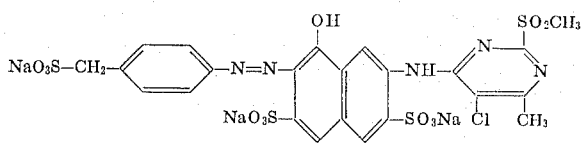

When the procedure above described is followed, but instead of 30.4 parts of 2-amino-8-hydroxy-napthalene-3,6-disulfonic acid, 30.4 parts of 2-amino-5-hydroxy-naphthalene-1,7-disulfonic acid are acylated with 2-methyl-sulfonyl-4,5-dichloro-6-methyl-pyrimidine and the reactive group-containing coupling component is coupled with diazotized p-aminobenzyl-sulfonic acid, a readily soluble reactive dyestuff is obtained which dyes fabrics containing cellulose fibers in brilliant reddish-orange shades.

A cotton or staple fiber is fiber fabric on the foulard at 20° to 25°C with a solution containing, per liter of liquor, 30 g of the dyestuff described in paragraph 1 of the present example, 100 g of urea and 20 g of sodium carbonate, the fabric is squeezed to a moisture content of about 100%, and the moist fabric is rolled up again. After standing at room temperature for 24 hours, the fabric is rinsed, soaped at the boil in the usual manner, and dried. A brilliant scarlet dyeing of good fastness to wet processing and light is obtained.

A cotton or staple fiber fabric is impregnated on the foulard at 20° to 25°C with a solution containing, per liter of liquor, 30 g of the dyestuff described in paragraph 1 of the present example, 100 g of urea and 20 g of sodium carbonate, the fabric is squeezed to a moisture content of about 100% and steamed at 103°C for 30 seconds. After rinsing, soaping at the boil, and drying, a brilliant scarlet dyeing of good fastness to wet processing and light is likewise obtained.

A cotton fabric is impregnated with a solution at 20° to 25°C which contains, per liter of liquor, 20 g of the dyestuff obtainable according to paragraph 1 of the present example and 0.5 g of a non-ionic wetting agent (e.g. a polyoxethylated oleyl alcohol), as well as 150 g of urea and 15 g of sodium bicarbonate. The fabric is subsequently squeezed between two rubber rollers to a moisture content of about 100%. After an intermediate drying at 50° to 60°C, the fabric is heated at 140°C for 10 minutes, and the dyeing thus obtained is thoroughly rinsed with water and treated at the boil for 10 minutes with a solution containing, per liter, 5 g of Marsellles soap and 2 g of sodium carbonate. After rinsing and drying, an intense scarlet dyeing of good fastness to wet processing and light is obtained.

When a cellulose fabric is printed with a printing paste which contains, per kilogram, 30 g of the dyestuff described in paragraph 1 of the present example, 100 g of urea, 300 g of water, 500 g of alginate thickener (60 g of sodium alginate per kg of thickener), 10 g of sodium carbonate and 10 g of the sodium salt of 3-nitrobenzene-sulfonic acid, and which has been made up with water to 1 kilogram, the fabric is subsequently subjected to an intermediate drying and then steamed in a suitable steaming apparatus at 103° to 115°C for 30 seconds, rinsed and soaped at the boil, an intense scarlet dyeing of good fasteness properties is obtained.

100 Parts of wool are introduced at 40°C into a bath which contains, in 5000 parts of water, 1.5 parts of the dyestuff described in paragraph 1 of the present example, as well as 6 parts of 30% acetic acid and 0.5 parts of a polyoxethylated hydroxyl group-containing stearylamine derivative. The dyebath is brought to the boil within 30 minutes, and dyeing is then carried out at the boil for one hour. After rinsing and drying, a brilliant scarlet dyeing of good fastness to washing, milling, and light is obtained.

EXAMPLE 636

2-Amino-1-methylbenzene-3,5-disulfonic acid (monosodium salt), 28.9 parts, is diazotized and the diazo compound is coupled with 13.7 g of 1-amino-2-methoxy-5-methylbenzene in a weakly acidic medium. The monoazo dyestuff obtained is isolated and subsequently diazotized, or diazotized immediately in solution without isolation, and coupled in an alkaline medium with 25.3 parts of 2-methylamino-5-hydroxyphthalene-7-sulfonic acid. The resultant disazo dyestuff is salted out by the addition of sodium chloride, filtered off with suction and the isolated product is metallized with about 50 parts of crystalline copper sulfate, 40 parts of diethanolamine, 50 parts of ammonia (d 0.88) at 95° to 100°C within 5 hours. The dyestuff is isolated from the coppering solution by the addition of salt and careful acidification.

The coppered amino-disazo dyestuff is then acylated in an aqueous solution at a pH of 7–8 and at a temperature of 60° to 65°C with 24.0 parts of 2-methyl-sulfonyl-4,5-dichloro-6-methyl-pyrimidine, while maintaining the pH within the stated range by the addition of sodium carbonate. When the acylation is completed the dyestuff is isolated by means of sodium chloride and dried at 35°C. In the form of the free sulfonic acid, the dyestuff corresponds to the formula The dyestuff dyes cellulose fabrics by the processes know for reactive dyestuffs, in navy known shades fast to wet processing and light.

Further dyestuffs according to the invention can be prepared in a similar manner when the above monoazo dyestuff obtained from 2-amino-1-methylbenzene-3,5-disulfonic acid and 1-amino-2-methoxy-5-methylbenzene is combined according to the instructions given above with the aminonaphthol-sulfonic acids stated in the following Table and with 2-methyl-sulfonyl-4,5-dichloro-6-methyl-pyrimidine.

Coupling component
2-amino-5-hydroxynaphthalene-1,7-disulfonic acid
2-amino-8-hydroxynaphthalene-3,6-disulfonic acid
The dyestuffs obtained have a blue color.

EXAMPLE 637

4-Ureido-2-amino-1-hydroxybenzene-5-sulfonic acid, 0.1 mol, is diazotized and coupled in a soda-alkaline medium with 0.1 mol of 1-amino-8-hydroxynaphthalene-2,4-disulfonic acid. The coupling solution is adjusted to a content of 2 mol/liter with caustic soda and then boiled under reflux for 3 hours to hydrolyze the ureido group. After cooling, the reaction mixture is neutralized with hydrochloric acid. The dyestuff is metallized at 45°C and a pH value of 4–6 by the addition of 25 parts of copper sulfate and 100 parts of 2N sodium hydroxide solution and, after 30 minutes, acylated at a pH of 7–7.5 and a temperature of 60° to 70°C with 0.1 mol of 2-methyl-sulfonyl-4,5-dichloro-6-methyl-pyrimidine. The resultant dyestuff of the formula

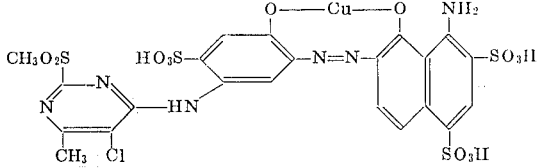

is salted out. A blue dyeing is obtained on cotton.

EXAMPLE 638

A neutral paste of copper-phthalocyanine-3,3′,3″-trisulfonic acid chloride, prepared from 600 g of technical 96% copper-phthalocyanine, is slurried with a little water, adjusted to 4 liters and reacted at a pH of 3.5–6.0 with 216 g of N-methyl-N-(4′-amino-2′-sulfo-benzyl)-amine, initially at 0° to 3°C, finally at 20° to 35°C, with the addition of 300 ml (295 g) of pyridine, and the pyridine is then distilled off with steam at a pH of 9.0 from the resultant solution of copper-phthalocyanine-disulfonic acid-monosulfonic acid-(3′-sulfo-4′-methyl-aminoethylanilide). The solution is heated to 60°C, and 330 g of finely powdered 2-methyl-sulfonyl-4,5-dichloro-6-methylpyrimidine are strewn in portionwise in the course of 1 to 2 hours, while maintaining a pH of 7.5–8.5 by the addition of a dilute sodium hydroxide solution. At the same time, the reaction mixture is diluted, as required, with sufficient water for the dyestuff to remain constantly dissolved.

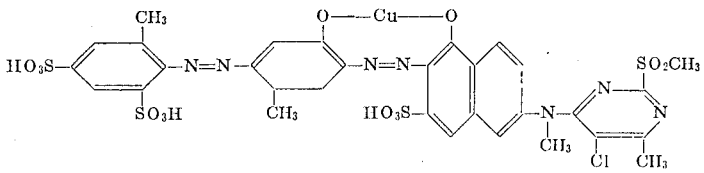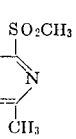

There is thus obtained 10 liters of a dyestuff solution which is separated from the excess acylating agent, adjusted to a pH of 7.0 by the addition of acetic acid, and precipitated by adding 2.5 liters of a concentrated sodium chloride solution while stirring.

After filtering off with suction and drying at 30°C, a clear turquoise-blue dyestuff is obtained which is fixed on cotton from a soda-alkaline solution at 40° to 60°C with a very good yield and very good fastness to washing.

When NiPc-3,3'-3''-trisulfonic acid is used as starting material, a turquoise-blue is obtained which is only slightly more greenish and has equally valuable properties.

EXAMPLE 639

The aminoazo dyestuff having the formula

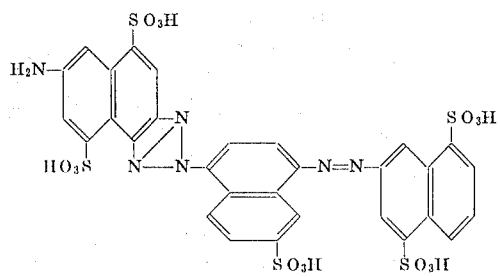

is prepared according to the procedure set forth in German Patent No. 1,115,865 through coupling of the diazo compound obtained from 2-aminonaphthalene-4,8-disulfonic acid with 1-aminonaphthalene-6-sulfonic acid and further diazotization of the resulting aminoazo dyestuff followed by coupling with equivalent amounts of 2,5-diaminonaphthalene-4,8-disulfonic acid and transformation into the aminotriazole. This dyestuff, 0.1 mol, is dissolved in water at a pH of 6, and reacted under agitation at 50° to 65°C with 24 parts of 2-methyl-sulfonyl-4,5-chloro-6-methyl-pyrimidine.

The released hydrochloric acid is neutralized slowly with a sodium carbonate solution until the reaction is completed. The dyestuff is separated by the addition of sodium chloride, isolated and dried in a vacuum at about 50°C. A yellow powder dissolving in water with a yellow color is obtained.

EXAMPLE 640

In 200 parts of water at a pH of 8 and at a temperature of 70° to 80°C is slurried 38.9 parts of the dyestuff obtained by soda-alkaline coupling from 6-nitro-2-diazo-1-hydroxybenzene-4-sulfonic acid and 2-hydroxynaphthalene and 67.9 parts of the chromium complex compound of the azo dyestuff from 4-chloro-2-diazo-1-hydroxybenzene-6-sulfonic acid and 1-amino-8-hydroxynapthalene-3,6-disulfonic acid, containing 1 chromium atom per dyestuff molecule, are added to this suspension, while maintaining the pH between 7 and 9 by the dropwise addition of a sodium carbonate solution. After 20 minutes at 70° to 80°C, a dark blue solution has formed. The paper chromatogram shows that a uniform mixed complex has been formed. The mixed complex is acylated with one hour at 65°C and a pH of 7-8 with 26.0 parts of 2-methyl-sulfonyl-4,5-dichloro-6-methyl-pyrmidine, the pH being maintained within the stated range by the dropwise addition of a sodium carbonate solution. The acylated dyestuff is salted out with a 20% potassium chloride solution, filtered off and dried at 30°C. A dark powder is obtained which dissolves in water, with a blue-grey color.

In the form of the pentasodium salt, the dyestuff corresponds to the formula

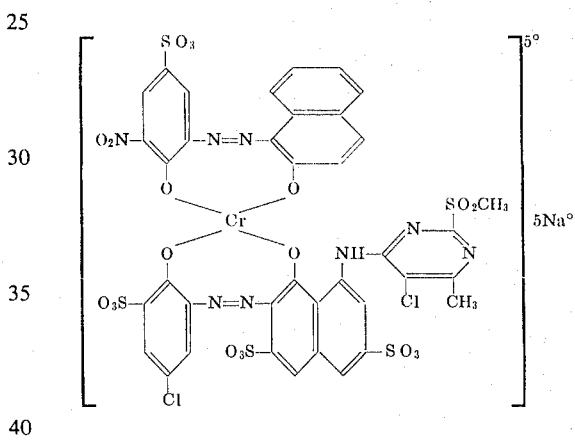

The dyestuff dyes cotton by the processes described in Examples 1–3, in grey to black shades.

Valuable dyestuffs can also be obtained in the manner described in the present example from the starting components given in the following Table. For the production of these dyestuffs, the azo dyestuff containing the reactive group in the 2:1 mixed complex was always used as 1:1 chromium complex.

| Example No. | 1:1 Chromium complex (In terms of reactive components) | Metal-free dyestaff (In terms of coupling components) | Shade on cotton |
|---|---|---|---|
| 641 | 4-nitro-2-amino-1-hydrobenzene-6-sulfonic acid → 1-amino-3-hydroxynapthalene-3,6-disulfonic acid | 4-nitro-2-amino-1-hydroxybenzene → 2-hydroxynapthalene | black |
| 642 | do. | do. | do. |
| 643 | do. | do. | do. |
| 644 | do. | 4-nitro-2-amino-1-hydroxybenzene → 2-hydroxynaphthalene-6-sulfonic acid | do. |
| 645 | do. | do. | do. |
| 646 | do. | 4-nitro-2-amino-1-hydroxybenzene → 1-hydroxynaphthalene-4-sulfonic acid | navy blue |
| 647 | do. | 6-nitro-amino-1-hydrobenzene-4-sulfonic acid → 2-hydroxynaphthalene | black |
| 648 | do. | 4-nitro-2-amino-1-hydroxybenzene → 1-acetylamino-7-hydroxynaphthalene | do. |
| 649 | do. | 6-nitro-1-amino-2-hydroxynaphthalene-4-sulfonic acid → 2-hydroxynaphthalene | do. |

—Continued

| Example No. | 1:1 Chromium complex (In terms of reactive components) | Metal-free dyestaff (In terms of coupling components) | Shade on cotton |
|---|---|---|---|
| 650 | 4-nitro-2-amino--hydroxybenzene-6-sulfonic acid → 1-amino-8-hydronaphthalene-4,6-disulfonic acid | 4-nitro-2-amino-1-hydronaphthalene-6-sulfonic acid → 2-hydroxynaphthalene | black |
| 651 | 4-chloro-2-amino-1-hydroxybenzene-6-sulfonic acid → 1-amino-8-hydroxynaphthalenene-3,6-disulfonic acid | 4-nitro-2-amino-1-hydroxybenzene → 2-hydroxynaphthalene | blue-black |
| 652 | do. | do. | do. |
| 653 | do. | 4-nitro-2-amino-1-hydroxybenzene → 2-hydroxynaphthalene-6-sulfonic acid | do. |
| 654 | do. | 4-chloro-2-amino-1-hydroxybenzene → 2-hydroxynaphthalene | navy blue |
| 655 | do. | 4-nitro-2-amino-1-hydroxybenzene → 1-acetylamino-8-hydroxynaphthalene-3,6-disulfonic acid | blue |
| 656 | do. | 4-nitro-2-amino-1-hydroxybenzene → 1-amino-8-hydroxynaphthalene-2,4-disufonic acid | navy blue |
| 657 | do. | 6-nitro-1-amino-2-hydroxynaphthalene-4-sulfonic acid → 2-hydroxynaphthalene | blue-black |
| 658 | do. | 2-aminobenzene-1-carboxylic acid-5-sulfonic acid → 1-phenyl-3-methyl-5-pyrazolone | grey-green |
| 659 | 4-nitro-2-amino-1-hydroxybenzene-6-sulfonic acid → 1-amino-8-hydroxynapthalene-3,6-disulfonic acid | 6-nitro-1-amino-2-hydroxynaphthalene-4-sulfonic acid → 2-hydroxynaphthalene | black |
| 660 | 4-chloro-2-amino-1-hydroxybenzene-6-sulfonic acid → 1-amino-8-hydroxynaphthalene-3,6-disulfonic acid | 4-chloro-2-amino-1-hydroxybenzene → 1-(4'-sulfophenyl)-3-methyl-5-pyrazolone | violet |
| 661 | 4-methyl-2-amino-1-hydroxybenzene-6-sulfonic acid → 1-amino-3-hydroxynapthalene-3,6-disulfonic acid | 4-chloro-2-amino-1-hydroxylbenzene → 2-hydroxynpathalene-6-suflonic acid | redish blue |
| 662 | 4-nitro-2-amino-1-hydroxybenzene-6-sulfonic acid → 1-amino-3-hydroxynaphthalene-3,6-disulfonic acid | 5-nitro-2-amino-1-hydroxybenzene → 2-hydroxynaphthalene-6-sulfonic acid | black |
| 663 | do. | 4-nitro-2-amino-1-hydrobenzene → 2-hydroxynaphthalene-6-sulfonic acid | do. |
| 664 | do. | 4-nitro-2-amino-1-hydroxybenzene → 1-hydroxynaphthalene-5-sulfonic acid | do. |
| 665 | do. | 6-nitro-4-chloro-1-hydroxybenzene → 1-hydroxynaphthalene-5-sulfonic acid | do. |

EXAMPLE 666

In 300 parts of water at 70° to 80°C and a pH of 8–9 are mixed 62.0 parts of the trisodium salt of the dyestuff obtained by soda-alkaline coupling from diazotized 4-chloro-2-amino-1-hydroxybenzene-6-sulfonic acid and 1-amino-8-hydroxynaphthalene-3,6-disulfonic acid with 54.2 parts of the 1:1 chromium complex of the dyestuff from 6-nitro-1-diazo-2-hydroxynaphthalene-4-sulfonic acid and 2-hydroxynapthalene. A deep blue solution was formed after 10 minutes.

The mixed complex is acylated within about 1 hour at 60° to 65°C and at a pH of 6.5–7.5 with 26 parts of 2-methyl-sulfonyl-4,5-dichloro-6-methyl-pyrimidine, while maintaining a constant pH by the dropwise addition of a sodium carbonate solution. The acylated dyestuff is separated with a 20% sodium chloride solution, filtered off with suction, and dried at 30°C, and has the formula

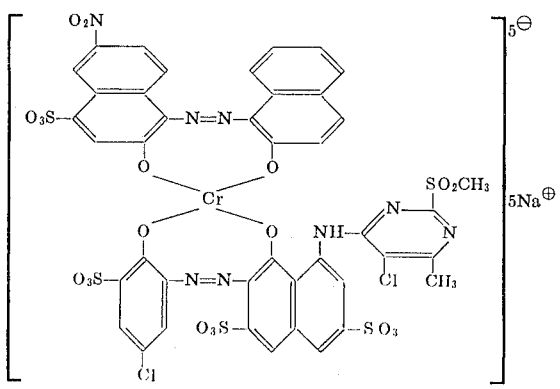

A blue-black print to excellent fastness to light and washing is obtained on cotton by the process described in Example 329.

EXAMPLE 667

In 180 ml of water are dissolved in the form of the sodium salt at 40°C, 6 g of 1-amino-4-(4'-aminophenyl-amino)-anthraquinone-2,5,8-trisulfonic acid, the solution is adjusted to a pH of 8, and 3.0 g of 2-methyl-sulfonyl-4,5-dichloro-6-methyl-pyrimidine are introduced in small portions at 65° to 70°C. At the same time, a dilute sodium hydroxide solution is added dropwise in such a manner that a pH of 7.5–8.5 is maintained during the reaction. Stirring is continued at 65° to 70°C, until the starting material has completely disappeared, the product is filtered off with suction from the excess pyrimidine derivative, and salted out at 10°C with sufficient solid sodium chloride for a 10% solution of sodium chloride to result. After filtering off with suction and washing with a little sodium chloride solution, the resultant dyestuff of the formula

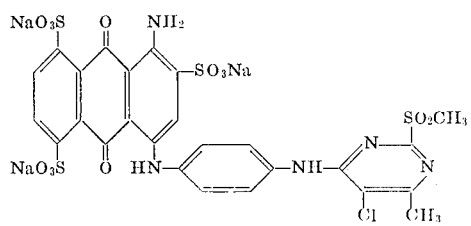

is dried in a vacuum below 40°C. About 8.5 g of the dyestuff is obtained in the form of blue-green needles.

The dyestuff dyes cotton by the processes customary for reactive dyestuffs, in intense blue-green shades of good fastness to wet processing and light.

The 1-amino-4-(4'-aminophenylamino)-anthraquinone-2,5,8-trisulfonic acid used as starting material is obtained as follows: 31.2 g of p-phenylenediamine are introduced under nitrogen into a solution of 62 g of 1-amino-4-bromoanthraquinone-2,5,8-trisulfonic acid sodium salt and 12 g of sodium carbonate, and stirred with the addition of a CuCl paste at 40°C until disulfonated bromoamino acid can no longer be detected. The solution is then mixed with dilute hydrochloric acid, the dyestuff thus precipitated is filtered off with suction, washed with dilute hydrochloric acid, mixed in 300 g of water with just sufficient dilute sodium hydroxide solution to form a solution, and the dyestuff is precipitated in the hot in the form of the sodium salt; the product is then washed and dried.

In the above examples, the reactive components employed can be interchanged under the same or similar reaction conditions. It is also possible to use, with equally good or similar results, the reactive heterocyclic components mentioned above, for the reactions according to the above examples, instead of the reactive components there mentioned.

EXAMPLE 668

In 500 parts of water are dissolved at 60° to 65°C, 79.9 parts of the aminoazo compound of the formula

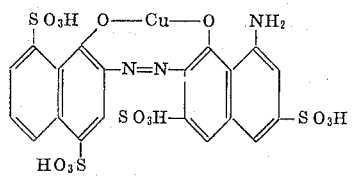

prepared according to Belgian Patent Specification No. 599,581, and mixed at the same temperature 24 parts of 2-methyl-sulfonyl-4,5-dichloro-6-methyl-pyrimidine, while stirring. The slowly liberated hydrochloric acid is neutralized with a sodium carbonate solution while maintaining a pH value between 5 and 6. When the condensation is completed, the dyestuff is salted out by the addition of 150 parts of potassium chloride, isolated, and dried at about 50°C in a vacuum. A dark powder is obtained which dissolves in water, with a blue color and dyes cotton in reddish-blue shades of excellent fastness to light and washing.

The novel dyestuffs contain in addition to the actual dyestuff, as will be apparent from the foregoing discussion and as is known in the art, salts which partially result from the preparation of the dyestuff and/or which are added as fixing agents as well as other fixing agents and auxiliary agents. The dyestuff formuale in the preceding examples can be drawn in the free acid or in the salt form. Depending on the method of isolation (alkaline, neutral or acid in the absence or presence of inorganic salts) the free acid or the salt form is obtained.

As it has already been stated in the descriptive part of the application a great variety of dyestuff radicals can be present in the novel dyes. A great number of them has been illustrated by the preceding examples without any limitation thereto. Preferred dyestuff radicals F are, for example, unmetallised monoazo dyestuffs having 1 to 4 sulfonic acid groups and being of the series of benzene-azo-benzene groupings, benzene-azo-naphthalene groupings, diphenyl-azo-naphthalene groupings, benzene-azo-5-pyrazolone groupings, diphenyl-azo-5-pyrazolone groupings, naphthalene-azo-5-pyrazolone groupings, benzene-azo-5-aminopyrazole groupings, diphenyl-azo-5-aminopyrazole groupings, naphthalene-azo-5-aminopyrazole groupings, naphthalene-azo-naphthalene groupings, benzene-azo-acetylacetoacylamide groupings, naphthalene-azo-acetyl-acetoarylamide groupings; ahd 1:1- or 1:2-chromium, 1:1-cobalt, 1:1-nickel and 1:1-copper complexes of the said unmetallised monoazo dyestuff groupings; disazo dyestuff groupings having from 1 to 4 $SO_3H$ groups and being of the series of benzene-azo-benzene-azo-benzene groupings, benzene-azo-benzene-azo-naphthalene groupings, benzene-azo-naphthalene-azo-benzene groupings, benzene-azo-benzene-azo-5-pyrazolone groupings, benzene-azo-benzene-azo-5-aminopyrazole groupings, naphthalene-azo-diphenyl-azo-benzene groupings, naphthalene-azo-naphthalene-azo-naphthalene groupings, benzene-azo-naphthalene-azo-naphthalene groupings, naphthalene-azo-benzene-azo-naphthalene groupings; 1-amino-2-sulfo-4-arylaminoanthraquinone dyestuff groupings haaving a total of from 2 to 4 sulfonic acid groups and wherein the aryl group of the arylamino substituent is an aryl radical of the benzene series (mononuclear) or of the diphenyl series (binuclear); 1-amino-2-phenoxy-4-arylaminoanthraquinone dyestuff groupings having a total of from 2 to 4 sulfonic acid groups and wherein the aryl residue of the arylamino substituent is of the series as indicated above and the phenoxy group may be substituted by lower alkyl (1–3C), lower alkoxy (1–3C), sulfonic acid, carboxylic acid, halogeno (Cl and Br) and nitro groups; and phthalocyanine sulfonic acid dyestuffs having from 0.5 to 4 water-solubilising sulfonic acid —$SO_2NH_2$ or lower alkyl (1–4 C) substituted sulfonamide groups, arylsulfonamide and aralkyl-sulfonamide groups.

We claim:
1. A reactive dyestuff of the formula

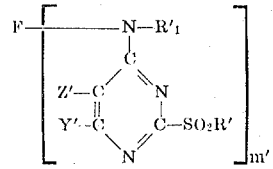

wherein F is the radical of an organic dyestuff in which

is bonded directly to an aromatic nuclear carbon atom of F;

$R'_1$ is hydrogen or lower alkyl of 1–5 carbon atoms;

$R'$ is lower alkyl of 1–5 carbon atoms;
$Z'$ is chlorine or bromine;
$Y'$ is hydrogen or methyl; and
$m'$ is a number from 1 to 2.

2. The reactive dyestuff of claim 1 in which F is the radical of water-soluble sulfo group-containing dyestuff in which

is bonded directly to an aromatic nuclear carbon of F.

3. The reactive dyestuff of claim 1 in which F is the radical of an organic dyestuff selected from the group consisting of azo, anthraquinone and azaporphin dyestuffs, in which

is bonded directly to an aromatic nuclear carbon atom of F.

4. A reactive dyestuff of the formula

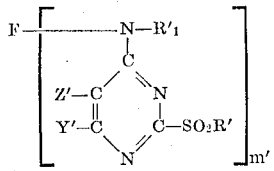

wherein F is the radical of an azo dyestuff in which

is bonded directly to an aromatic nuclear carbon atom on F;

$R'_1$ is hydrogen or lower alkyl of 1–5 carbon atoms;

R' is lower alkyl of 1–5 carbon atoms;

Z' is chlorine or bromine;

Y' is hydrogen or methyl; and m' is a number from 1 to 2.

5. The reactive dyestuff of claim 4 in which F is the radical of a water-soluble sulfo group-containing azo dyestuff in which

is bonded directly to an aromatic nuclear carbon atom of F.

6. The reactive dyestuffs of claim 4 wherein $R'_1$ is hydrogen, R' is methyl, Z' is chlorine, Y' is methyl, and F— is one of the following radicals wherein g is 0 to 2, h is 0 to 1, and k is 2 to 3:

(I) 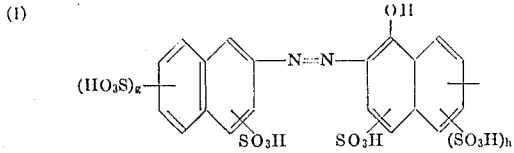

(II) 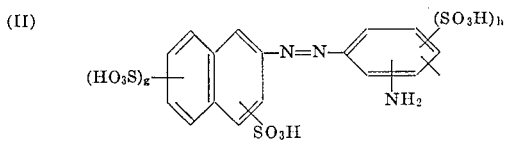

wherein the —NH$_2$ and free valency is ortho- or para- to the —N=N— radical;

(III) 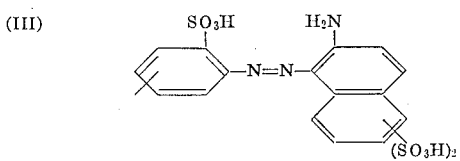

wherein the free valency is para- or meta- to the —N=N— radical;
and (IV) 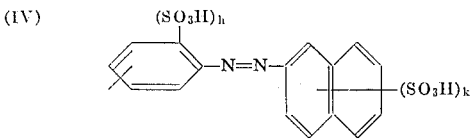

7. The reactive dyestuff of claim 4 wherein $R'_1$ is hydrogen, R' is methyl, Z' is chlorine, Y' is methyl, and F— has the formula:

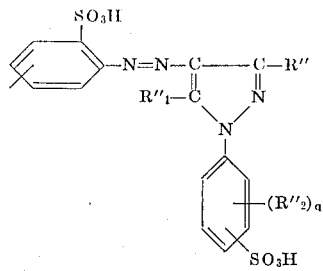

wherein R'' is CH$_3$ or COOH, $R''_1$ is OH or NH$_2$, $R''_2$ is H, CH$_3$ or Cl, q is 1 to 2, and the free valency is para- or meta- to the —N=N— radical.

8. The reactive dyestuff of claim 4 wherein $R'_1$ is hydrogen, R' is methyl, Z' is chlorine, Y' is methyl, and F— has one of the following formulas wherein R'' is hydrogen or hydroxyl, $R''_1$ is hydrogen, chlorine, methyl, or nitro, e is 1 to 2, g is 0 to 2, h is 0 to 1, k is 2 to 3, and Me is chromium or cobalt:

(I) 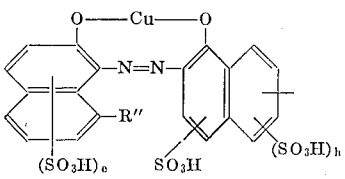

(II) 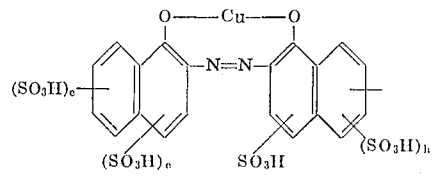

(III) 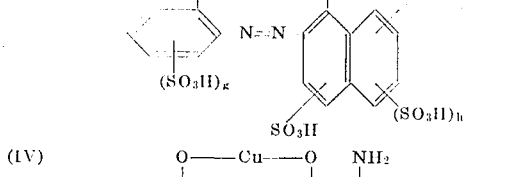

(IV) 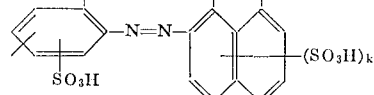

wherein the free valency is para- or meta- to the —N=N— radical,
and (V) 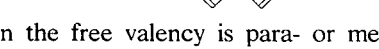

9. The reactive dyestuffs of claim 4 wherein $R'_1$ is hydrogen, R' is methyl, Z' is chlorine, Y' is methyl, and F— is one of the following radicals:

(I) 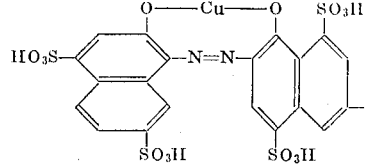

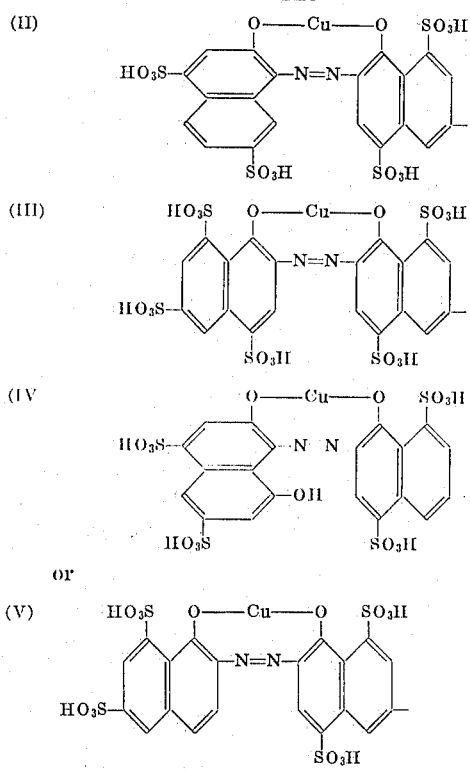

10. The reactive dyestuffs of claim 4 wherein $R'_1$ is hydrogen, $R'$ is methyl, $Z'$ is chlorine, $Y'$ is methyl, and $F-$ is one of the following radicals:

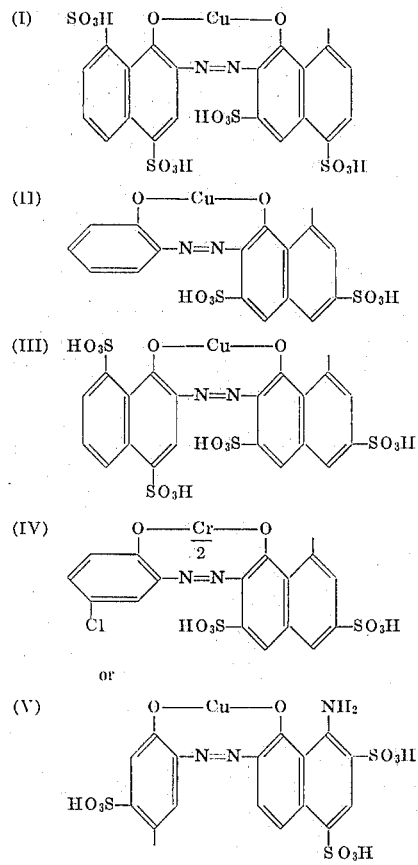

11. The reactive dyestuff of claim 4 wherein $R'_1$ is hydrogen, $R'$ is methyl, $Z'$ is chlorine, $y'$ is methyl, and $F-$ is one of the following radicals:

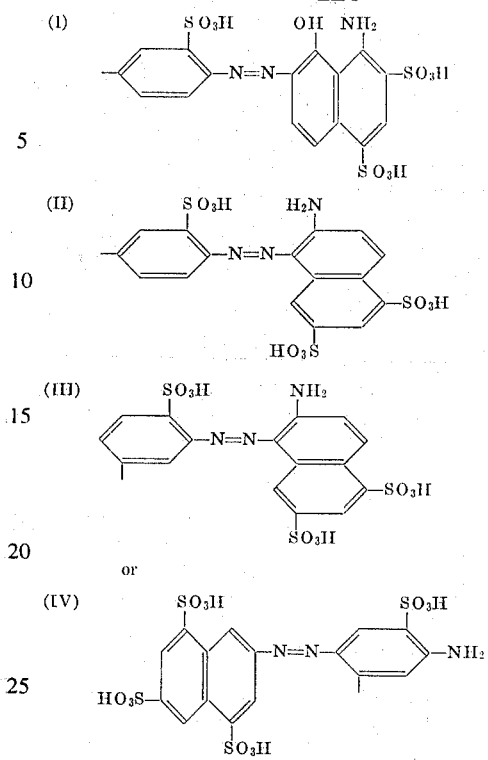

12. The reactive dyestuff of claim 4 wherein $R'_1$ is hydrogen, $R'$ is methyl, $Z'$ is chlorine, $Y'$ is methyl, and $F-$ is one of the following radicals:

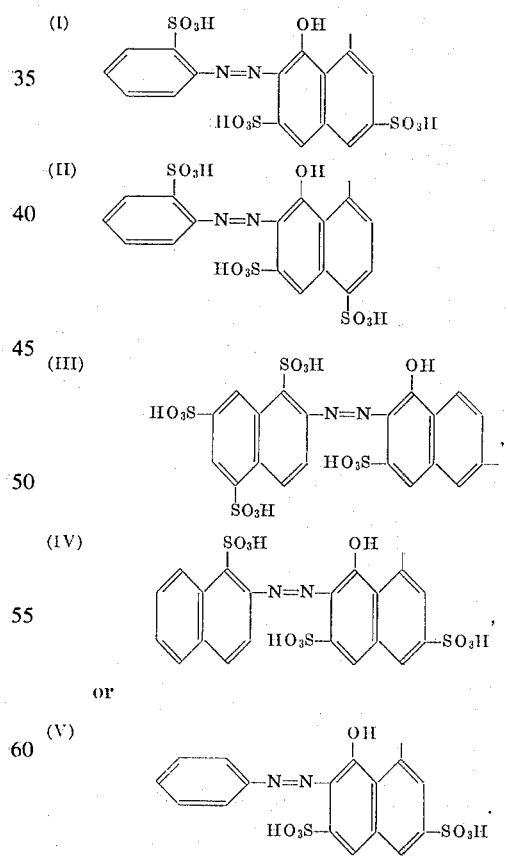

13. The reactive dyestuff of claim 4 wherein $R'_1$ is hydrogen, $R'$ is methyl, $Z'$ is chlorine, $Y'$ is methyl, and $F-$ is one of the following radicals:

(I) 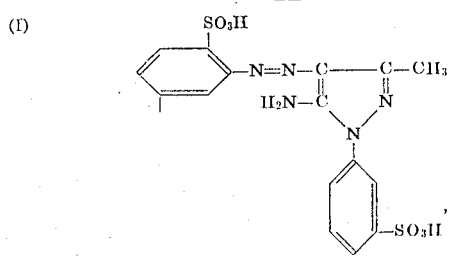
(II) 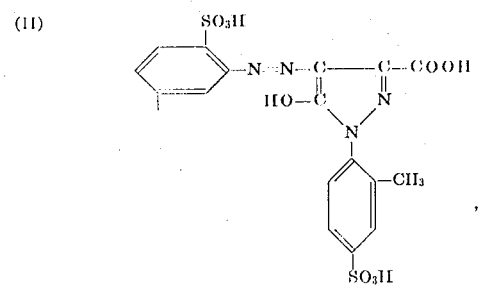
or
(III) 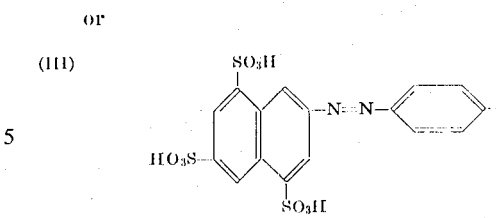
14. A compound of claim 12 having the formula
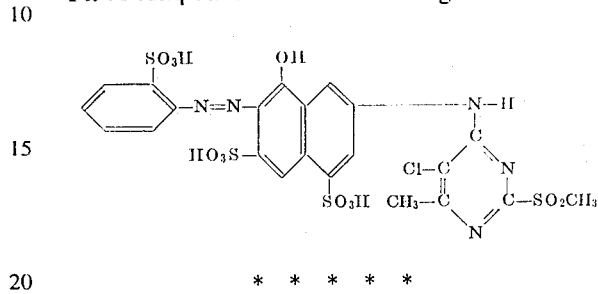
* * * * *